(12) United States Patent
Beshai

(10) Patent No.: US 11,356,240 B2
(45) Date of Patent: Jun. 7, 2022

(54) TIME ALIGNMENT OF ACCESS NODES TO OPTICAL DISTRIBUTORS OF A GLOBAL NETWORK

(71) Applicant: Maged E. Beshai, Maberly (CA)

(72) Inventor: Maged E. Beshai, Maberly (CA)

( * ) Notice: Subject to any disclaimer, the term of this patent is extended or adjusted under 35 U.S.C. 154(b) by 0 days.

(21) Appl. No.: 17/308,272

(22) Filed: May 5, 2021

(65) Prior Publication Data

US 2021/0351906 A1 Nov. 11, 2021

Related U.S. Application Data

(63) Continuation-in-part of application No. 17/000,336, filed on Aug. 23, 2020, now Pat. No. 11,206,467.

(60) Provisional application No. 63/020,297, filed on May 5, 2020.

(51) Int. Cl.
*H04B 10/00* (2013.01)
*H04L 7/00* (2006.01)
*H04J 14/02* (2006.01)

(52) U.S. Cl.
CPC ........ *H04L 7/0075* (2013.01); *H04J 14/0227* (2013.01)

(58) Field of Classification Search
CPC combination set(s) only.
See application file for complete search history.

(56) References Cited

U.S. PATENT DOCUMENTS

| 6,570,872 | B1 | 5/2003 | Beshai | |
|---|---|---|---|---|
| 6,907,002 | B2 | 6/2005 | Beshai | |
| 7,117,257 | B2 | 10/2006 | Beshai | |
| 7,187,654 | B1 * | 3/2007 | Beshai | H04L 49/254 370/251 |
| 7,215,666 | B1 * | 5/2007 | Beshai | H04Q 11/0066 370/380 |
| 7,233,590 | B2 * | 6/2007 | Beshai | H04Q 11/0005 370/380 |
| 7,369,491 | B1 * | 5/2008 | Beshai | H04Q 11/0066 370/230 |
| 7,394,806 | B2 | 7/2008 | Beshai | |
| 7,535,841 | B1 * | 5/2009 | Beshai | H04Q 11/0066 370/230.1 |
| 9,106,353 | B2 * | 8/2015 | Hsueh | H04L 63/0428 |
| 9,628,209 | B2 | 4/2017 | Kingsley | |
| 10,341,083 | B2 * | 7/2019 | Mayer | H04J 3/0667 |
| 10,439,712 | B2 * | 10/2019 | Mehrvar | H04J 3/0667 |

(Continued)

*Primary Examiner* — Agustin Bello

(57) ABSTRACT

A method of time aligning signals transmitted from a plurality of access nodes to a distributor is disclosed. The signals are formed according to a cyclic structure of a predetermined number of segments, including content segments and control segments, each segment having two markers. A controller of the distributor allocates observation time slots for each access node corresponding to control segments. The controller detects, from a portion of a signal received from an access node during a respective observation time slot, a position of a particular marker and a segment index then determines a temporal displacement of the signal accordingly. If the temporal displacement exceeds a predefined value, a distributing mechanism of the distributor halts signal transfer from the access node to all other access nodes and instructs the access node to adjust transmission time according to the temporal displacement.

20 Claims, 39 Drawing Sheets

(56) References Cited

U.S. PATENT DOCUMENTS

| | | | |
|---|---|---|---|
| 10,707,984 B2* | 7/2020 | Pitigoi-Aron | H04Q 9/04 |
| 10,965,392 B2* | 3/2021 | Regev | H04J 3/0667 |
| 2016/0269279 A1* | 9/2016 | Beshai | H04L 49/15 |
| 2018/0375722 A1* | 12/2018 | Gohary | H04W 16/28 |
| 2020/0077166 A1* | 3/2020 | Beshai | H04J 14/0284 |
| 2021/0067850 A1* | 3/2021 | Beshai | H04Q 11/0005 |
| 2021/0351906 A1* | 11/2021 | Beshai | H04J 14/0267 |

\* cited by examiner

3800
Monitoring period alignment ↗

3620 → 00 01 02 03 04 05 06 07 08 09 10 11 12 13 14 15 16 17 18 19 20 21 22 23 24 25 26 27 28 29 30 31
3610 → 00 01 02 03 04 05 06 07 00 01 02 03 04 05 06 07 00 01 02 03 04 05 06 07 00 01 02 03 04 05 06 07

$K=4, J=7, \Pi_1=8$

Indices of segments of misaligned received signal:
during a scheduling period ↙ 3850

11 12 13 14 15 16 17 18 19 20 21 22 23 24 25 26 27 28 29 30 31 00 01 02 03 04 05 06 07 08 09 10
03 04 05 06 07 00 01 02 03 04 05 06 07 00 01 02 03 04 05 06 07 00 01 02 03 04 05 06 07 00 01 02

Indices of segments of misaligned received signal:
during monitoring periods ↙ 3840

3620 → 00 01 02 03 04 05 06 07 08 09 10 11 12 13 14 15 16 17 18 19 20 21 22 23 24 25 26 27 28 29 30 31
3610 → 00 01 02 03 04 05 06 07 00 01 02 03 04 05 06 07 00 01 02 03 04 05 06 07 00 01 02 03 04 05 06 07

Indices of segments of aligned received signal:
during a scheduling period ↙ 3870

08 09 10 11 12 13 14 15 16 17 18 19 20 21 22 23 24 25 26 27 28 29 30 31 00 01 02 03 04 05 06 07
00 01 02 03 04 05 06 07 00 01 02 03 04 05 06 07 00 01 02 03 04 05 06 07 00 01 02 03 04 05 06 07

Indices of segments of aligned received signal:
during monitoring periods ↙ 3860

TIME ALIGNMENT OF ACCESS NODES TO OPTICAL DISTRIBUTORS OF A GLOBAL NETWORK

CROSS-REFERENCE TO RELATED APPLICATIONS

The present application is a continuation-in-part of U.S. patent application Ser. No. 17/000,336 filed on Aug. 23, 2020, entitled "Global Contiguous Web of Fused Three-Stage Networks", the specification of which is incorporated herein by reference in its entirety, and claims priority to provisional application 63,020,297 filed on May 5, 2020, entitled "Time alignment of access nodes to optical distributors of a global network", the specification of which is incorporated herein by reference in its entirety.

FIELD OF THE INVENTION

The invention is related to time alignment of signals received at input ports of bufferless distributors from a plurality of geographically spread access nodes.

BACKGROUND

To enable data exchange through a network, clock-signal distribution to network switching/routing devices ensures equal clock rates, or clock rates bearing a rational ratio to a clock rate of a master clock. In conventional networks, data received from different sources are buffered at input ports of a distributor (such as a switch, a router, or a cyclic connector) and a controller of the distributor directs data portions waiting at input buffers to respective destinations at appropriate time instants.

In a network employing distributors having no input buffers, such as optical distributors, there is a need to explore means for enabling data exchange through the distributors despite the absence of input buffers.

SUMMARY

Timers at network distributors and access nodes maintain time cycles of equal periods through conventional clock-distribution techniques. However, the discrepancy of time indications at a distributor and connecting access nodes is generally unknown. The onsets of time cycles at individual access nodes and distributors are not necessarily coincident; except by mere coincidence. According to the present invention, signal exchange at a bufferless distributor, i.e., a distributor that is not equipped with input buffers, of a network is realized through accounting for both the directional propagation delays and the unknown relative reference-time indications at access nodes and distributors.

In accordance with an aspect, the invention provides a method of time aligning data transmitted from a plurality of access nodes to a distributor. The method is based on allocating for each access node an observation time slot and examining a portion of a signal received from each access node during a respective observation time slot.

A controller of a distributor maintains a control array of N observation time slots, indexed as 0 to (N−1), N≥m, m being an upper bound of the number of dual ports of the distributor, each observation time slot corresponding to a respective input port.

The controller sends to each access node a definition of a cyclic signal structure of N segments and access-node-specific indices of control segments within the signal structure. Each segment contains two markers, each marker indicating a segment index. The segments are indexed cyclically as 0 to (N−1). The controller sends to each access node indices of respective control segments corresponding to indices of observation time slots designated to said each access node.

During each observation time slot, the controller instructs a distributing mechanism of the distributor to direct to the controller of the distributor a signal portion of a signal received from a respective access node. Upon detecting, from the signal portion, a position of a particular marker and a segment index, the controller determines a time displacement of the signal according to the position, the segment index, and the index of the observation time slot.

Subject to a determination that the temporal displacement exceeds a predefined tolerance value, the controller instructs the distributing mechanism to halt signal transfer through the distributing mechanism from the access node to all other access nodes. The controller then instructs the access node to adjust transmission time according to the determined time displacement.

According to an implementation, the two markers of each segment comprise a front marker following a null field starting a segment and a back marker at the end of the segment.

If a detected marker is a front marker, the time displacement is determined as:

$$G = T \times (J-K) + (\delta + t_0 - t_f);$$

if the detected marker is a back marker, the temporal displacement is determined as:

$$G = T \times (J-K) + (T - \Theta + t_0 - t_b);$$

where:

J is a segment index extracted from the particular marker, 0≤J<N;
K is an index of a current observation time slot, 0≤K<N;
T is a duration of said each segment;
$t_0$ is a starting time of said each observation time slot;
$t_f$ is the starting time of the front marker; and
$t_b$ is the starting time of the back marker;
δ is the duration of the null field; and
Θ is the duration of the back marker.

Each control segment contains, in addition to the null field and the two markers, requests for flow-rate allocations from a respective access node to other access nodes and inter-nodal control data to other access nodes of the plurality of access nodes.

The controller maintains a plurality of controller buffers, each controller buffer for holding control data directed to a respective access node of the plurality of access nodes. In response to requests for flow-rate allocations, the controller generates permissible flow-rate allocations for paths from each access node to other access nodes of the plurality of access nodes. The controller further consolidates flow-rate allocations with inter-nodal control data relevant to each access node into a respective buffer and sequentially sends contents of the buffers to respective access nodes.

In accordance with another aspect, the invention provides a method of time aligning data transmitted from an access node to a distributor. The method comprises:

(1) transmitting from a controller of the distributor to the access node definition of a cyclical signal structure of a predefined number of segments indexed sequentially, each of duration T, including content segments and control segments, each segment containing two markers indicating a respective index of the segment; and (2) allocating to the access node respective observation time slots, each of duration T, with respective indices equal to indices of the control segments.

During each observation time slot, the controller of the distributor instructs a distributing mechanism of the distributor to direct to the controller a signal portion of a signal received from the access node. The controller detects from the signal portion a position of a particular marker and a segment index read from the particular marker.

For a current observation time slot, the controller determines a requisite time displacement of the signal based on the position of the particular marker, the read segment index, and an index of the current observation time slot. The time displacement is reported to the access node which, in turn, adjusts timing of data transmission to the distributor.

BRIEF DESCRIPTION OF THE DRAWINGS

Features and implementations will be further described with reference to the accompanying exemplary drawings, in which:

FIG. 38 details the example of monitoring-period alignment of FIG. 36; and

TERMINOLOGY

Figure 1:
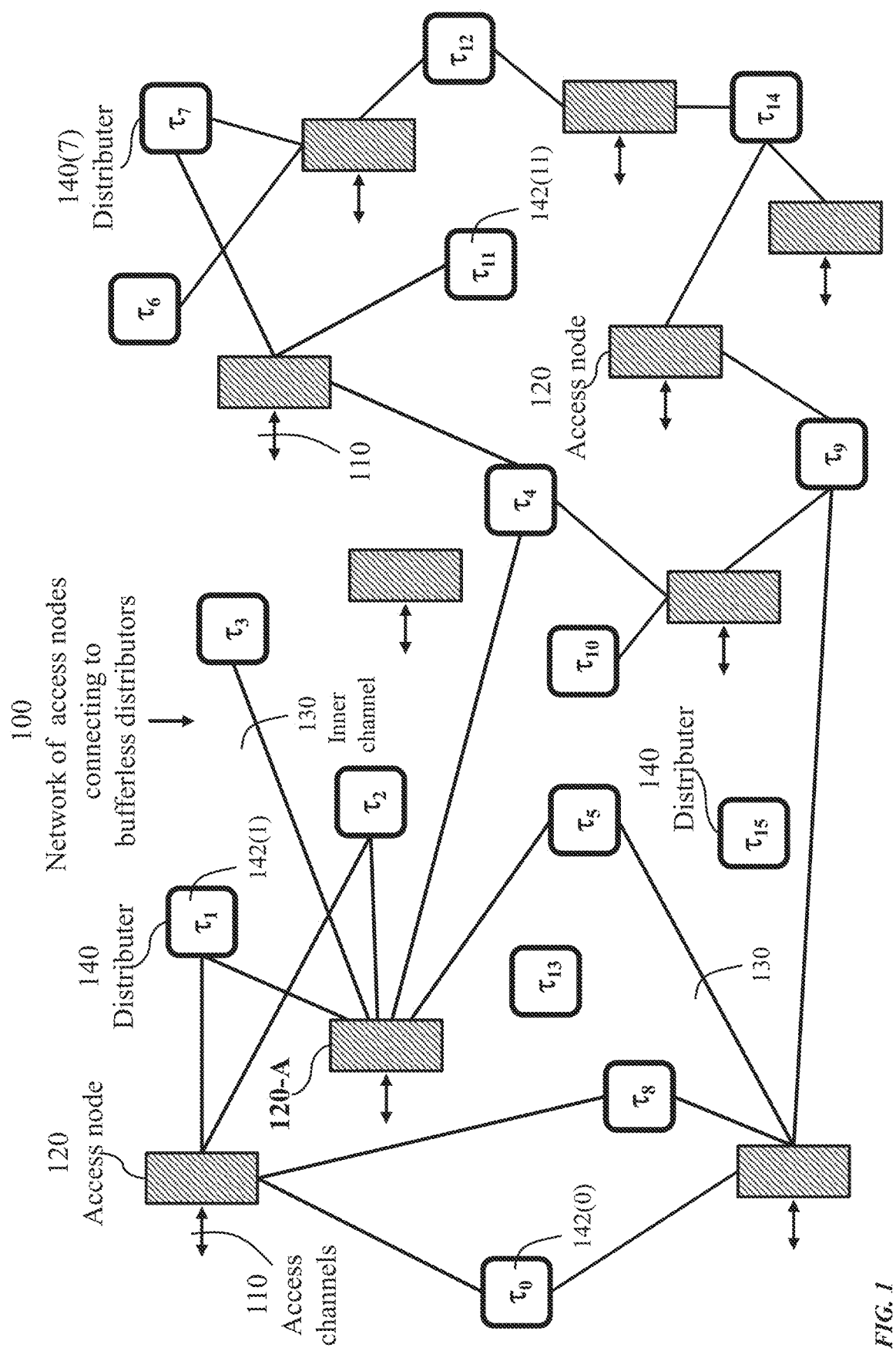
FIG. 1 illustrates a network of access nodes connecting to bufferless distributors.

Terms used in the present application are defined below.

Control segment versus content segment: A data stream is preferably organized into segments including control segments and content segments. Each segment is transferred during a single time slot. A control segment is directed to a controller of a distributor while a content segment is directed to an output port of a distributor. The segments of a data stream are preferably indexed sequentially so that segments of a data stream transferred during a scheduling period of N time slots are indexed sequentially as 0, 1, . . . , (N−1).

Segment marker: A segment marker identifies a segment, preferably using the segment's index. According to a preferred implementation, two segment markers, labeled "front marker" and "back marker", are inserted in each control segment and each content segment. The front marker of a segment of index J is denoted $J^F$, $0 \le J < N$. The Back marker of a segment of index J is denoted $J_B$, $0 \le J < N$.

Time slot: The time domain is organized into time slots, the duration of each time slot being sufficient to transfer a data segment (a control segment or a content segment).

Monitoring period: A monitoring period comprises a predefined number $\Pi_1$ of time slots, $\Pi_1 > 1$. During each monitoring period, each input port of a distributor has access to a controller of the distributor during a respective reserved time slot for periodic verification of signal temporal alignment.

Scheduling period: A scheduling period comprises an integer number $\Pi_2$ of monitoring periods, $\Pi_2 > 1$. Allocating a flow rate for a data stream may be based on allocating a number of time slots per scheduling period.

Global timing period: A global timing period is preferably specified as an integer number $\Pi_3$ of the scheduling period, $\Pi_3 > 1$. A global timing period may be selected to be larger than the round-trip propagation delay between any access node and any distributor linked to the access node.

Access node: A switching device connecting to data sources and data sinks, and configured to transfer data from the data sources to the data sinks or to other switching device, and transfer data from other switching devices to the data sinks is referenced as an access node.

Switch: A switch comprises a switching mechanism for selectively transferring data from a set of input ports to a set of output ports. In general, a switch may use an electronic or a photonic switching mechanism. The input ports of a switch may include a control inlet and the output ports may include a control outlet.

Rotator: A rotator comprises a rotation mechanism for cyclically transferring data from a set of input ports to a set of output ports. The input ports of a rotator may include a control inlet and the output ports may include a control outlet. Each input port transfers data to each output port during a respective time interval of a rotation time frame. A rotator may use an electronic or a photonic rotation mechanism. The term "rotator" is used in the present application to refer exclusively to a "temporal rotator" which cyclically connects each port on the input side to each port on the output side.

Distributor: A device comprising a plurality of input ports and a plurality of output ports, connecting to a distributing mechanism, where input ports may transfer data to output ports is herein referenced as a distributor. The transfer of data may be selective or cyclic. A distributor configured to transfer data from any input port to selected output ports is conventionally called a "switch. A distributor configured to cyclically transfer data from each input port to each output port is conventionally called a "rotator". Thus, the term "distributor" refers to either a switch or a rotator. The input ports of a distributor may include a control inlet and the output ports may include a control outlet.

Spectral band: The term refers to a frequency band (bandwidth) occupied by a signal in a transmission medium, such as a fiber-optic link.

Dual channel: A dual channel comprises a channel from a first device to a second device and a channel from the second device to the first device.

Multichannel link: The term refers to a transmission link comprising multiple channels—a multichannel link is typically realized as a spectrally multiplexed optical link, often called a wavelength-division-multiplexed link (WDM link).

Dual multichannel link: The term refers to a transmission link comprising multiple dual channels where a dual channel comprises two channels of opposite transmission directions.

Dimension of a switch: The number of input ports and output ports, excluding ports used exclusively for control purposes, defines a "dimension" of a switch (a dual port comprises an input port and an output port).

Dimension of a rotator: The number of dual ports, excluding dual ports used exclusively for control purposes, defines a "dimension" of a rotator.

Global network: A network comprising a large number of nodes covering a wide geographical area is traditionally referenced as a global network.

Switching-system coverage: In a switching system configured as a network comprising geographically distributed access nodes, the term "coverage" refers to the number of access nodes.

Spectral multiplexer: A spectral multiplexer combines spectral bands, from separate input channels, onto an output wavelength-division-multiplexed link (WDM link), the input channels may originate from different network elements.

Spectral demultiplexer: A spectral demultiplexer directs individual spectral bands of an input WDM link to separate output channels which may terminate onto different switches.

Processor: The term "processor" as used in the specification of the present application, refers to a hardware processor, or an assembly of hardware processors.

Controller: The term "controller", as used in the specification of the present application, is a hardware entity comprising at least one processor and at least one memory device storing software instructions.

Software instructions: The term refers to processor-executable instructions which may be applied to cause a processor to perform specific functions.

Configuring a controller: The term refers to an action of installing appropriate software in a controller for a specific function.

Channel: A directional channel is a communication path from a transmitter to a receiver. A dual channel between a first port, having a transmitter and a receiver, and a second port, having a transmitter and a receiver, comprises a directional channel from the transmitter of the first port to the receiver of the second port and a directional channel from the transmitter of the second port to the receiver of the first port. A channel may occupy a spectral band in a wavelength division multiplexed (WDM) link.

Link: A link is a transmission medium from an access node to a distributor, or vice versa. A link contains at least one channel, each channel connecting a port of the first device to a port of a second device. A directional link may contain directional channels from ports of the first device to ports of the second device, or vice versa. A dual link comprises two directional links of opposite directions.

WDM link: A number of channels occupying different spectral bands of an electromagnetic transmission medium form a wavelength-division-multiplexed link (a WDM link).

Spectral router: A spectral router (also called "wavelength router") is a passive device connecting a number of WDM input links to a number of WDM output links where each WDM output link carries a spectral band from each WDM input link.

Upstream channel/downstream: Each access node has an upstream channel to a respective distributor and a downstream channel from the respective distributor.

upstream content data: The term refers to content data (payload data) transferred through an upstream channel.

upstream control data: The term refers to control data transferred through an upstream channel.

Downstream content data: The term refers to content data (payload data) transferred through a downstream channel.

Downstream control data: The term refers to control data transferred through a downstream channel.

$\lfloor \alpha \rfloor$: $\lfloor \alpha \rfloor$ denotes the nearest integer lower than or equal to $\alpha$ if $\alpha$ is a real number; $\lfloor \alpha \rfloor = \alpha$ if $\alpha$ is an integer.

$\lceil \alpha \rceil$: $\lceil \alpha \rceil$ denotes the nearest integer higher than or equal to $\alpha$ if $\alpha$ is a real number; $\lceil \alpha \rceil = \alpha$ if $\alpha$ is an integer.

Modulo operation: The operation X modulo W, herein denoted $X_{modulo\ W}$, X|modulo W, or $|X|_W$, where X is any integer, which may be a positive integer or a negative integer, and W is a positive integer produces a remainder determined as: $X_{modulo\ W} = X - W \times \lfloor X/W \rfloor$, where $\lfloor R \rfloor$ is the nearest integer that is less than R or equal to R if R is an integer. For example: $\lfloor 7/8 \rfloor = 0$, $\lfloor -7/8 \rfloor = -1$, $\lfloor 8/8 \rfloor = 1$, $\lfloor -8/8 \rfloor = -1$, $\lfloor 9/8 \rfloor = 1$, $\lfloor -9/8 \rfloor = -2$. Thus, $7_{modulo\ 8} = 7$, $(-7)_{modulo\ 8} = \{-7 - (-1) \times 8\} = 1$, $8_{modulo\ 8} = 0$, $(-8)_{modulo\ 8} = 0$, $9_{modulo\ 8} = 1$, and $(-9)_{modulo\ 8} = 7$.

Processor-executable instructions causing respective processors to route data through a network may be stored in a processor-readable media such as floppy disks, hard disks, optical disks, Flash ROMS, non-volatile ROM, and RAM. A variety of hardware processors, such as microprocessors, digital signal processors, and gate arrays, may be employed.

REFERENCE NUMERALS

A reference numeral may individually or collectively refer to items of a same type. A reference numeral may further be indexed to distinguish individual items of a same type.

100: Network of access nodes connecting to bufferless distributors
110: Dual access channels
120: Access node
130: Dual inner channels
140: Distributors
142: Reference time at a distributor
200: Cyclical time indications at an access node and a distributor
210: Time indication at an output port of an access node
220: Reference time at a respective access output port
230: Time indications at a distributor linked to the output port of the access node
240: Reference time at distributor
300: Offsetting discrepancy of time indications at an access node and a linked distributor
320: One-way propagation delay from access node to distributor (remains unknown)
340: Temporal discrepancy to offset
400: Discrepancy of time indications at an access node and a plurality of distributors linked to the access node
421: Links from data sources
422: Links to data sinks
430: Upstream channel from access node to distributor
435: Reference time indication (zero) at a distributor
440: Downstream channel from a distributor to the access node
450: Upstream propagation delay along an upstream channel (remains unknown)
500: Global timing period of multiple scheduling periods
510: An exemplary global timing period of $2^{16}$ time slots
520: A scheduling period of $2^{13}$ time slots
600: components of an access node 120
610: Ingress channels
620: Steering mechanism
621: Ingress ports
622: Egress ports
623: Inner input ports
624: Inner output ports
630: Input WDM links
632: Spectral demultiplexer
634: Input channel
635: Bank of optical-to-electrical converters
637: Bank of electrical-to-optical converters
638: Output channel
650: Access controller
651: Input control port
652: Output control port
653: Control channel to input control port
654: Control channel from output control port
680: Egress channels
682: Spectral multiplexer
690: Output WDM link
700: Components of an access-node controller
710: Access processor
720: Access scheduler
730: Scheduling instructions from a linked distributor connecting to an input channel 634
740: Memory device holding requests from data sources
742: Requests from data sources
750: Memory device holding generated schedules for internal paths and upstream paths
752: Transmitted schedules to input ports
770: Access-node clock
780: Clock-signal paths to access ports
800: Components of an access-port controller
810: Access-port processor

820: Data from input side of access port
840: Module for forming and transmitting upstream data segments (control segments and content segments)
846: Upstream data segment
850: Module for time alignment
855: Time-alignment instructions from a respective distributor
858: Transmission schedule from access controller
860: Data register for holding a transmission schedule received from access controller
870: Port time indicator (a time counter)
890: Electrical-to-optical converter
892: Modulated optical carrier
900: Components of a first distributor
910: Channels from access nodes
912: Optical splitter
916: Input temporal selector
920: Distributing mechanism
921: Input port of the distributor
922: Output port of the distributor
924: Optical combiner
925: Steering controller
930: Optical-to-electrical converter
935: Electrical-to-optical converter
950: Distributor controller
970: Channels to access nodes
976: Output temporal selector
1000: Components of a second distributor
1023: Downstream control port
1024: Upstream control port
1100: Phases of time alignment
1120: Global timing period
1140: Scheduling period
1160: Monitoring period
1180: Time slot (duration of a control segment or a content segment)
1200: Process of time alignment
1230: Scheduling period
1232: Scheduling-phase temporal adjustment
1235: Global temporal adjustment
1240: Global reference time
1241: Scheduling-phase index
1251: Upstream propagation delay $\Delta_1$
1260: Unaligned access port
1261, 1262, 1263, 1264, 1265, 1268: Reference time instants
1270: Access alignment to scheduling timing period
1280: Access alignment to global timing period
1320: Control array
1340: Index of an input port
1360: Cyclic signal structure
1370: Index of a control segment
1380: Index of a content segment
1400: Aligned and shifted internal paths within a distributor
1430: Indices of individual time slots within a monitoring period
1470: Case of aligned signal
1480: Case of shifted signal
1490: Indices of potentially overlapping time slots within a monitoring period
1500: Organization of a monitoring period
1520: A specific monitoring period
1540: a time slot (corresponding to a segment) within a monitoring period
1550: A control time slot (a time slot during which a control segment is transferred from an input port of a distributor to the distributors controller)
1560: A content time slot (a time slot during which a content segment is transferred from an input port of a distributor to an output port of the distributor)
1600: Shifted data of a monitoring period
1620: designated control time slot
1640: misaligned control time slot
1650: input-port-specific temporal correction
1700: Alignment at a specific port of a distributor
1720: Drifted signal received during a monitoring period
1730: Required correction
1740: Correction at an active port
1750: Correction at a distributor controller
1800: Scheduling-period time alignment
1820: Expected signal alignment at a specific input port of a distributor
1840: Received aligned signal at the specific input port
1860: Received shifted signal at the specific input port
1900: Organization of a control segment and a content segment received at an input port of a distributor (during a respective control time slot or a respective content time slot) from an originating access node
1912: Segment index within a scheduling period 1140
1921: Null data (Null field)
1924: Control data to controller of the distributor
1926: A specific request from the originating access node to the distributor's controller
1932: Control data from the originating access node to other access nodes linked to the distributor
1934: Control data from the originating access node to a specific access node linked to the distributor
1935: Aggregate control data
1950: Content data to one output port of the distributor
1951: Front marker of a segment (a control segment of a content segment)
1952: Back marker of a segment (a control segment of a content segment)
2000: Exemplary format of segment markers
2010: Data segment (a content segment or a control segment)
2020: Null data (null field) corresponding to a guard time of a time slot
2025: Content data or control data
2060: An indication of time-alignment scheme and a cyclical segment index $\Lambda$
2070: Indication of marker position, e.g., "11111111" versus "00000000"
2080: Marker content
2100: A first example of marker detection
2110: Observation time slot corresponding to an input port of a distributor
2112: A reference control segment
2114: Index of the reference control segment
2141, 2142, . . . , 2146: Examples of misaligned received signal
2200: A second example of marker detection
2241, 2242, . . . , 2246: Further examples of misaligned received signal
2300: Detection time zones within an observation time slot
2310: First detection time zone
2320: Second detection time zone
2330: Third detection time zone
2340: Fourth detection time zone
2400: Further illustration of the detection time zones of FIG. 23
2500: Detected markers for a set of values of signal displacement
2520: Reference control segment 2521 to 2525: displacement cases
2600: Detected markers for a further set of values of signal displacement
2620: Reference control segment
2621 to 2625: displacement cases
2700: Determining signal displacement based on detecting front segment-marker
2702: Guard time δ
2704: Marker duration Θ
2710: Control time slot designated for receiving a control segment for a specific input port of a distributor
2720: Index of an observation time slot (Index of designated control segment)
2721: Front marker of designated control segment
2722: Back marker of designated control segment
2740: Time interval of detected segment from the specific input port
2750: Index of detected segment
2751: Front marker of detected segment
2752: Back marker of detected segment
2800: Determining signal displacement based on detecting back segment-marker
2840: Time interval of detected segment from the specific input port
2850: Index of detected segment
2851: Front marker of detected segment
2852: Back marker of detected segment
2900: Determining signal displacement based on detecting a front segment-marker and a back segment-marker
3000: Time aligning data transmitted from a plurality of access nodes to a distributor
3100: A method of signal alignment comprising processes 3120, 3130, 3140, and 3150
3200: An implementation of process 3150 of verifying or restoring signal temporal alignment at a distributor
3220: Process of detecting a marker
3230: Process of determining time displacement
3240: Process of selecting a subsequent process based on a value of the time displacement
3250: Process of disabling connections from an input port to output ports connecting to access nodes
3260: Process of sending downstream control data informing an access node of a requisite transmission-time correction
3270: Process of extracting control data 3280
3280: Control data (including aggregate control data 1935)
3290: Process of executing control functions according to the control data 3280
3300: Method for determining temporal shift of a signal received at a distributor comprising processes 3310, 3320, 3330, 3340, 3350, 3360, and 3370
3400: Components of a distributor controller
3420: A module for parsing control data
3422: A 1:2 selector
3430: A module for sorting messages according to destination access nodes
3432: Messages directed to individual access nodes
3440: A scheduler for establishing internal paths within a distributor
3442: Messages directed to a scheduler of a distributor
3452: A 2:1 selector
3450: A memory device holding data directed to individual access nodes coupled to distributor dual ports
3460: Logical memory division holding data directed to a respective access node
3500: Processes of communicating scheduling and timing information from a distributor to access nodes
3530: Process of de-queueing schedules and control messages from memory device 3450.
3540: Process of communicating schedules and control messages to respective access nodes through distributor output ports.
3550: Process of detecting scheduling requests (capacity-allocation requests)
3560: Process of activating scheduler 3440
3570: Process of placing new capacity-allocation schedules in respective logical buffers 3460
3580: Process of extracting messages directed to access nodes and placing the messages in respective logical buffers 3460
3600: Signal time alignment to a monitoring period
3610: Cyclical indices of time slots of a periodic monitoring period 1160
3620: Cyclical indices of time slots of a periodic scheduling period 1140
3640: An observation time slot during which no segment is detected
3650: An observation time slot during which a segment is detected but the segment markers indicate signal misalignment
3660: An observation time slot during which a detected signal portion indicates continued signal misalignment or no segment is detected
3670: An observation time slot during which a detected signal portion indicates signal alignment
3680: An instant of time, at the onset of a monitoring period, at which a controller of a distributors prompts a distributing controller to resume signal transfer from a respective locked-out input port
3700: Signal time alignment to a reference scheduling period
3750: An observation time slot during which a segment is detected but the segment markers indicate signal misalignment
3760: An observation time slot during which a detected signal portion indicates continued signal misalignment
3770: An observation time slot during which a detected signal portion indicates signal alignment
3780: An instant of time, at the onset of a scheduling period, at which a controller of a distributors prompts a distributing controller to resume signal transfer from a respective locked-out input port
3800: An example of monitoring-period alignment
3840: Cyclical indices, between 0 and (M−1), of segments of misaligned received signal, M being a number of time slots per monitoring period (M=$\Pi_1$)
3850: Cyclical indices, between 0 and (N−1), N=4×M, of segments of a misaligned received signal during a scheduling period covering four monitoring periods
3860: Cyclical indices, between 0 and (M−1), of segments of a received signal aligned to monitoring-period boundaries (K=4, J=7, M=8)
3870: Cyclical indices, between 0 and (N−1), of segments of a received signal aligned to scheduling-period boundaries
3900: An example of scheduling-period alignment
3960: Cyclical indices, between 0 and (M−1), of segments of a received signal aligned to monitoring-period boundary
3970: Cyclical indices, between 0 and (N−1), of segments of a received signal aligned to the scheduling-period boundary (K=12, J=23, M=32)

DETAILED DESCRIPTION

FIG. 1 illustrates a network 100 of access nodes 120 connecting to bufferless distributors 140 through a plurality of dual inner channels 130. A bufferless distributor has a plurality of bufferless input ports and a plurality of bufferless output ports. Thus, upstream signals arriving from access nodes need be properly timed at source access nodes. Each access node connects to respective plurality of data sources and data sinks through dual access links 110. Each distributor 140 has a time indicator providing a respective reference time 142. The reference time for a distributor of index j is denoted $\tau_j$; for example, the reference time of distributor 140-1 is denoted $\tau_1$ and the reference time for distributor 140(7) is denoted $\tau_7$.

Figure 2:
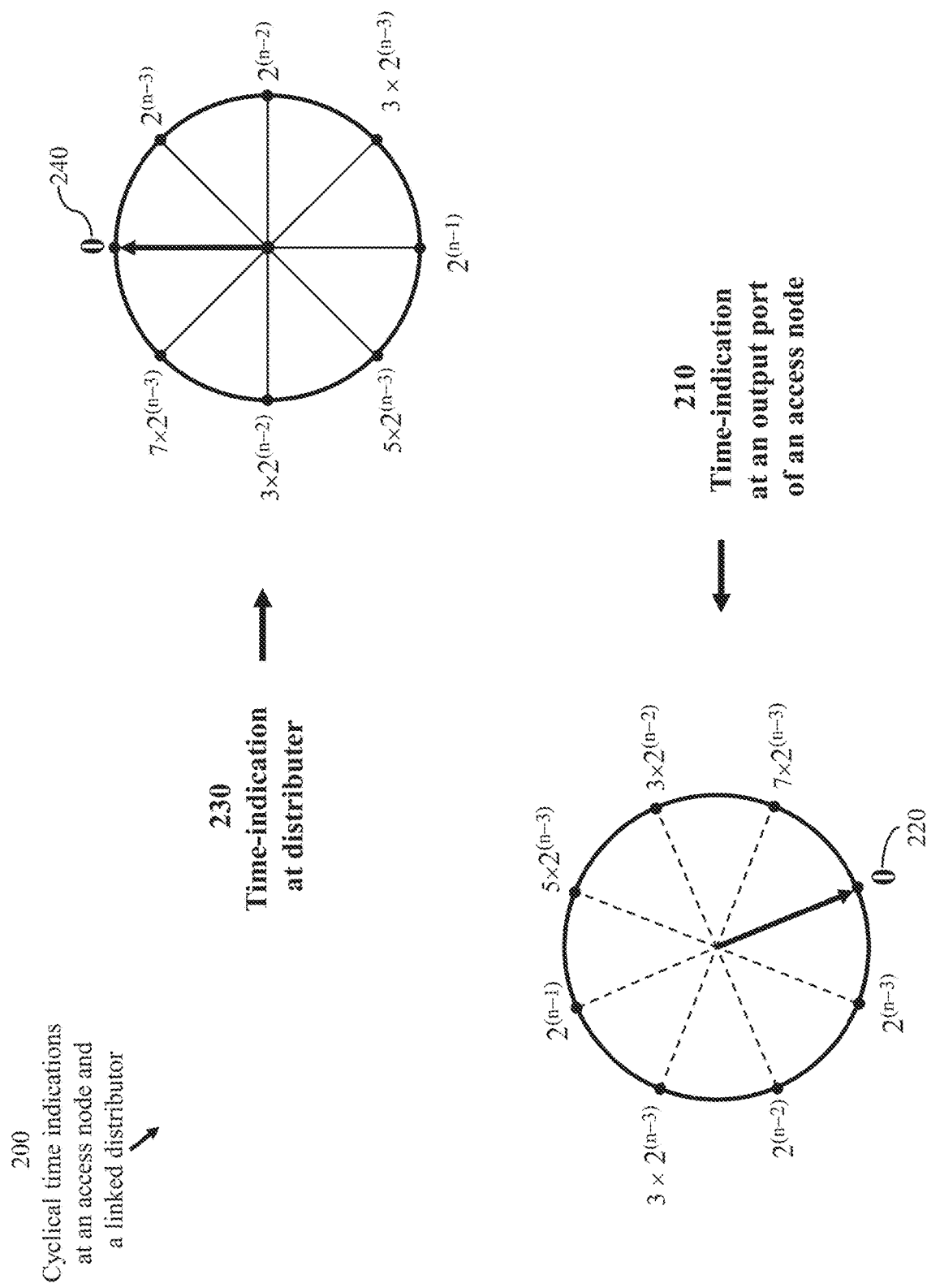
FIG. 2 illustrates an example of time indications at an output port of an access node and at a distributor linked to the access node.

FIG. 2 illustrates an example 200 of time indications at an output port of an access node and at a distributor, where the output port connects to the distributor through a direct channel 130. The time indicator at an access node provides time readings varying cyclically between 0 and a specified cyclical timing period. Time is expressed in terms of an arbitrary time unit such as a nanosecond, for example. The cyclical timing period may be a predefined scheduling period or a global timing period. The scheduling period may be selected to be large enough to permit a wide variation of flow-rate allocation. The global timing period is selected to be larger than the round-trip propagation delay between any access node and any distributor to which the access node connects. Both a global timing period and a scheduling period may be specified, with the global timing period being an integer multiple of the scheduling period.

The time indication varies cyclically between 0 and $(2^n-1)$ time units, where the integer n may be selected to be 24 for a scheduling timing period and 30 for a global timing period, for example. With a basic time-unit of one nanosecond and a time indication read from a 30-bit time counter, for example, the time indication varies cyclically between 0 and $(2^{30}-1)$ time units, i.e., between 0.0 and 1.073741823 seconds. The propagation delay along a fiber-optic path of 100,000 kilometers of a fiber-optical channel is approximately 0.50 seconds. A time indication read from a 24-bit time counter varies cyclically between 0 and $(2^{24}-1)$ time units, i.e., between 0.0 and 16.777215 milliseconds.

All access nodes 120 and all distributors 140 preferably use identical time counters for time indication. The periods of the time counters are equal. However, the cyclical time indications may not be time aligned with respect to a single reference time. As illustrated, the time indication 210 at an output port of an access node and the time indications 230 at a distributor to which the output port of the access node connects have identical, though shifted, cyclical time readings. The difference between the reference time 220 at the output port of the access node and the reference time 240 at the distributor is unknown. With identical clock rates at the access node and the distributor, the scheduling periods at the access node and the distributor are equal.

Conventionally, a distributor (such as a switch) interconnecting multiple access nodes provides an input buffer at each input port of the distributor to enable time alignment of the distributor's input data. A bufferless distributor does not provide input buffers. To realize time alignment of signal received at input ports of a bufferless distributor, the distributor allocates control time slots for each active access node and it is the responsibility of each access node to adjust its time of transmission to the distributor accordingly so that data arrives at the distributor at designated time instants determined at the distributor. Time alignment would be realizable if each access node is aware of the reference time 240 at the distributor and the one-way propagation delay between the access node and the distributor. The input ports and output ports of the access node are equipped with data buffers; hence a distributor need not be aware of the downstream propagation delay to the access node or the reference time at the access node.

The upstream propagation delay from the access node to the distributor is unknown. Likewise, the downstream propagation delay from the distributor to the access node is unknown. The upstream and downstream propagation delays may differ. Thus, although the round-trip propagation delay between an access node and a distributor can be measured with sufficient accuracy, the directional propagation delays may not be determined with sufficient precision.

Figure 3:
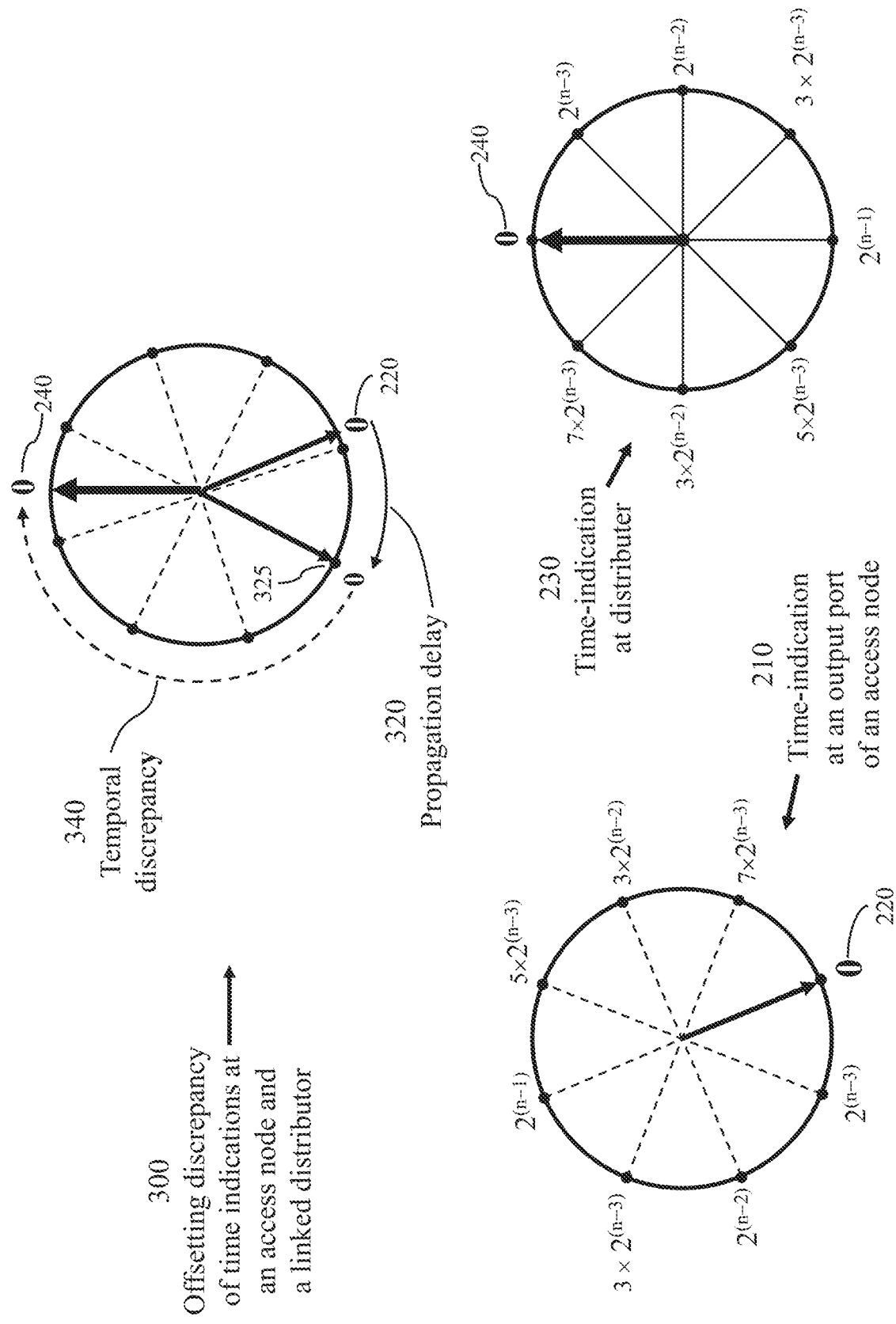
FIG. 3 illustrates discrepancy of time indications at the access node and the distributor.

FIG. 3 illustrates an example 300 of determining discrepancy of time indications at the access node and the distributor of FIG. 2. The temporal discrepancy 340 may be determined based on the propagation delay 320 from the access node to the distributor (which is unknown) and the time difference between the reference time 220 at the output port of the access node and the reference time 240 at the distributor; the time difference is also unknown.

Figure 4:
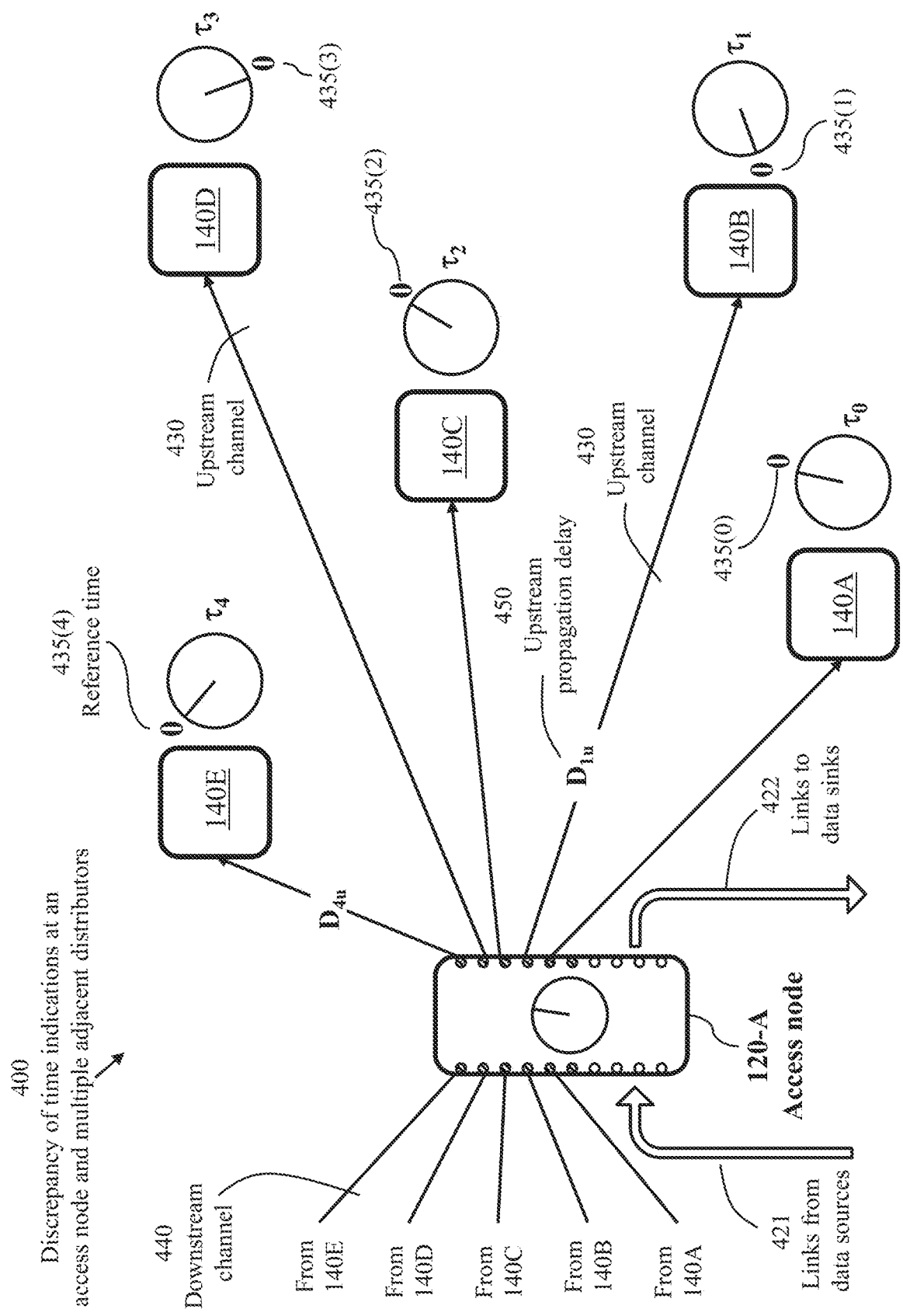
FIG. 4 illustrates discrepancy of time indications at an access node and a plurality of distributors linked to the access node.

FIG. 4 illustrates an example 400 of time indications at an access node 120-A and a number of "adjacent" distributors 140(0), 140(1), 140(2), 140(3), and 140(4), linked to the access node 120-A. A distributor 140 is said to be adjacent to an access node 120, and vice versa, if the access node has a direct path to the distributor, regardless of the length of the path.

Links 421 carry data from data sources to access node 120-A to be routed to the distributors and to links 422. Links 422 carry data from the distributors and from links 421 to data sinks. An upstream channel 430 carries data from an output port of the access node to a respective distributor. A downstream channel 440 carries data from a distributor to a respective input port of the access node.

The time indicators at the distributors, with reference time instants of 435(0) to 435(4), are independent of each other. The upstream propagation delay 450 along an upstream channel from the access node to a distributer 140(j) is denoted $D_{j,u}$, $0 \le j < 5$. Each output port of the access node has a time indicator set to enable time alignment to a distributor to which the output port connects. The downstream propagation delay 460 along a downstream channel is denoted $D_{j,d}$, $0 \le j < 5$.

A cyclic timing period is maintained at each access node 120 and each distributor 140 for enabling a uniform time indication across the network 100. For the purpose of flow-rate allocations for individual data streams, it suffices to use a scheduling period of a sufficient length to permit fine flow-rate allocations.

With a scheduling period of $2^{14}$ time slots, the minimum allocable flow rate to a data stream is R/16384, where R is the capacity of a channel from an access node 120 to a distributor 140. With R=10 Gb/s (Gigabits per second), for example, the minimum allocable flow rate for a data stream is approximately 0.61 Mb/s (megabits per second).

It may be desirable to use time indications based on a global timing period that is larger than the sum of round-trip propagation delay and processing delay between any distributor and any connecting access node. For a global terrestrial network covering the entire planet, the global timing period may be selected to have $2^{20}$ time slots each of duration of a microsecond. The duration of the global timing period would be 1.048576 seconds.

Figure 5:
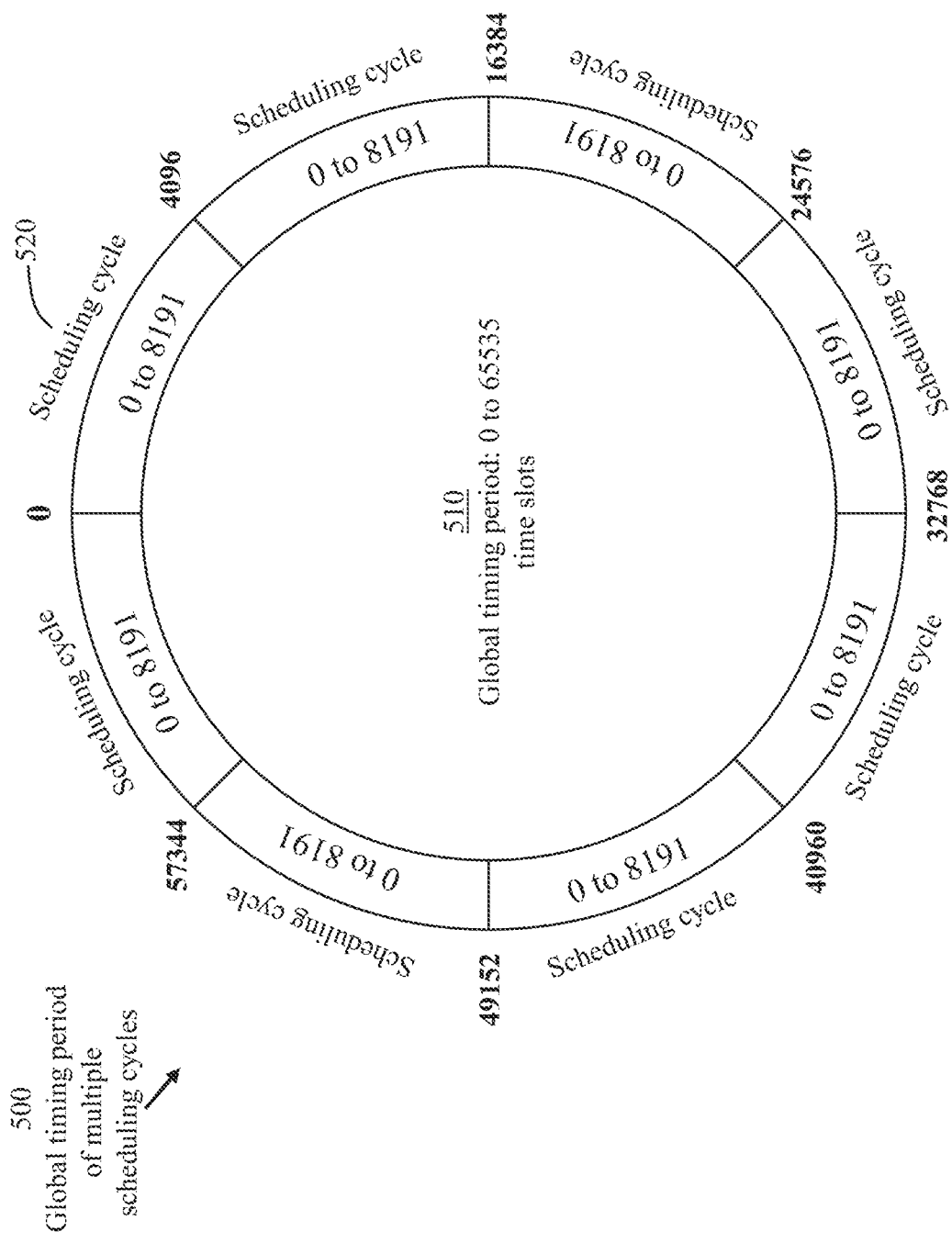
FIG. 5 illustrates an exemplary organization of a global timing period into scheduling time periods.

FIG. 5 illustrates an exemplary organization of a global timing period into eight scheduling periods of 8192 time slots each. Allocating a flow rate for a data stream is preferably based on a scheduling-period.

Figure 6:
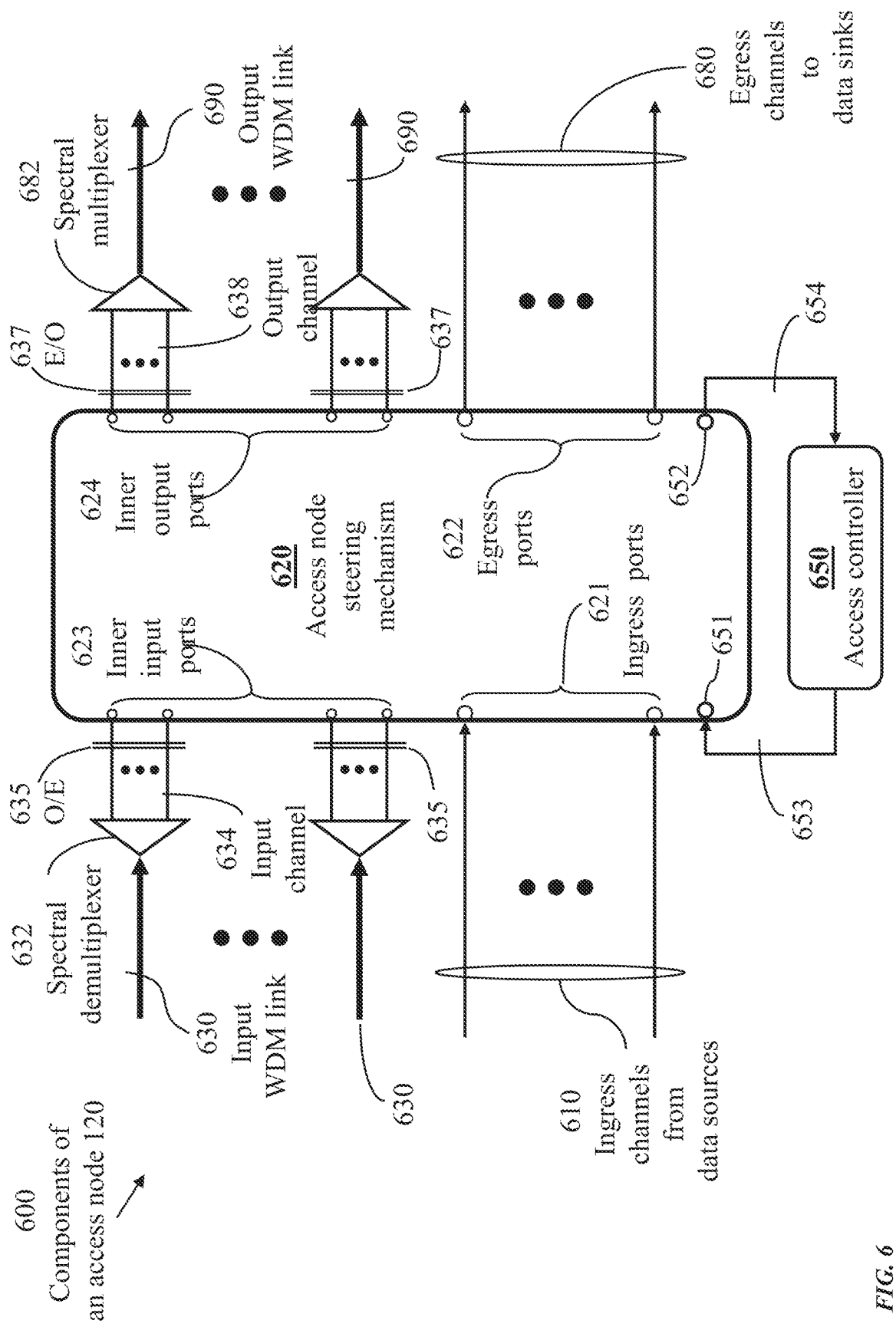
FIG. 6 illustrates connectivity of an access node to data sources, data sinks, and distributors.

FIG. 6 illustrates components 600 of an access node 120 comprising an access-node steering mechanism 620 having a plurality of input ports and a plurality of output ports. The input ports are divided into: (1) ingress ports 621 for receiving data from ingress channels 610 originating from external data sources; (2) inner input ports 623 for receiving data from respective distributors, and (3) a receiving control port 651 coupled to a control channel 653 originating from an output port of access controller 650. The output ports are divided into: (a) egress ports 622 for transmitting data to external data sinks through egress channels 680; (b) inner output ports 624 for transmitting data to respective distributors; and (c) a transmitting control port 652 coupled to a control channel 654 connecting to an input port of access controller 650. A dual ingress channel/egress channel 610/680 may connect to a server or a set of network users.

The access node may receive data from respective distributors through a number of incoming WDM links 630 and transmit data to the respective distributors through outgoing WDM links 690. Each input WDM link 630 carries signals occupying a number of spectral bands. A spectral demultiplexer 632 separates the spectral bands. Input channels 634 coupled to outputs of the spectral demultiplexer 632 connect to a bank of optical-to-electrical converters 635 the output of which is supplied to respective inner input ports 623. Each set of inner output ports 624 connect to a respective bank 637 of electrical-to-optical converters the output of which is supplied through output channels 638 to a spectral multiplexer 682 coupled to a respective output WDM link 690.

Figure 7:
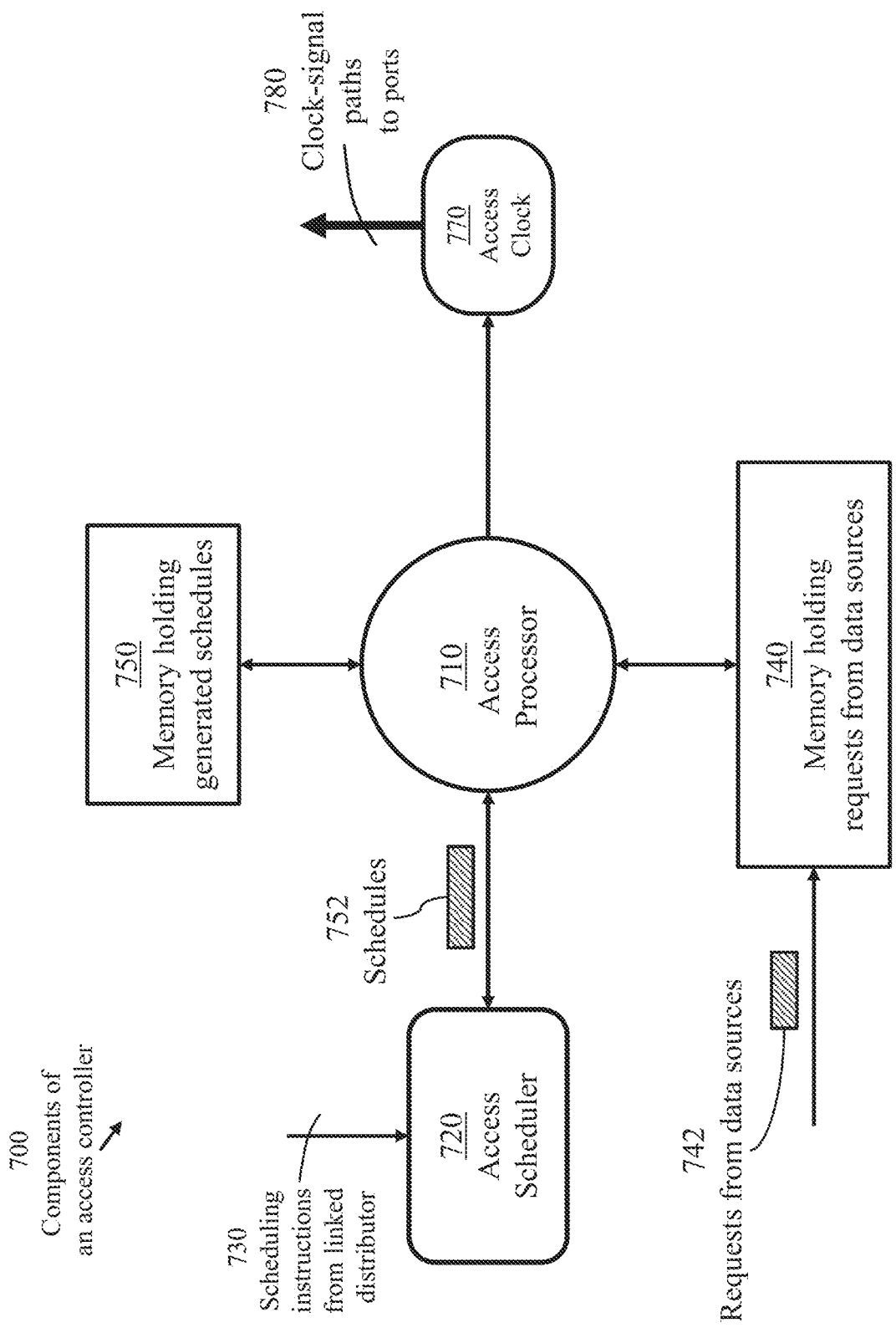
FIG. 7 illustrates components of an access controller, in accordance with an embodiment of the present invention.

FIG. 7 illustrates an example 700 of components of an access controller 650 comprising an access processor 710, an access scheduler 720, a memory device 740 holding requests from data sources, a memory device 750 holding generated schedules for internal paths and upstream paths, and an access-node clock 770.

The access controller receives requests 742 from data sources to transfer data to other access nodes of network 100. Requests for data transfer to other access nodes are directed to one of adjacent distributors selected according to the destination access node. Access scheduler 720 receives scheduling instructions 730 from adjacent distributors and generates schedules 752 to be held in memory 750 then sent to respective input ports of the access node. The access clock 770 distributes clock signals to all ports of the access node through internal clock-signal paths 780.

Figure 8:
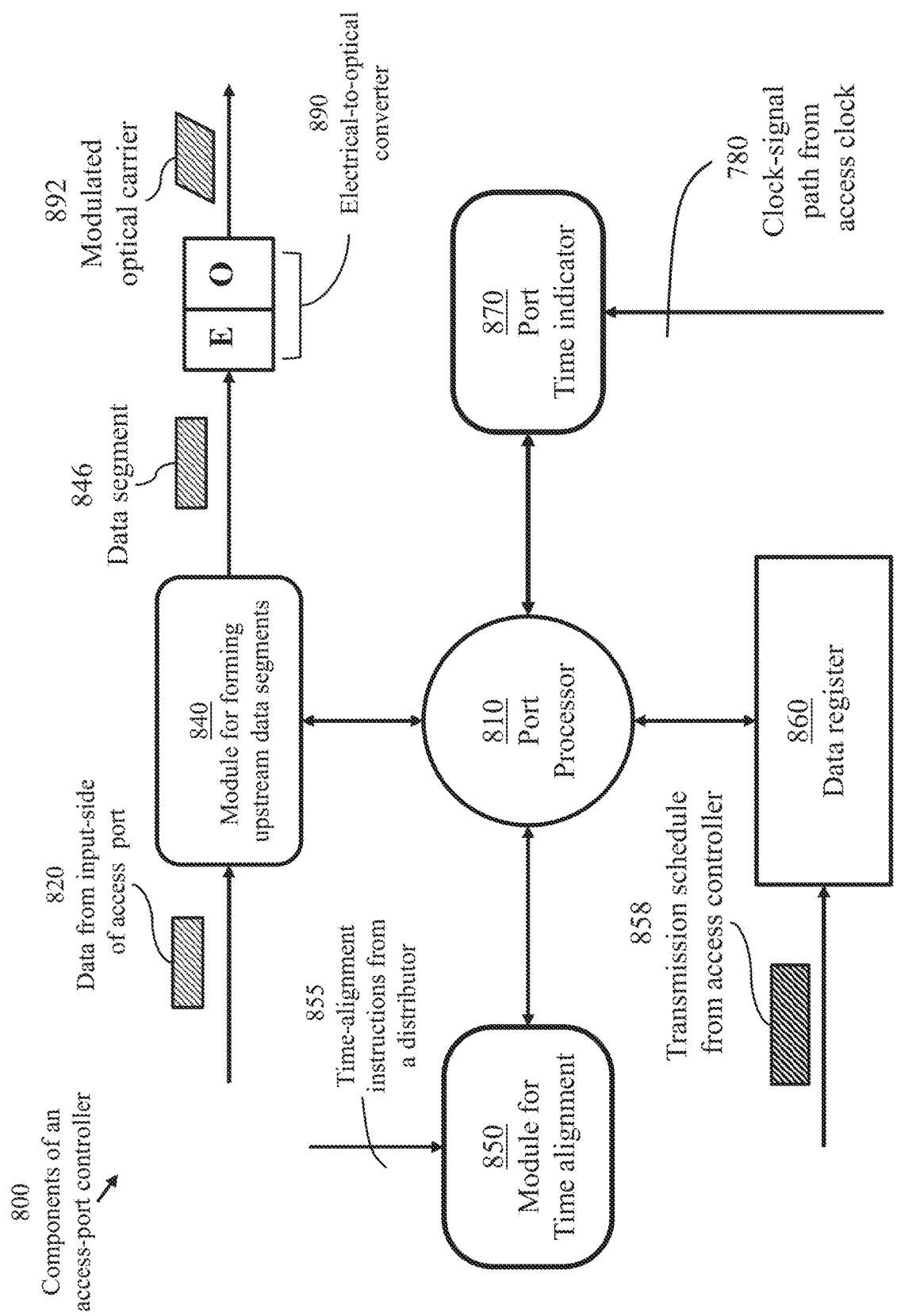
FIG. 8 illustrates components of an access-port controller, in accordance with an embodiment of the present invention.

FIG. 8 illustrates an example 800 of components of an access port controller comprising an access-port processor 810, a data register 860 for holding a transmission schedule received from the access controller 650, a module 850 for time alignment, a port time indicator (a time counter) 870 and a module 840 for forming and transmitting upstream data segments (control segments and content segments). The port time indicator 870 receives a clock signal from access clock 770 through one of internal clock-signal paths 780.

The port controller receives:
(a) data 820 from input side of access port
(b) a transmission schedule 858, from the access controller 650, which is held in data register 860, and
(c) time-alignment instructions 855 from a respective distributor.

Module 850 computes a transmission time, according to port-time indicator 870, for data to be transmitted from the port according to time-alignment instructions 855. Module 840 forms upstream data segments 846 which modulates an optical carrier, using electrical-to-optical converter 890, to produce a respective modulated optical carrier 892.

Figure 9:
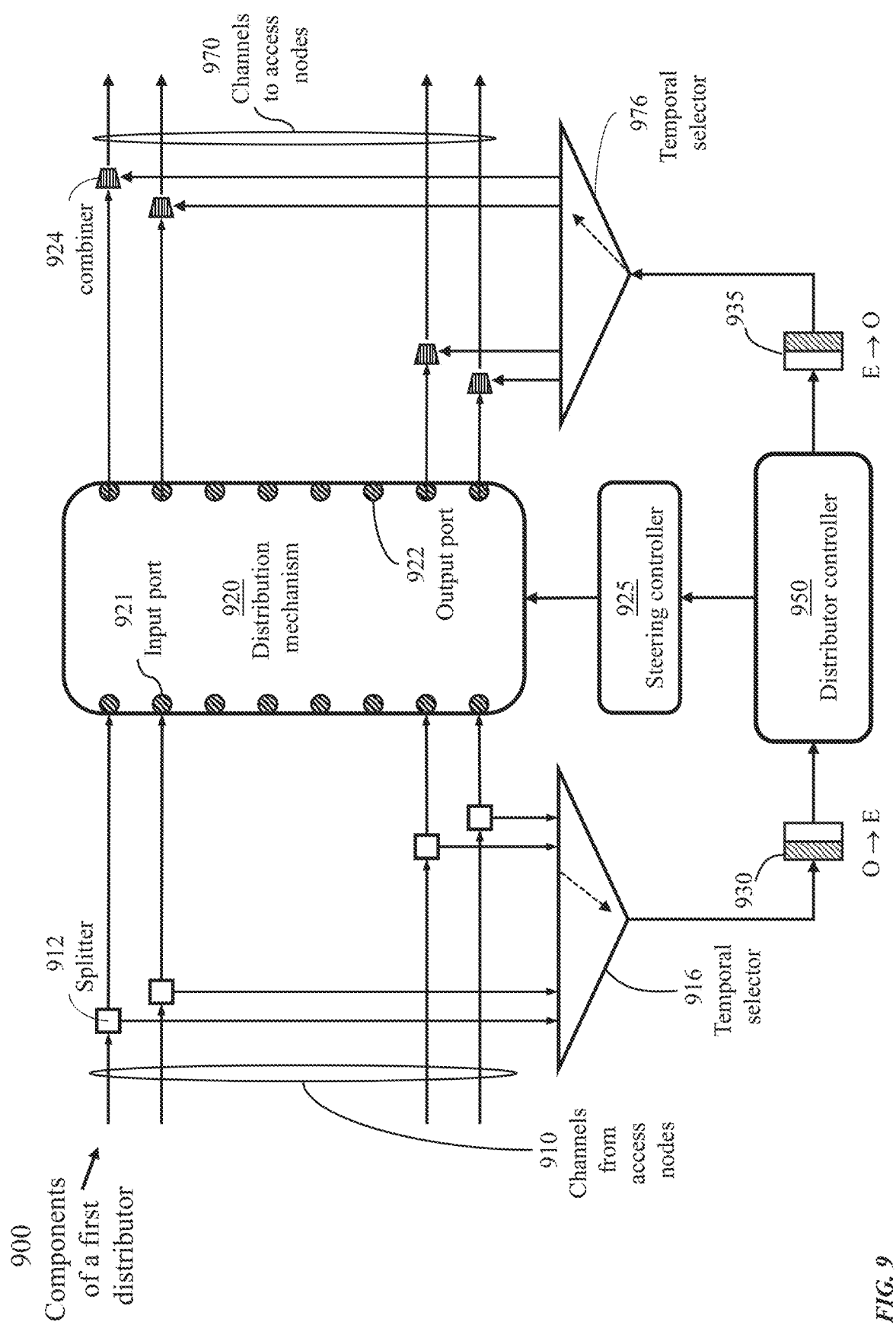
FIG. 9 illustrates components of a distributor of a first distributor configuration, in accordance with an embodiment of the present invention.

FIG. 9 illustrates an example 900 of components of a distributor of a first configuration comprising a distributing mechanism 920, a steering controller 925, and a distributor controller 950. The steering controller 925 directs the distributing mechanism 920 to transfer signals from any input port 921 to any output port 922 according to schedules received from distributor controller 950. Each input port 921 is associated with an optical splitter 912 and each output port 922 is associated with an optical combiner 924.

Upstream control signals, originating from access nodes, are directed from input channels 910 to the distributor controller 950 through input temporal selector (multiplexer) 916. Downstream control signals generated at the distributor controller 950 are directed to access nodes through output temporal selector (demultiplexer) 976 and output channels 970.

An optical splitter 912 splits an incoming optical signal (modulated optical carrier) into a first signal directed to an input port 921 and a second signal directed to input temporal selector 916. Input temporal selector 916 cyclically connects split optical signals from incoming channels 910 to controller 950, during designated time slots, through optical-to-electrical converter 930.

Downstream control signals generated at controller 950 are directed to the output temporal selector 976, through electrical-to-optical converter 935. The output temporal selector 976 cyclically distributes the downstream control signals to optical combiners 924 during designated time slots. An optical combiner 924 associated with an output port 922 merges a respective downstream control signal with an output optical signal transferred to the output port 922 through the distributing mechanism.

Figure 10:
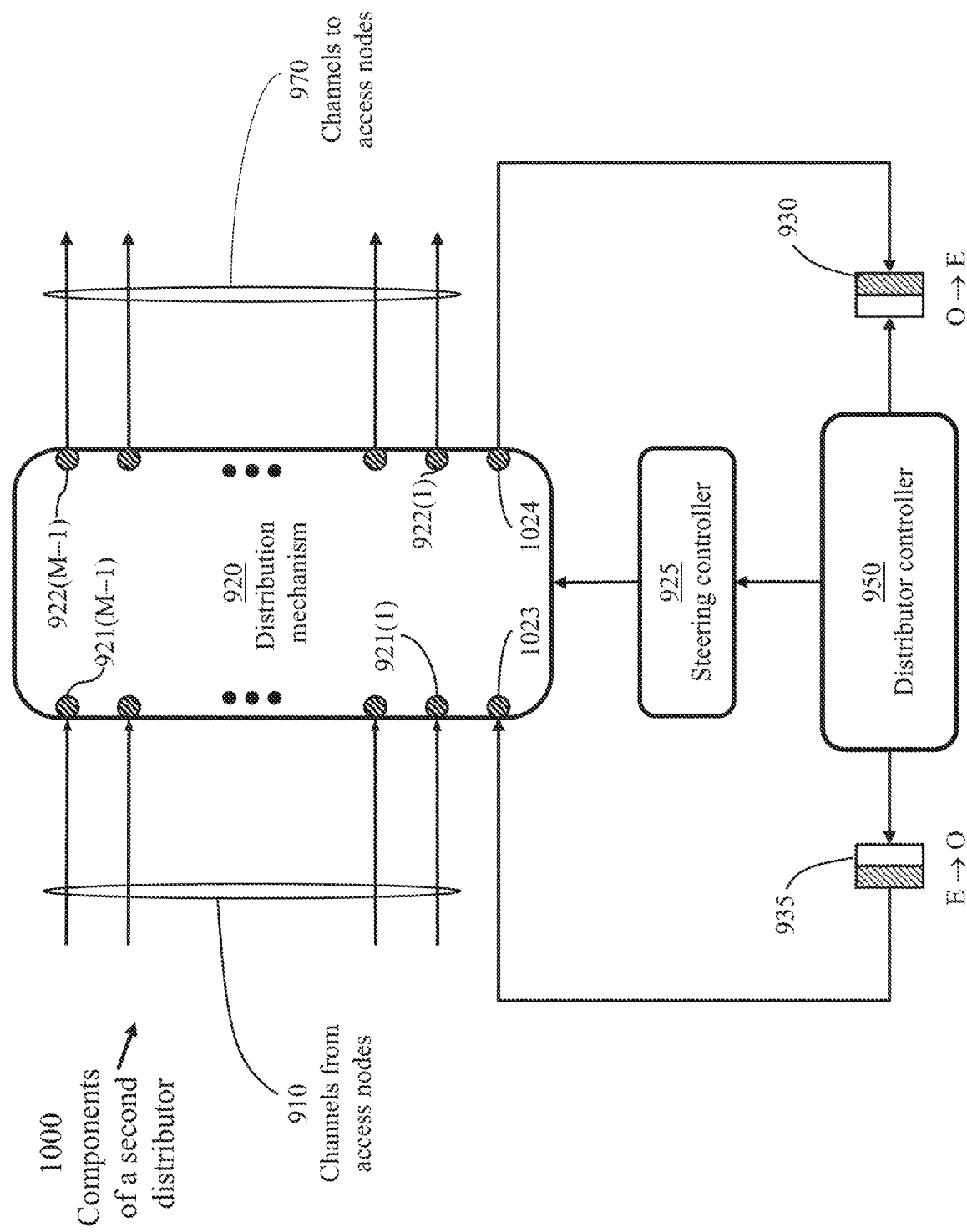
FIG. 10 illustrates components of a distributor of a second distributor configuration, in accordance with an embodiment of the present invention.

FIG. 10 illustrates an example 1000 of components of a distributor of a second configuration comprising a distributing mechanism 920, a steering controller 925, and a distributor controller 950. Unlike the configuration of FIG. 9, one of the input ports, referenced as downstream control port 1023, and one output port, referenced as upstream control port 1024, connect to distributor controller 950.

The steering controller 925 directs the distributing mechanism 920 to transfer signals from input ports 921 and downstream control port 1023 to output ports 922 and to upstream control port 1024 according to schedules received from distributor controller 950. Thus, upstream control signals, originating from access nodes, are directed from input channels 910 to the distributor controller 950 through the distributing mechanism (instead of the input temporal selector 916). Downstream control signals generated at the distributor controller 950 are directed to access nodes through the distributing mechanism 920 (instead of the output temporal selector 976) and output channels 970.

Figure 11:
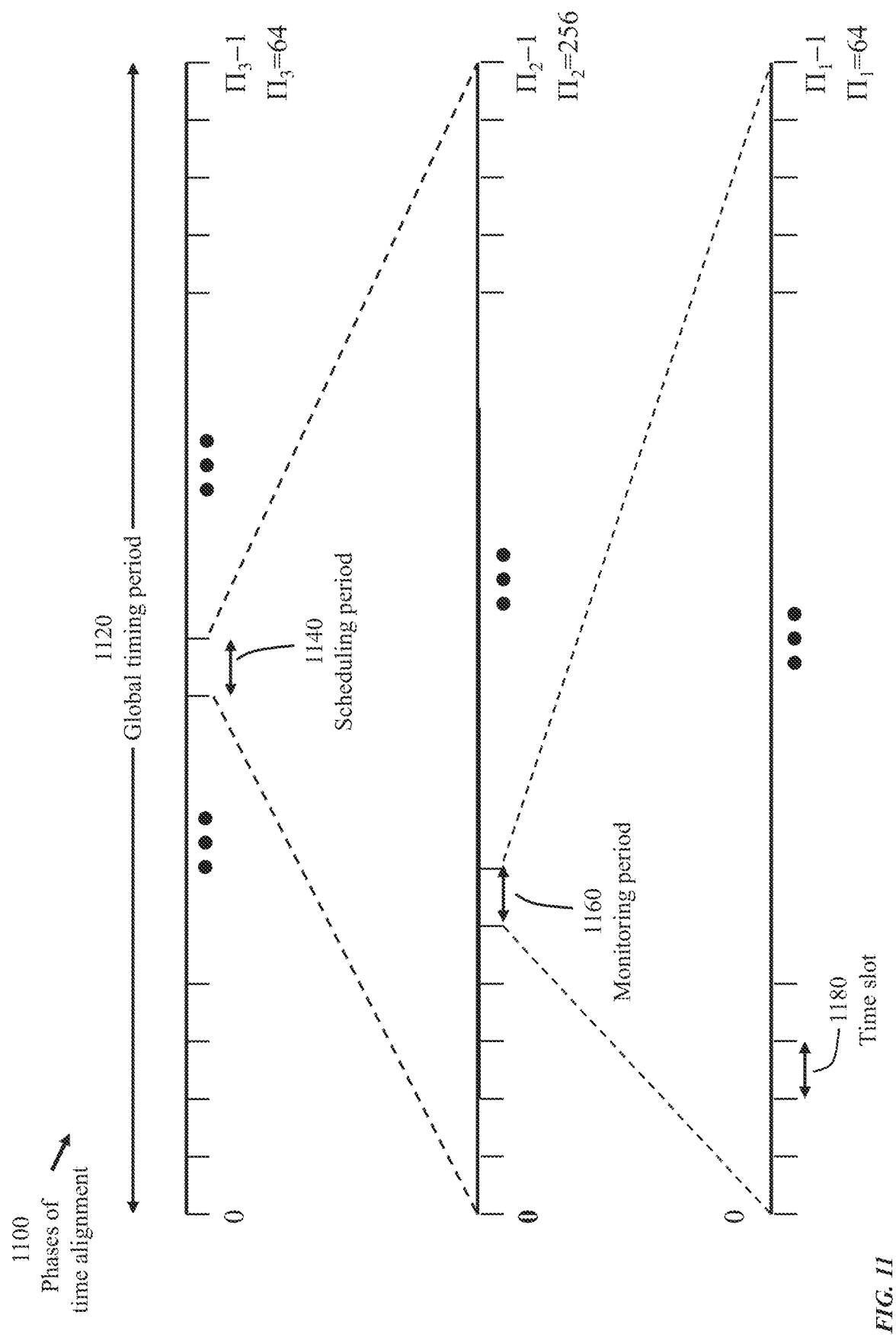
FIG. 11 illustrates phases of time alignment of an access node to a linked distributor, in accordance with an embodiment of the present invention.
Figure 15:
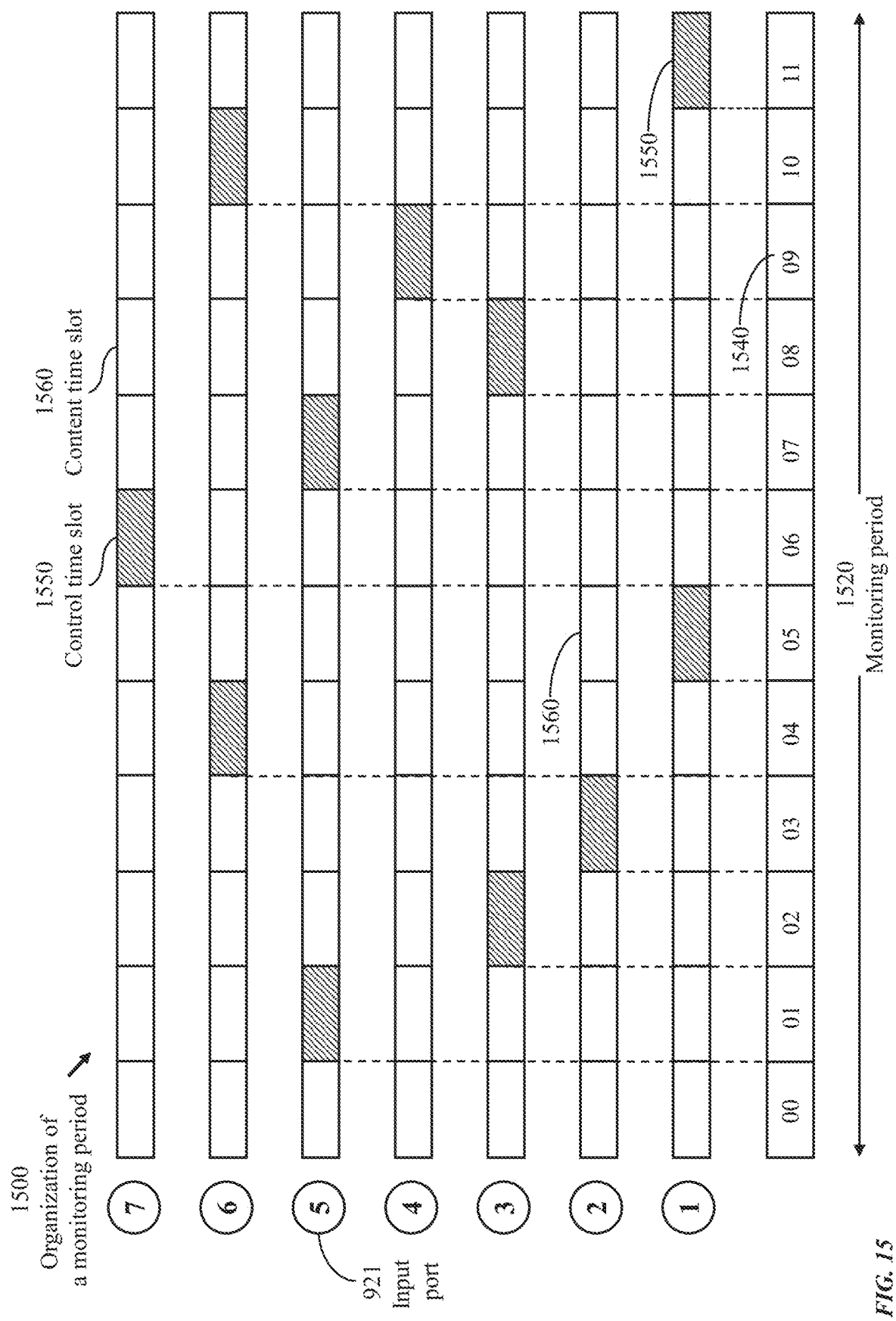
FIG. 15 illustrates an exemplary organization of a cyclical monitoring period into content time slots and at least one control time slot, in accordance with an embodiment of the present invention.

FIG. 11 illustrates phases 1100 of time alignment of an access node to an adjacent distributor. Data transferred from an access node to a distributor is organized into data segments which include control segments and content segments as illustrated in FIG. 15. A data segment is transferred along a communication channel of a predetermined transport capacity during a time slot 1180. In order to maintain time alignment of data received at m input ports of a distributor, m>1, from respective access nodes, the time domain is organised into monitoring periods 1160, each monitoring period comprising a number $\Pi_1$ of time slots at least equal to the number of input ports m.

Flow-rate allocation for data transfer from an access node to a distributor is based on scheduling period 1140 comprising an integer multiple $\Pi_2$ of monitoring periods. Thus, the minimum flow-rate allocation is $R/(\Pi_1 \times \Pi_2)$, R being the transport capacity of a communication channel (40 Gb/s, for example). In order to enable allocation of flow rates at widely-varying rates, $\Pi_2$ is selected to be much larger than 1. In the example of FIG. 11, $\Pi_1=64$, $\Pi_2=256$, thus the minimum flow-rate allocation is R/16384.

It may be desirable (though not necessary) to maintain time alignment of an access node to an adjacent distributor according to the global timing period. Thus, the global timing period 1120 is preferably selected as an integer multiple, $\Pi_3$, of a scheduling period. With $\Pi_3=64$, for example, the global time period comprises 1048576 time slots. As described above, a global timing period is selected to be larger than the round-trip propagation delay between any access node and connecting distributor.

Figure 12:
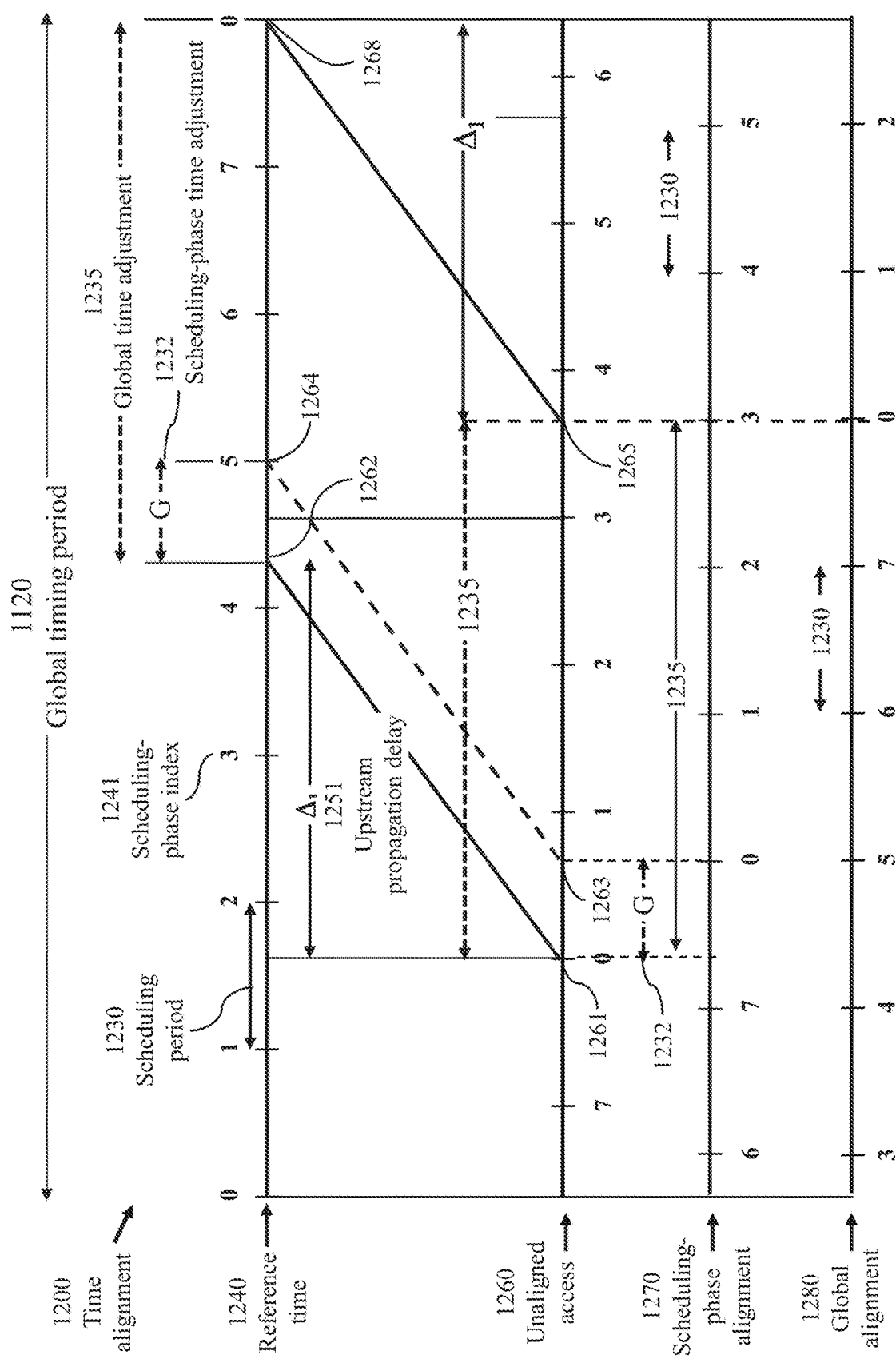
FIG. 12 details a process of time alignment of an access node to a distributor, in accordance with an embodiment of the present invention.

FIG. 12 details a process 1200 of time alignment of an access node to a distributor. For clarity, the global timing period 1120 comprises only eight scheduling periods 1140 ($\Pi_3=8$) indexed as 0 to 7 (reference 1241). A scheduling period of index 0 starts at the beginning of a global reference time 1240. With the temporal positions 1260 of scheduling periods at an access-node output port connecting to the distributor, and with an upstream propagation delay $\Delta_1$ (reference 1251), a data segment transmitted from the output port at the start of the scheduling period of index 0 (instant 1261) arrives at the distributor at time instant 1262 which is not the start of a scheduling period.

To realize scheduling-period alignment, the data segment is transmitted at instant 1263 to arrive at the distributor at the start of the scheduling period of index 5 (instant 1264). Determining the corrective temporal displacement G (reference 1232) is described below with reference to FIG. 27 and FIG. 28. The time indicator at the access-node output port may be adjusted according to the corrective temporal displacement G (reference 1270).

To realize global alignment, the data segment is transmitted at instant 1265 to arrive at the distributor at the start of the global timing period (instant 1268). The time indicator at the access-node output port may be adjusted according to the global temporal adjustment 1235 (reference 1280).

Figure 13:
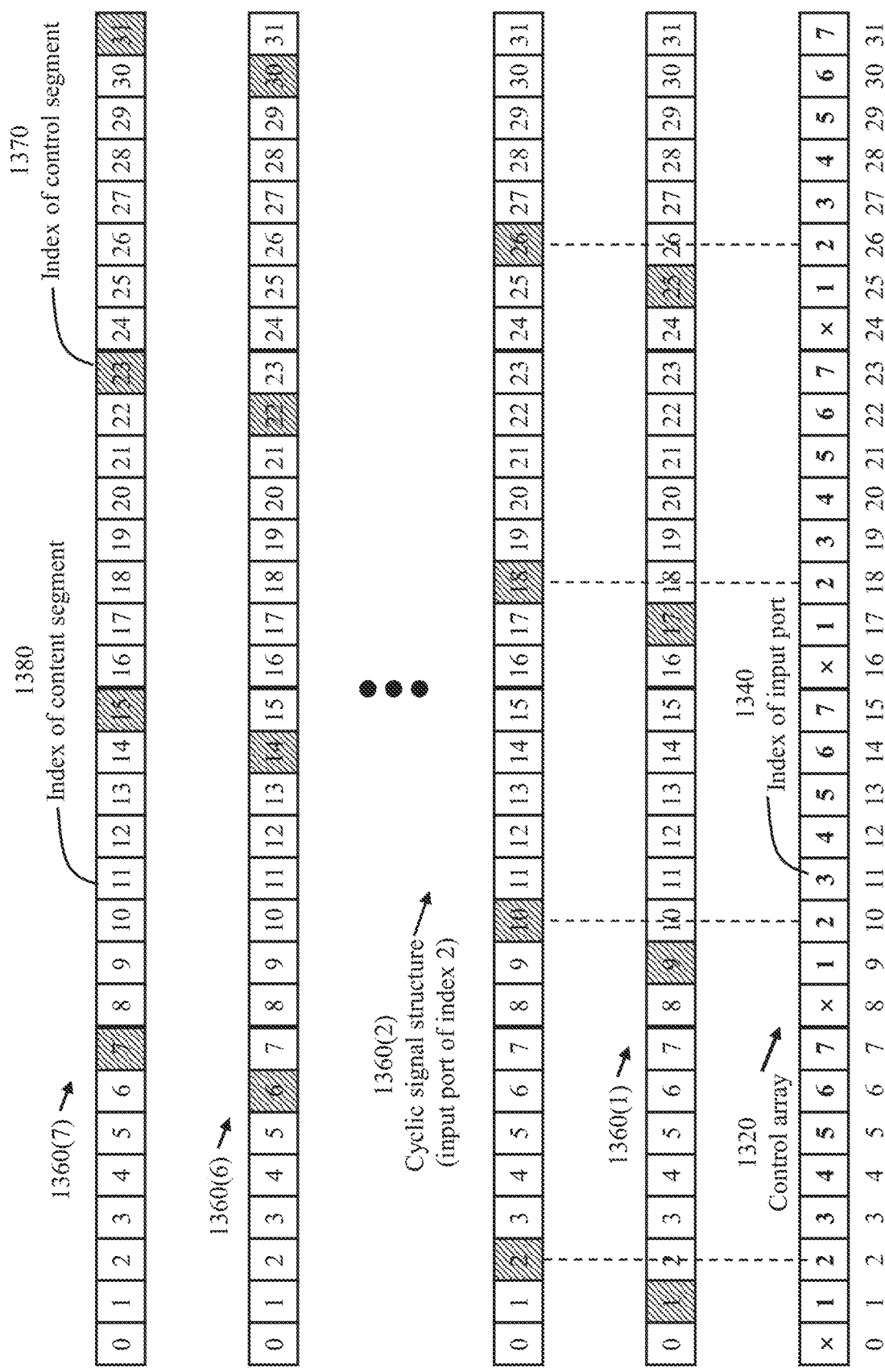
FIG. 13 illustrates structures of signals transmitted from access nodes to a distributor and a control array of observation time slots for ensuring time alignment of signals received at input ports of the distributor, in accordance with an embodiment of the present invention.

FIG. 13 illustrates structures of signals transmitted from access nodes to a distributor and a control array of observation time slots for ensuring temporal alignment of signals received at input ports of the distributor.

A distributor controller maintains a control array 1320 of N entries (N=$\Pi_1 \times \Pi_2$), each entry 1340 holding an index of a dual port of a distributor. For a distributor of an upper bound, m, of dual ports, m>2, where each dual port connects to a respective access node (FIG. 9), the dual ports are indexed as 0 to (m−1). With one dual port connecting to a distributor controller (FIG. 10), the (m−1) dual input ports connecting to access nodes are indexed as 1 to (m−1).

A dual port connecting to an access node receives a signal organized into a cyclic signal structure 1360 of N segments. The signal structure for a dual port of index j, is referenced as 1360(j), 0≤j<m. The segments of a signal structure comprise control segments 1370 and content segments 1380. There is a one-to-one correspondence between the control segments 1370 of signal structures of all dual ports and entries of control array 1320. For a dual port of index 2, for example, segments of indices 2, 10, 18, and 26 correspond to entries of indices 2, 10, 18, and 26 of control array 1320, each of which holding the index of the dual port. Each segment has a specified duration of T time units (T may be specified as one microsecond, for example).

The cyclic signal structure preferably corresponds to a scheduling period 1140 (FIG. 11) which is organized into a number $\Pi_2$ of monitoring periods, with each monitoring period including at least one control segment for periodic verification of signal temporal alignment as will be described below. In the example, of FIG. 13, the number of monitoring periods per signal structure is four. For an envisaged global network, the number of monitoring periods per signal structure may be much larger. For example, with m=64, $\Pi_2$ may be selected as 256, thus enabling allocating a flow rate of a signal stream from one access node to another as integer multiples of R/16384, R being the capacity of a directional channel connecting an access node to a distributor; R=40 Gb/s, for example.

Figure 14:
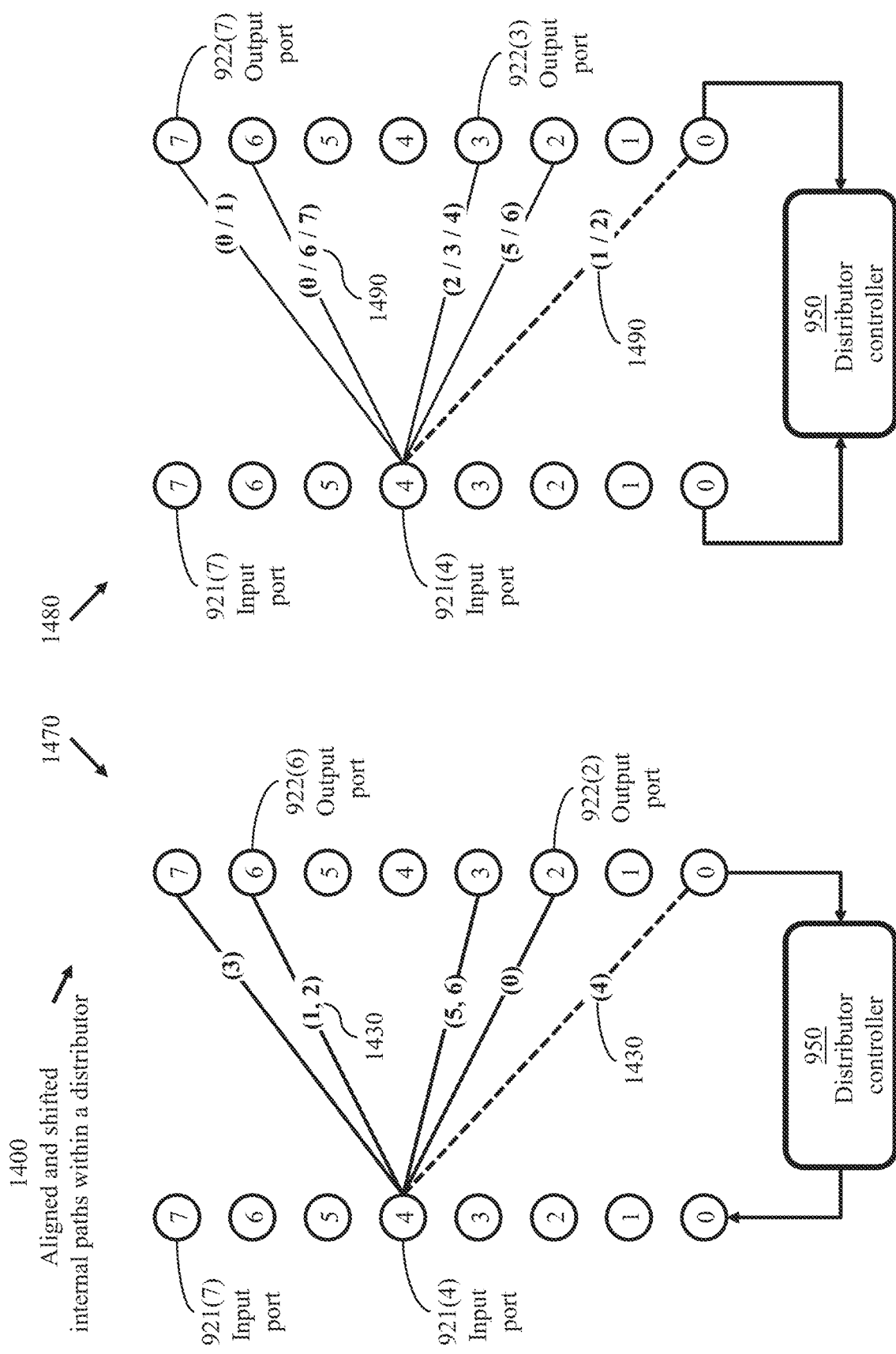
FIG. 14 illustrates signal transfer through internal paths from an input port to output ports of a distributor with and without time alignment of an output port of an access node to the distributor, in accordance with an embodiment of the present invention.

FIG. 14 illustrates an example 1400 of data transfer through internal paths from an input port to output ports of a distributor with and without time alignment to the distributor of a specific access node connecting to input port 921(4). The distributor comprises eight input ports 921, indexed as 0 to 7, and eight output ports 922, indexed as 0 to 7 with the input port of index 0 and output port of index 0 connecting to distributor controller 950.

In the example of FIG. 14, the distributor controller scheduled data transfer from input port 921(4) of to transfer data segments to output ports 922 during respective time slots 1430 as indicated in the table below.

| Output-port index | 0 | 1 | 2 | 3   | 4 | 5 | 6     | 7 |
|---|---|---|---|---|---|---|---|---|
| Time-slot indices | 4 | — | 0 | 5 & 6 | — | — | 1 & 2 | 3 |

When the output port of the specific access node connecting to input port 921(4) is time aligned to the distributor, data segments are received during respective scheduled time slots as illustrated in case 1470. With a temporal displacement of 5.5 time slots, for example, a data segment designated to arrive at output port 922(2) during a time slot of index 0 arrives during a time interval overlapping time slot 5 and time slot 6 (denoted 5/6). Data segments scheduled to arrive during the scheduled time slots (as indicated in the table above) would arrive during respective overlapping time slots 1490 as illustrated in case 1480 and indicated in the table below.

| Output-port index | 0   | 1 | 2   | 3     | 4 | 5 | 6     | 7   |
|---|---|---|---|---|---|---|---|---|
| Time-slot indices | 1/2 | — | 5/6 | 2/3/4 | — | — | 0/6/7 | 0/1 |

According to an implementation, each input port 921 of a distributor shares a port controller with a respective output port connecting to a same access node, the port controller being equipped to detect temporal discrepancy (as described below with reference to FIG. 27 and FIG. 28) between the time of receiving a signal segment and a designated time of arrival of the signal segment. Upon detecting a temporal discrepancy exceeding a predefined tolerance threshold, the port controller: (1) immediately halts signal transfer to output ports 922; (2) communicate the discrepancy to the access node, and (3) resume signal transfer to output ports upon detecting temporal alignment due to correction of transmission time at the access node.

According to another implementation, the distributor controller is equipped to detect temporal discrepancy (as described below with reference to FIG. 27 and FIG. 28) between the time of receiving a control data segment and a designated time of arrival of the control data segment for a respective input port 921. Upon detecting a temporal discrepancy exceeding a predefined tolerance threshold, the distributor controller 950 immediately instructs the distributing mechanism of the distributor to: (1) halt signal transfer to output ports 922; (2) communicate the discrepancy to the access node, and (3) resume signal transfer to output ports upon detecting temporal alignment due to correction of transmission time at the access node. This process is detailed in FIGS. 36-39.

FIG. 15 illustrates an exemplary organization 1500 of a monitoring period 1160 into content time slots 1560 and at least one control time slot 1550. A reference monitoring period 1520 comprises 12 time slots indexed as 0 to 11. Each input port 921 of the distributor is allocated at least one control time slot per timing period. Input port 921 of index 1 is allocated two control time slots of indices 05 and 11. Input port 921 of index 7 is allocated one control time slot of index 06. A control data segment is communicated from an input port 921 to a distributor controller 950 during a control time slot 1550 and a content data segment is communicated to an output port 922 during a respective content time slot.

Figure 16:
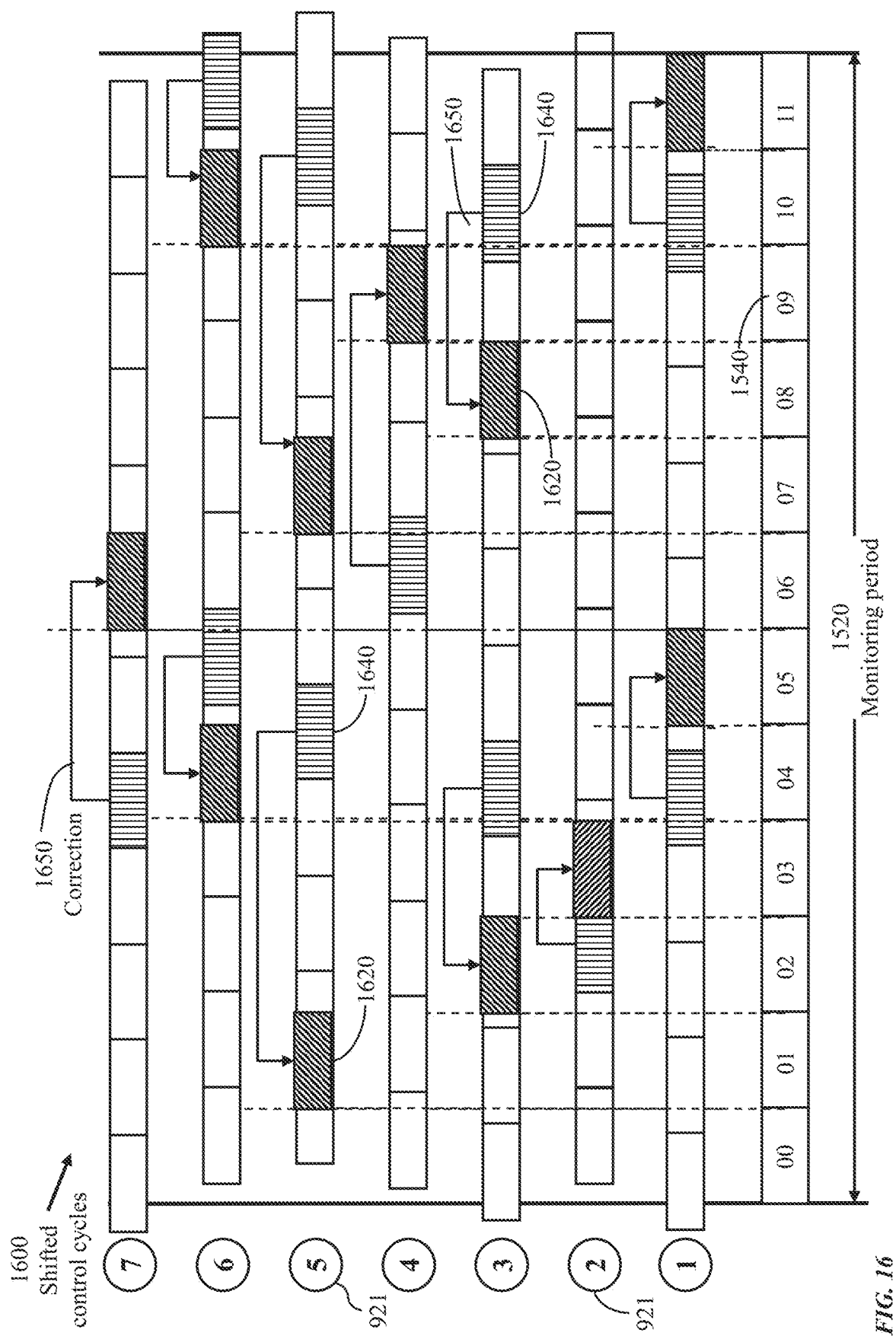
FIG. 16 illustrates a case where signals received at input ports of the distributor are not time aligned to respective designated time slots of a reference monitoring period.

FIG. 16 illustrates a case 1600 where signals received at input ports 921 of the distributor are not time aligned to respective designated time slots of reference monitoring period 1520. The designated control time slots for signals to be received at input ports 921 (referenced 1620) and misaligned control time slots (reference 1640) are indicated. An input-port-specific temporal correction 1650 need be determined to restore time alignment as will be described below with reference to FIGS. 19 to 28.

Figure 17:
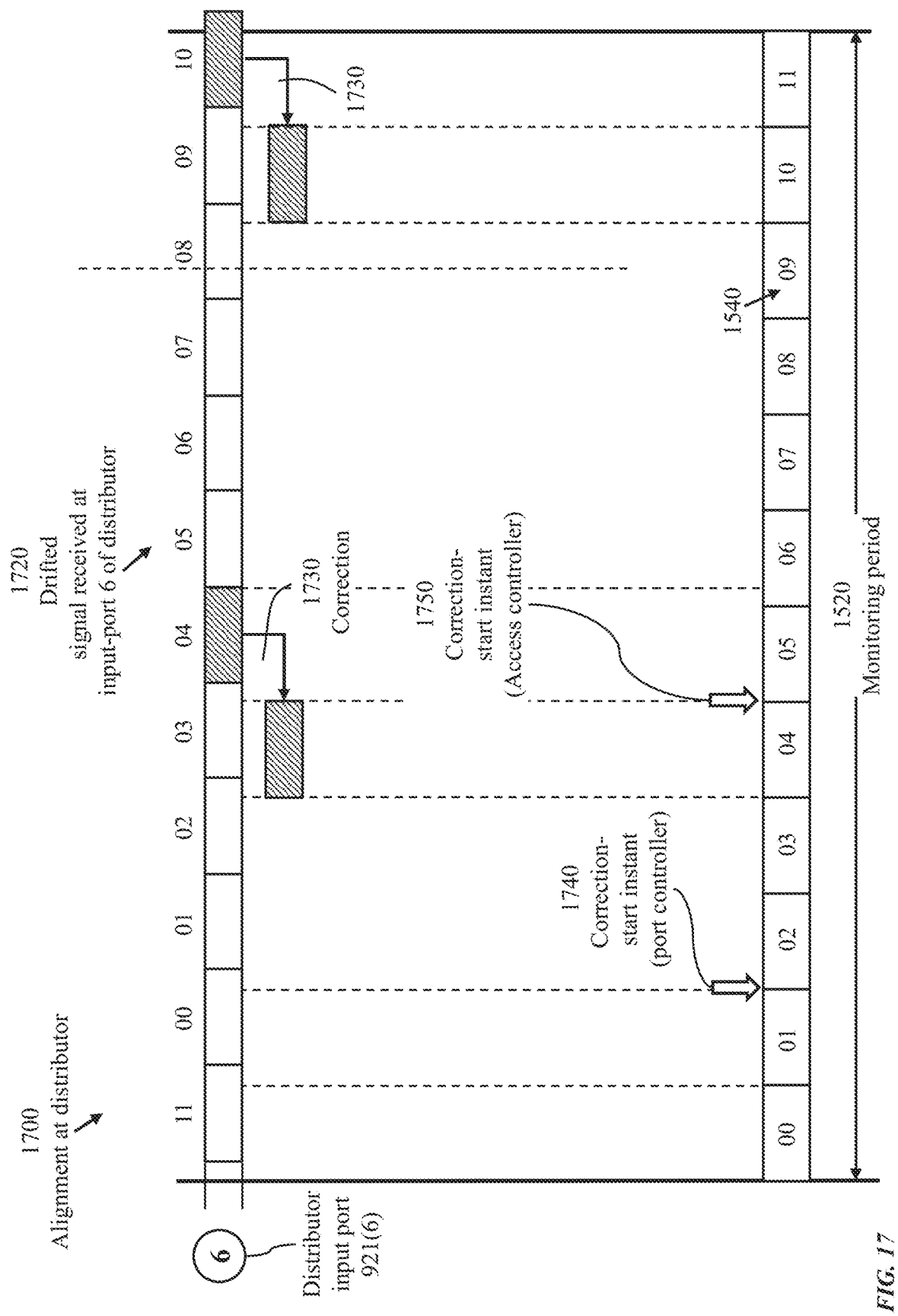
FIG. 17 illustrates an example of time alignment of signals received at an input-port of the distributor.

FIG. 17 illustrates an example 1700 of time alignment of signals to be received at an input-port of the distributor during a reference monitoring period. Referring to distributor 900 (FIG. 9) or 1000 (FIG. 10), the signal stream received at input port 921(6) shifted, as indicated in FIG. 17, so that the control data segment designated to arrive during time slot of index 04 arrived during an interval overlapping the time slots of indices 05 and 06.

The value of a temporal correction 1730 may be determined either at the distributor controller (950, FIG. 9, FIG. 10) or at a controller of an active dual port 921/922 of the distributor, if the input port is configured as an active port comprising a controller.

With temporal correction performed at the distributor controller 950, if the control segment designated to reach distributor controller 950 during time slot 1540 of index 04, the distributor controller 950 takes corrective action at the end of time slot 1540 of index 04 (reference 1750).

With temporal correction performed at a specific active dual port 921/922 of a distributor, the deviation of any content time slot may be detected and action is taken immediately. Thus, if the deviation of a segment (control segment or content segment) designated to arrive at input port 921(6) of the distributor is detected during time slot 1540 of index 01 within reference monitoring period 1520, corrective action is taken at the end of the content time slot (reference 1740).

A corrective action requires: (1) halting signal transfer from the input port 921 of the specific active dual port 921/922 to all output ports 922 of all other dual ports of the distributor; and (2) communicating a requisite temporal correction to an access node connecting to the specific active dual port.

Resuming signal transfer to output ports 922 of all other dual ports takes place upon restoration of temporal alignment.

The corrective action described below with reference to FIGS. 27 to 35 is performed at the distributor controller.

Figure 18:
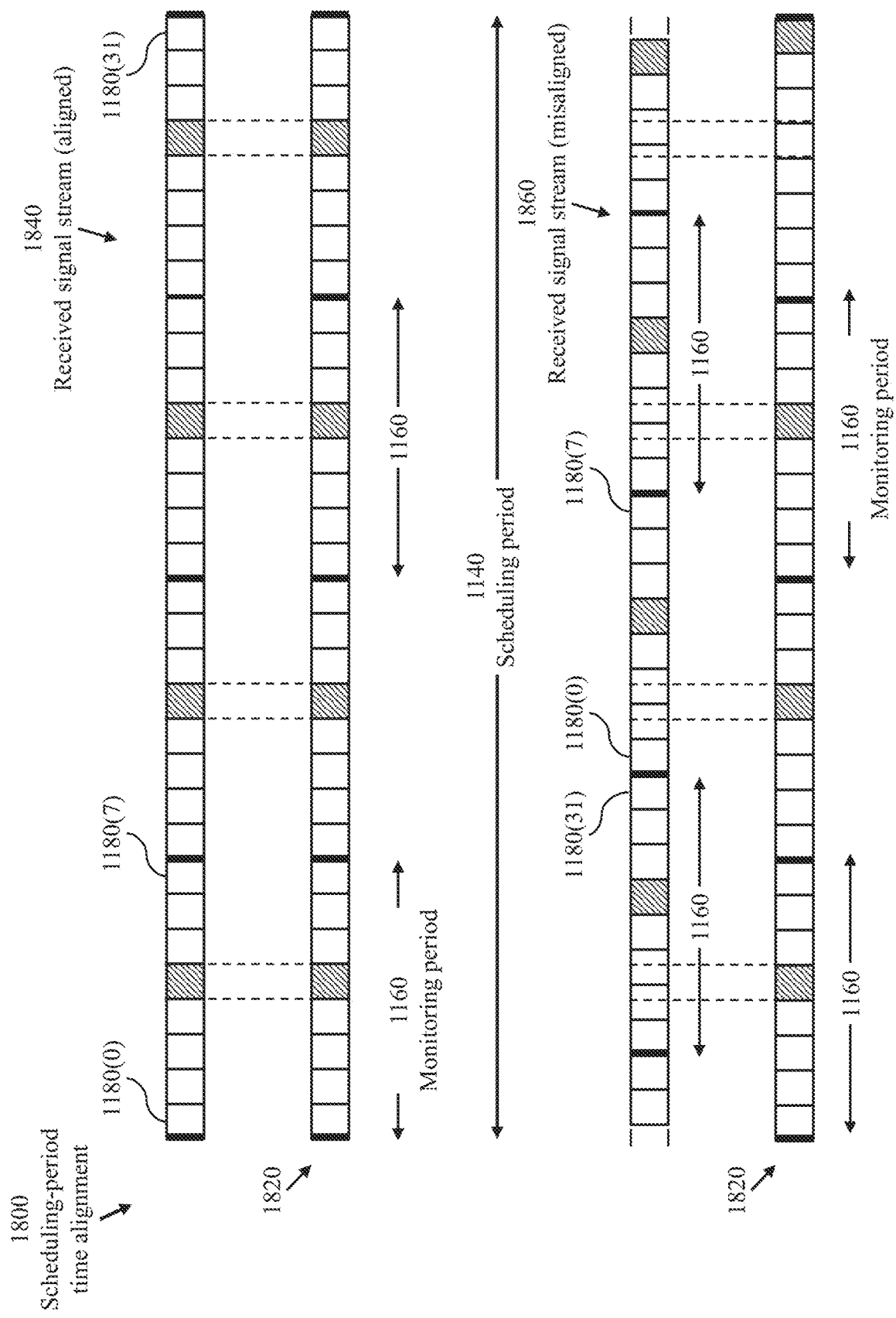
FIG. 18 illustrates a scheme of measuring scheduling-period misalignment at a specific input port of a distributor for an exemplary case of a scheduling period comprising only four monitoring periods with each monitoring period comprising eight time slots.

FIG. 18 illustrates a case 1800 of scheduling-period based alignment for an exemplary scheduling period 1140 comprising only four monitoring periods 1160 with each monitoring period comprising eight time slots 1180. The time slots of each scheduling period are indexed as 0 to 31. In a first scenario, a signal stream 1840 received at a specific input port 921 is time aligned to a designated scheduling cycle 1820 so that individual data segments arrive at designated time slots of the scheduling period. In a second scenario, a signal stream 1860 received at the specific input port 921 is time shifted with respect to the designated scheduling cycle 1820 so that individual data segments arrive at time slots that do not coincide with respective designated time slots of the designated scheduling cycle. For flow-rate allocation, signal stream 1860 may be aligned to any scheduling period.

Segment Markers

Figure 19:
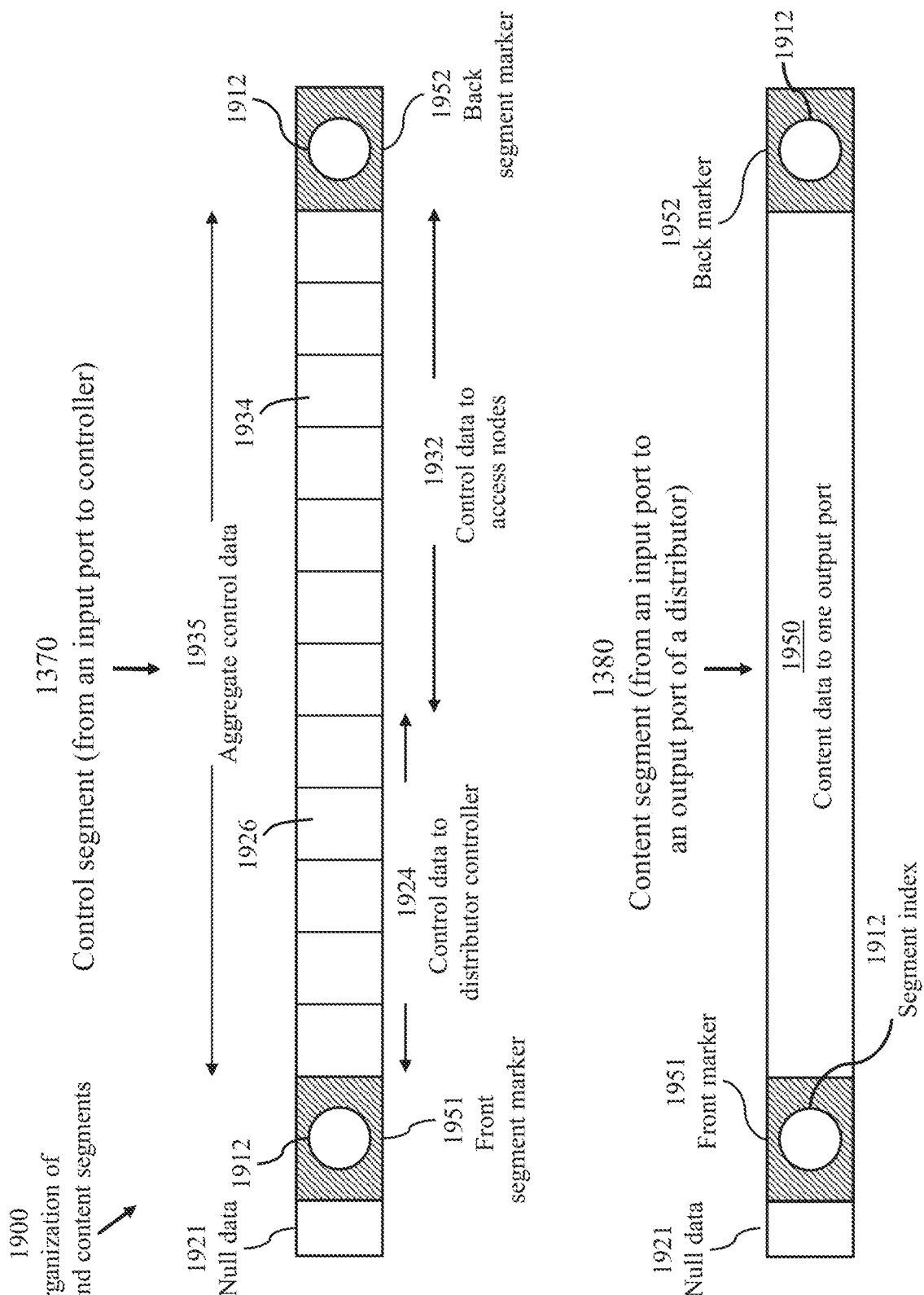
FIG. 19 illustrates organization of a control segment and a content segment received at an input port of a distributor from an originating access node, each of the control segment and the content segment includes a front segment-marker and a back segment-marker, in accordance with an embodiment of the present invention.

FIG. 19 illustrates organization 1900 of a control data segment and a content data segment received at a specific input port of a distributor from an originating access node.

A control segment 1370 received at the specific input port of the distributor during a control time slot 1550 is directed to the controller 950 of the distributor either through a temporal selector 916 (FIG. 9) or through the distributing mechanism 920 of the distributor (FIG. 10). A control segment comprises: (1) null data (null field) 1921 (for a guard time δ), (2) a front marker 1951 of duration Θ indicating segment index 1912 within a scheduling period (i.e., between 0 and ($\Pi_1 \times \Pi_2 - 1$)), (3) aggregate control data 1935, and (4) a back marker 1952 of duration Θ indicating segment index 1912. The aggregate control data 1935 comprises control data 1924 directed to the distributor controller 950 and control data 1932 directed to individual distributor output ports 922, hence to respective access nodes. Control data 1924 comprises a number of specific requests 1926 from an originating access node connecting to the specific input port of the distributor to the distributor's controller. Control data 1932 comprises destination-specific control data 1934 from the originating access node to a specific destination access node adjacent to the distributor.

A content segment 1380 received at the specific input port of the distributor during a control time slot 1560 is directed to one of the output ports of the distributor through the distributing mechanism of the distributor.

A content segment comprises: (1) null data 1921 (for a guard time), (2) a front marker 1951 indicating segment index 1912 within a scheduling period, (3) Content data 1950 to one output port of the distributor, and (4) a back marker 1952 indicating segment index 1912.

Figure 20:
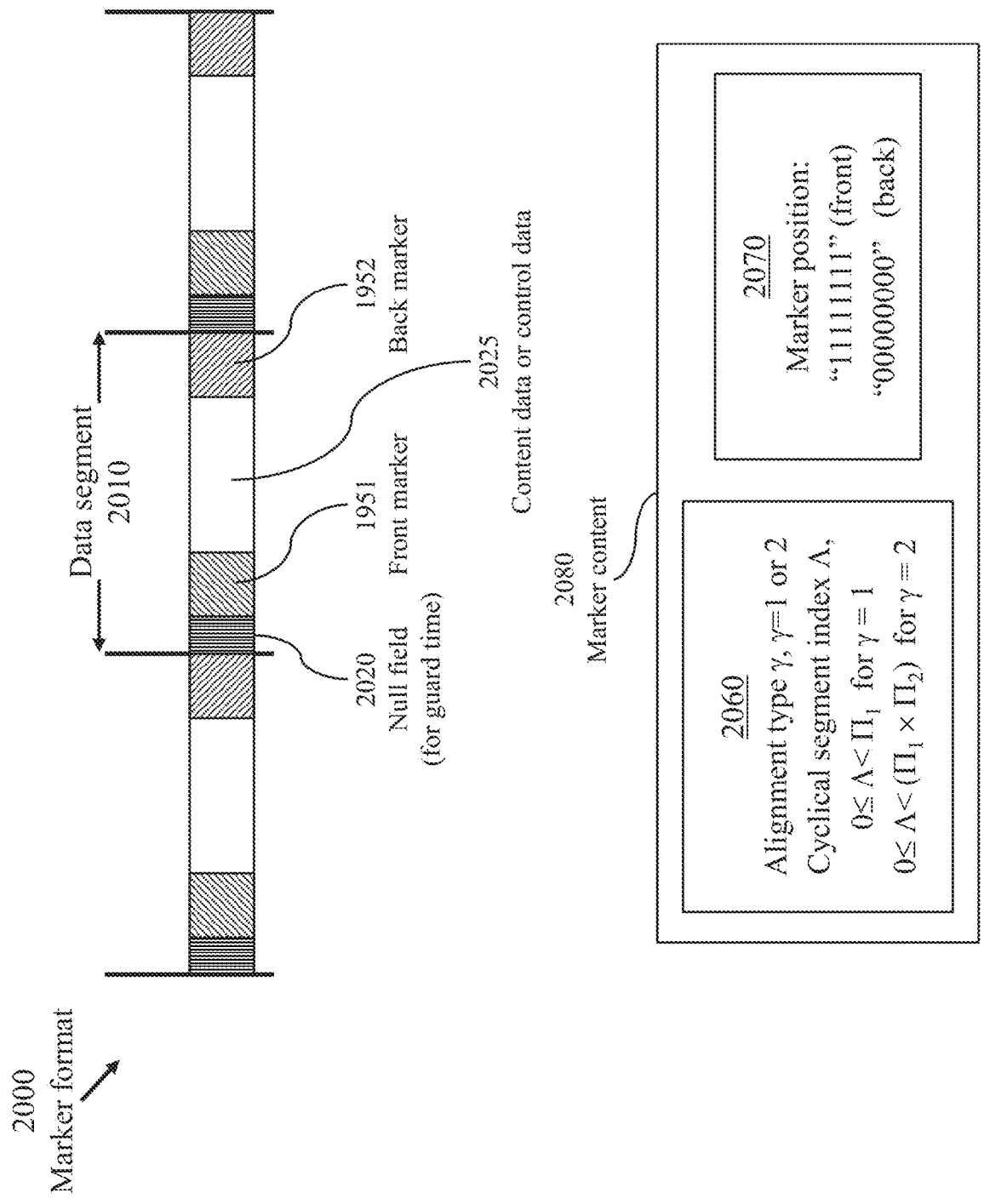
FIG. 20 illustrates an exemplary format of segment markers, in accordance with an embodiment of the present invention.

FIG. 20 illustrates an exemplary format 2000 of a segment marker. Each data segment 2010, which is either a content segment 1380 or a control segment 1370, is structure to contain null data 2020, a front marker 1951, content data or control data 2025, and a back marker 1952. A time slot is the duration of propagation of a data segment. The purpose of including null data 2020 is to introduce a guard time preceding acquisition of the front marker 1951 during a time slot. The segments of a data stream modulate an optical carrier. The term "signal" is used herein to refer to a modulated optical carrier. Preferably, signals are transferred through a distributor without demodulation an input. The segments of the data stream are identified according to cyclical indices. According to a first scheme of signal time alignment, the cyclical indices are bound between 0 and ($\Pi_1 - 1$), $\Pi_1$ being the number of time slots of a monitoring period 1160. According to a second scheme of signal time alignment, the cyclical indices are bound between 0 and $(\Pi_1 \times \Pi_2 - 1)$, $\Pi_2$ being the number of monitoring period 1160 per scheduling period 1140.

A marker 1951 or 1952 contains a first field 2060 indicating alignment type γ and the cyclical index of a corresponding segment, and a second field 2070 indicating the position of the marker within a segment. The alignment type, γ, is set to 1 to indicate monitoring-period alignment or set to 2 to indicate scheduling-period alignment. The cyclical segment index, denoted Λ, takes the values $0 \le \Lambda < \Pi_1$ if γ=1 or $0 \le \Lambda < (\Pi_1 \times \Pi_2)$, if γ=2. The indication 2070 of marker position, takes one of two values, for example, a value of "11111111" indicates a front marker and a value of "00000000" indicates a back marker.

Figure 21:
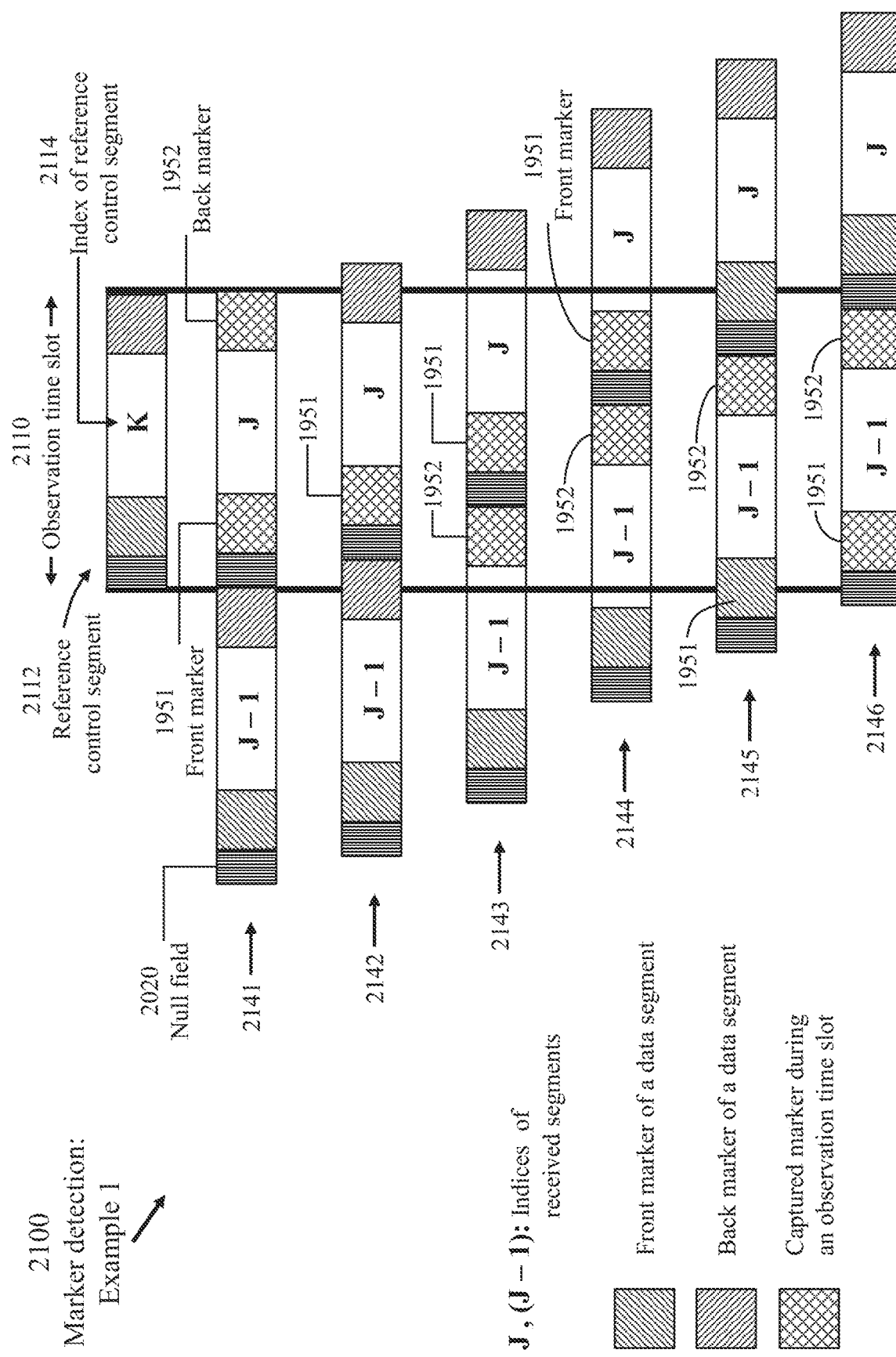
FIG. 21 illustrates marker detection during an observation time slot for several instances of received misaligned signals.

FIG. 21 illustrates examples 2100 of marker detection during an observation time slot for several instances of received misaligned signals. During an observation time slot 2110, corresponding to a specific input port of a distributor 1000, the distributing mechanism 920 directs the signal received at the specific input port to upstream control port 1024 which directs the signal to the optical-to-electrical converter to detect the modulating portion of the data stream. The modulating portion is herein referenced as the "received data string". A received data string may span two data segments due to misalignment of the received signal. For example, received signal 2141 contains one segment of index J which is closely time aligned to the boundaries of reference control segment 2112. Controller 950 is then able to detect the contents of both the front marker and the back marker. The content and position of one of the markers are used to determine time alignment, or otherwise, of received signal 2141. Signal 2141 would be treated as time aligned only if J=K.

Figure 22:
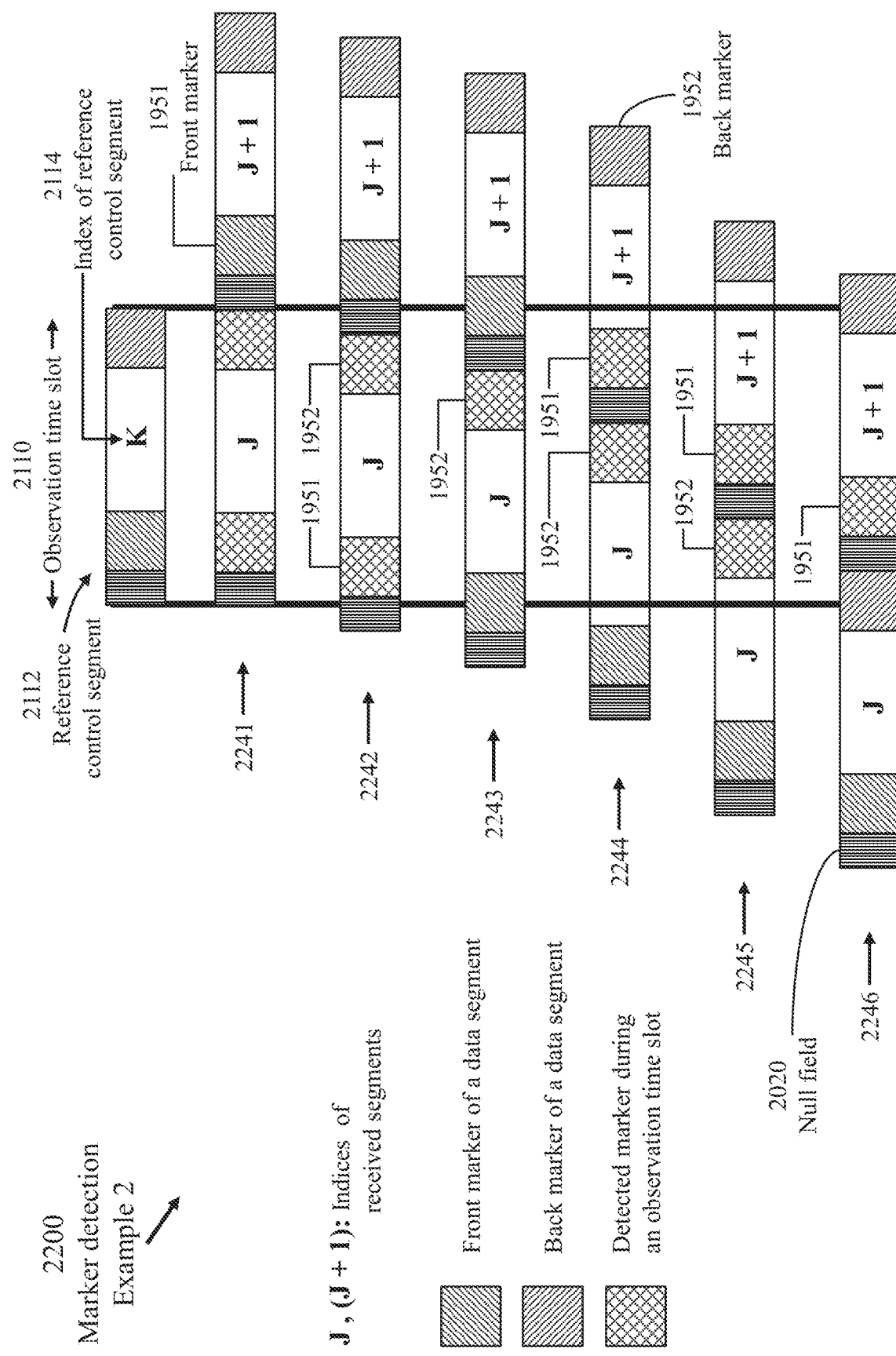
FIG. 22 illustrates marker detection during the observation time slot for further instances of received misaligned signals.

The reference numerals 1951 and 1952 are used received at the specific input port of the distributor during a control time slot 1550 FIG. 21 and FIG. 22 only to distinguish a front marker and a back marker, respectively, regardless of the particulars of a segment under consideration.

Received signal 2142 contains a portion of the back marker of a segment of index (J−1) and the complete front marker 1951 of a segment of index J. The position and content of the front marker are sufficient to determine the time displacement of signal 2142.

Received signal 2143 contains the complete back marker of a segment of index (J−1) and the complete front marker of a segment of index J. The position and content of either of the two markers are sufficient to determine the time displacement of signal 2143. As described below (FIG. 29), when two markers are detected, the computed time displacement based on one of the markers is identical to the time displacement based on the other marker.

Received signal 2144 also contains the complete back marker of the segment of index (J−1) and the complete front marker of the segment of index J.

Received signal 2145 contains the complete back marker of a segment of index J. The position and content of the back marker are sufficient to determine the time displacement of signal 2145.

Received signal 2146 contains a complete front marker and a complete back marker of a segment of index (J−1). The position and content of either of the two markers are sufficient to determine the time displacement of signal 2146.

FIG. 22 illustrates examples 2200 of marker detection during the observation time slot 2110 for further instances of received misaligned signals.

Received signal 2241 contains a complete front marker and a complete back marker of the segment of index J.

Received signal 2242 contains the complete front marker and a complete back marker of the segment of index J. The signal needs alignment even if J=K because the boundaries of segment are not time aligned to the boundaries of the reference control segment 2112.

Received signal 2243 contains the complete back marker of the segment of index J.

Received signal 2244 contains the complete back marker of the segment of index J and the complete front marker of the segment of index (J+1).

Received signal 2245 contains the complete back marker of the segment of index J and the complete front marker of the segment of index (J+1).

Received signal 2246 contains the complete front marker of the segment of index (J+1).

Figure 23:
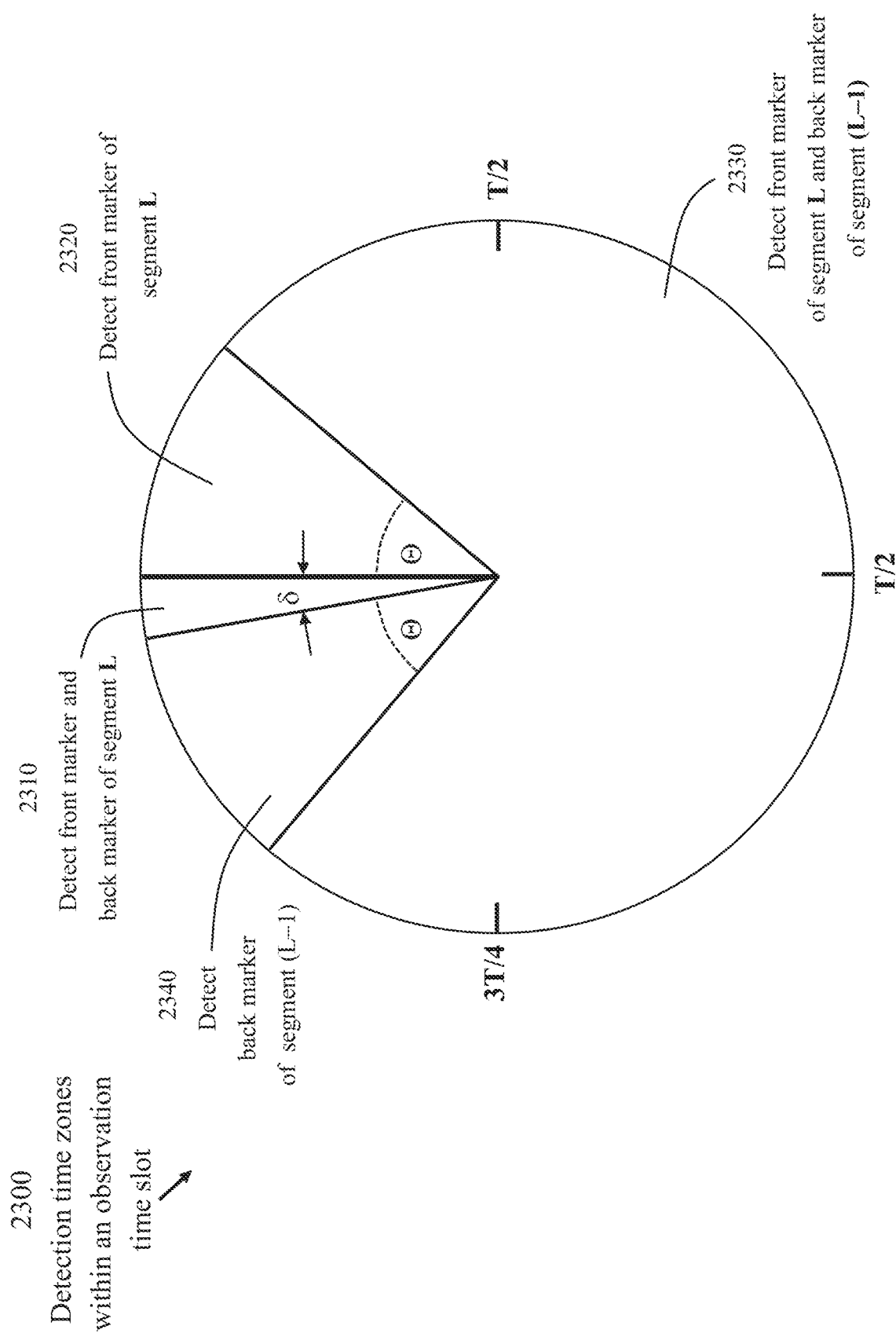
FIG. 23 illustrates detection of segment-markers for different values of time displacement of an input signal with respect to an observation time slot, in accordance with an embodiment of the present invention.

FIG. 23 illustrates detection time zones, 2300, of segment-markers for different values of relative temporal displacement D of a segment of index L of a received signal within an observation time slot of index K. With perfect temporal alignment, i.e., with D=0, the marker detector can capture a front marker and a back marker of any data segment (a content segment or a control segment). When D≠0, the marker detector would be able to detect a front marker, a back marker, or both a front marker and a back marker, depending on the value of the time displacement D.

During a first detection time zone 2310, the marker detector can capture a front marker and a back marker of a segment of index L.

During a second detection time zone 2320, the marker detector can capture a front marker of a segment of index L.

During a third detection time zone 2330, the marker detector can capture the back marker of a segment of index (L−1), and the front marker of a segment of index L.

During a fourth detection time zone 2340, a marker detector can capture a back marker of a segment of index (L−1)

The table below indicated detected segment-markers for different ranges of D.

| Displacement D | Detected segment-marker (s) |
| --- | --- |
| (T−δ) < D ≤ T (i.e., (−δ) < D ≤ 0) | front segment-marker and back segment-marker of segment L |
| 0 < D < Θ | front segment-marker of segment L |
| Θ ≤ D ≤ (T − Θ − δ) | front segment-marker of segment L and back segment-marker of segment (L−1) |
| (T − Θ − δ) < D < (T−δ) | back segment-marker of segment (L−1) |

Figure 24:
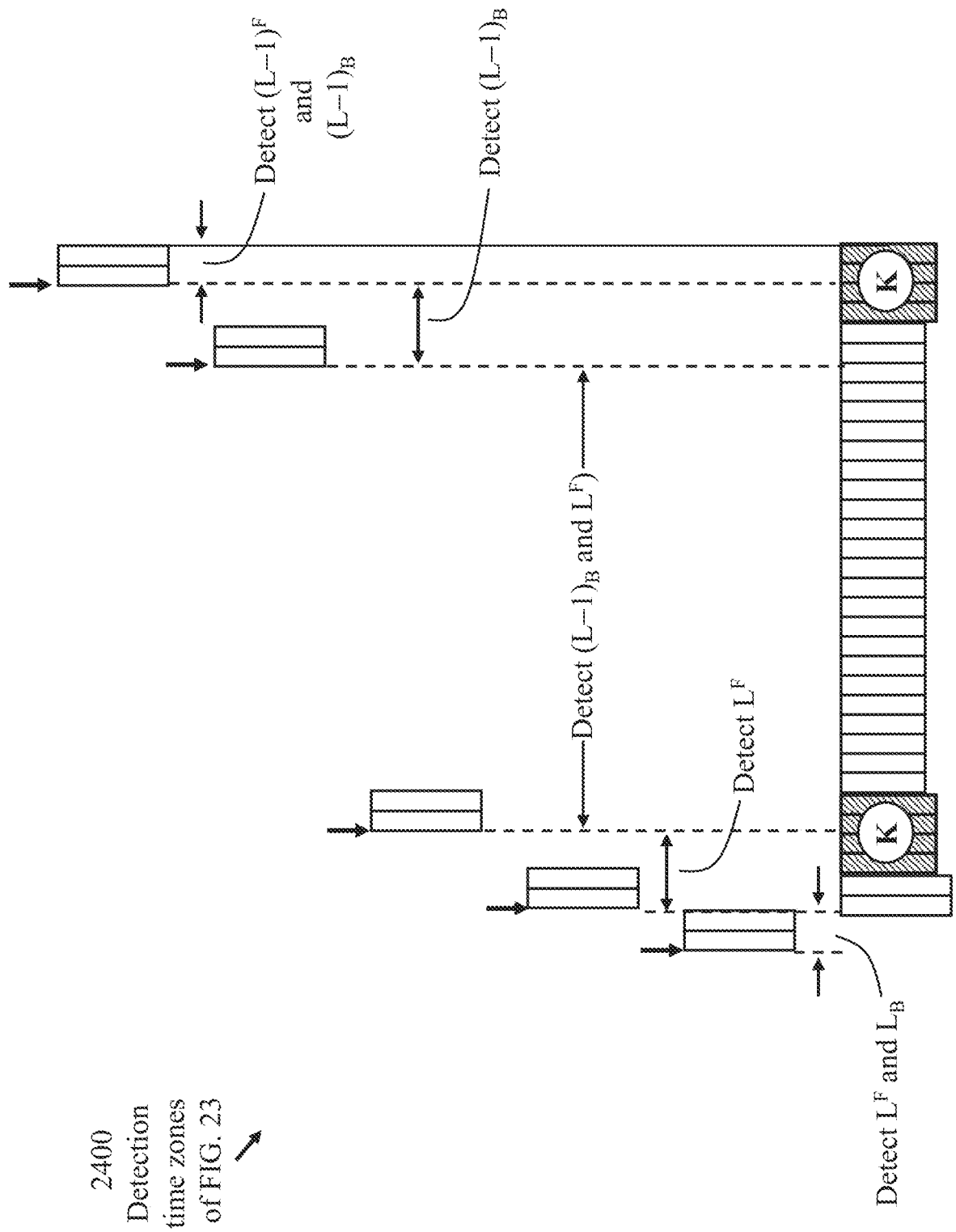
FIG. 24 is an alternate illustration of the detection time zones of FIG. 23.

FIG. 24 is an alternate illustration 2400 of the detection time zones of FIG. 23. The notations $L^F$ and $L_B$ refer to a front marker and a back marker, respectively, of a segment of index L.

Figure 25:
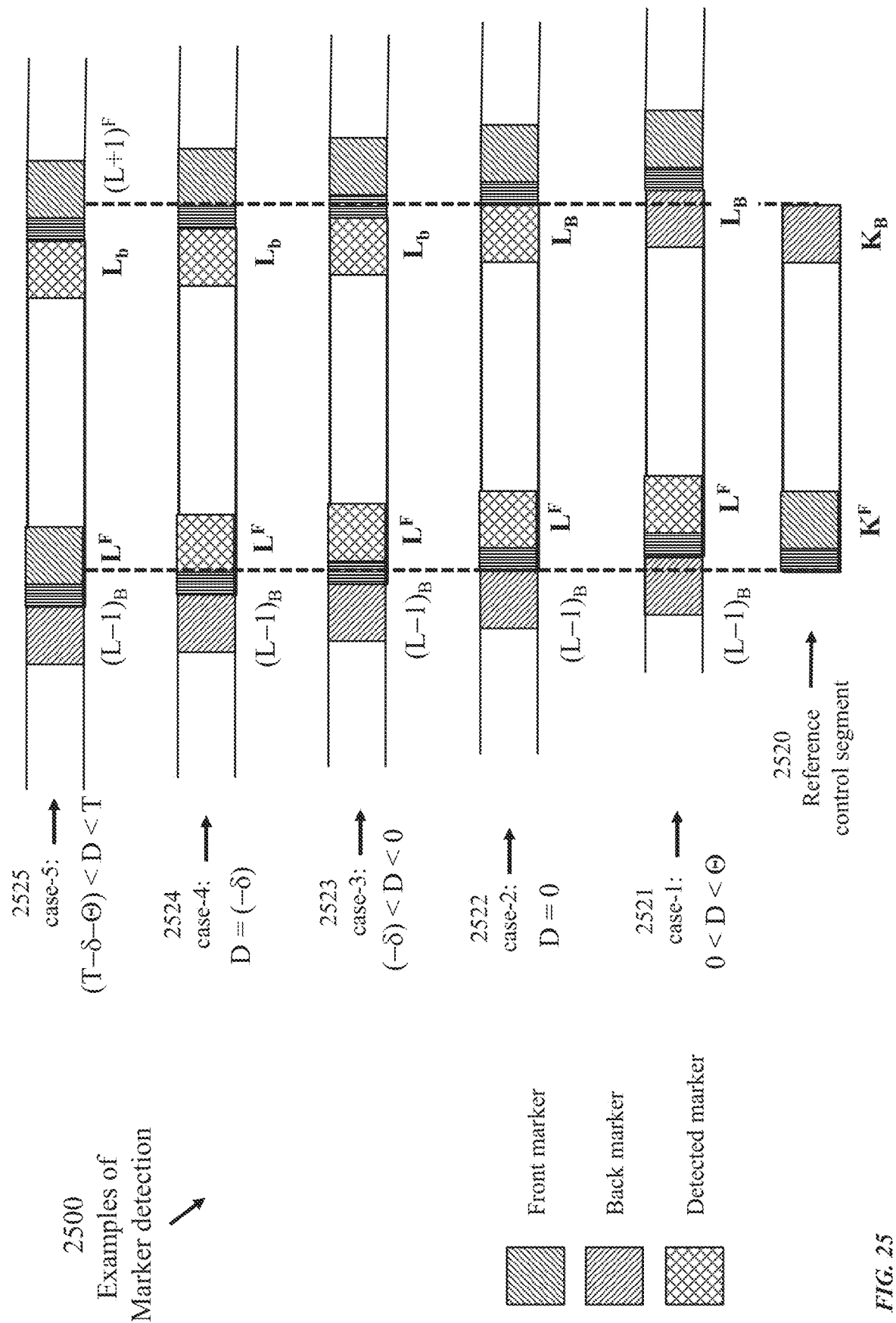
FIG. 25 illustrates examples of detected segment markers for a set of values of signal displacement.

FIG. 25 illustrates examples 2500 of detected segment markers for a set of values of signal displacement. The signal displacement may include an integer number of time slots (where L≠K) resulting in misalignment to boundaries of reference monitoring periods defined at distributor-controller 950 and a fraction D of a time slot resulting in misalignment to boundaries of individual time slots of the reference monitoring periods.

For 0<D<Θ, case 2521, only $L^F$ can be detected.

For D=0, case 2522, both $L^F$ and $L_B$ can be detected; although the received signal is aligned to the boundaries of the observation time slot, the signal may not be aligned with respect to the boundaries of the monitoring periods, unless L=K.

For −δ<D<0, case 2523, both $L^F$ and $L_B$ can be detected.
For D=−δ, case 2524, both $L^F$ and $L_B$ can be detected.
For (T−δ−Θ)<D<T, case 2525, only $L_B$ can be detected.

Figure 26:
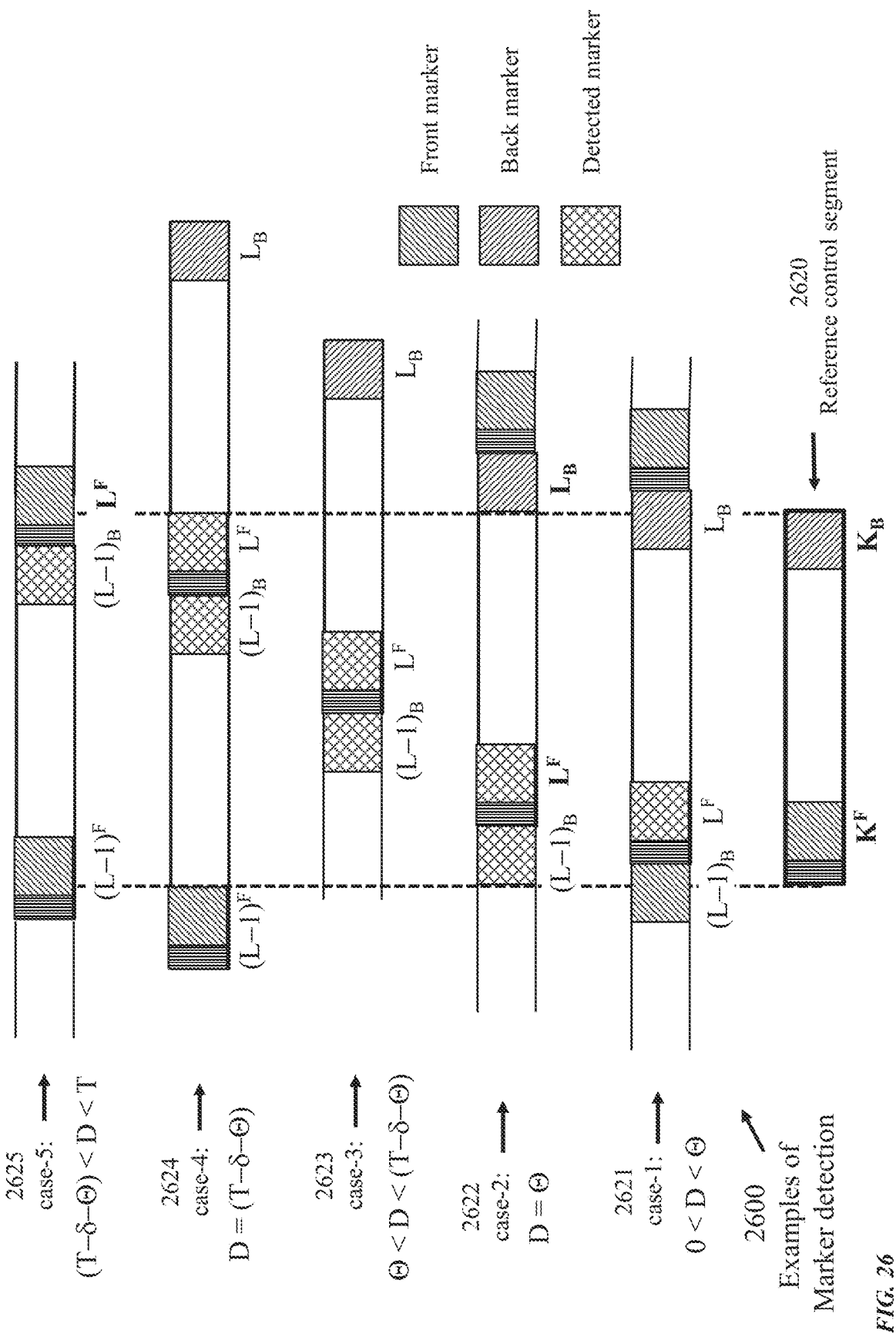
FIG. 26 illustrates examples of detected segment markers for another set of values of signal displacement.

FIG. 26 illustrates examples 2600 of detected segment markers for another set of values of signal displacement.

Case 2621 is similar to case 2521.
For D=Θ, case 2622, both $L^F$ and $(L-1)_B$, the back marker of the segment of index (L−1), can be detected.
For Θ<D<(T−δ−Θ), case 2623, both $L^F$ and $(L-1)_B$ can be detected.
For D=(T−δ−Θ), case 2624, both $L^F$ and $(L-1)_B$ can be detected.
For (T−δ−Θ)<D<T, case 2625, only $(L-1)_B$ can be detected.

Determining Corrective Displacement at the Distributor Controller

Figure 27:
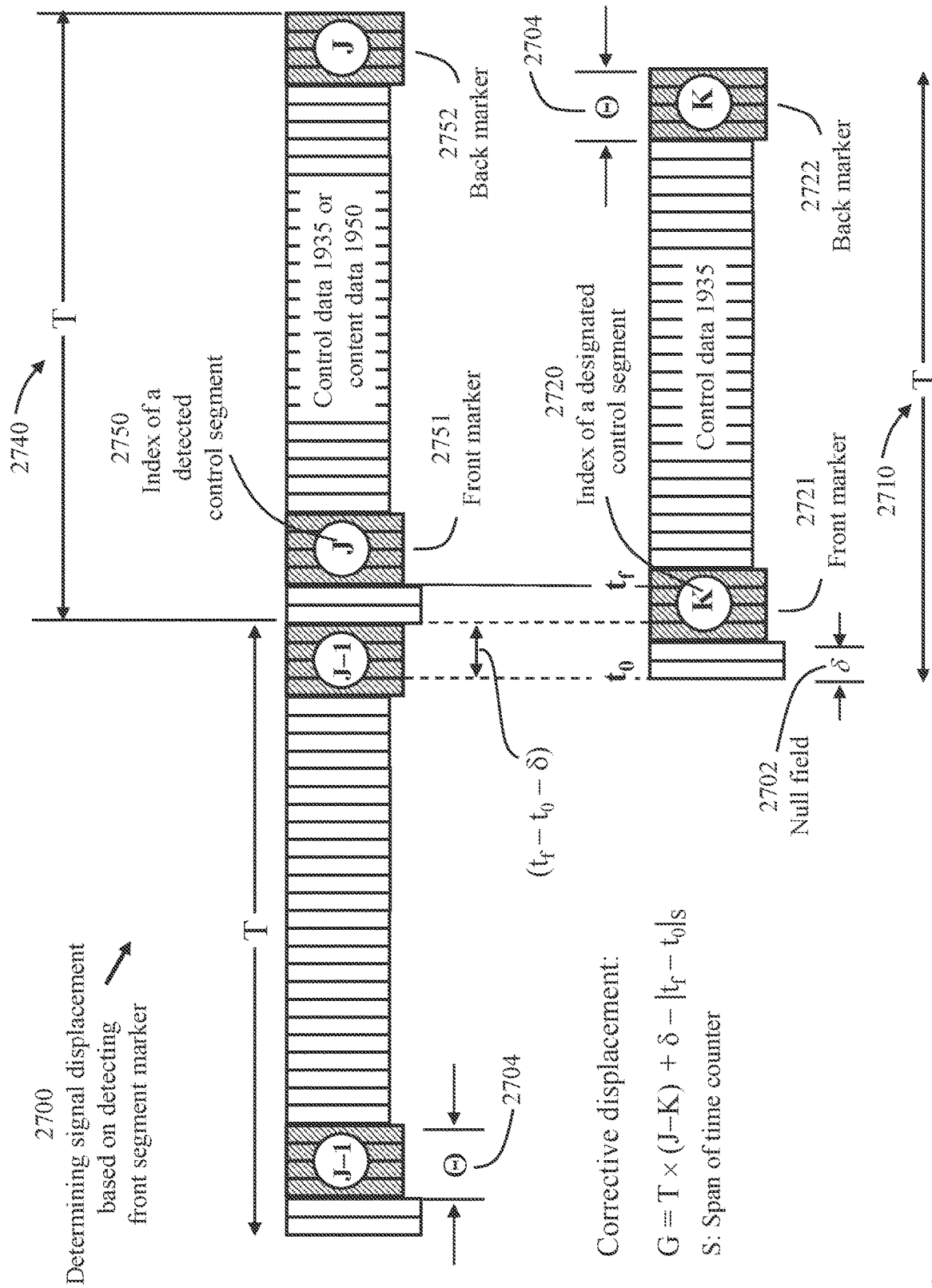
FIG. 27 illustrates a method of determining corrective temporal displacement of a received signal at a specific input port of a distributor based on detecting front segment-marker, in accordance with an embodiment of the present invention.

FIG. 27 illustrates a method 2700 of computing temporal discrepancy of a received signal at a specific input port 921 of a distributor 1000 based on detecting a front segment-marker. Each time slot is of duration T and comprises a guard time 2702, of duration δ, a front-marker interval of duration Θ, and a back-marker interval of duration Θ (reference 2704). Each of the front marker and back marker indicates a reference segment index.

Two schemes of alignment of signals received at input ports of a distributor 1000 from access nodes may be applied. According to a first alignment scheme, a signal originating from an access node to a distributor is aligned to monitoring-periods boundaries. According to a second alignment scheme, the signal originating from the access node to the distributor is aligned to scheduling-periods boundaries. A third alignment scheme may align the signal originating from the access node to global-period boundaries. The first-alignment scheme and the second alignment scheme are further detailed in FIGS. 36-39. The third alignment scheme is not pursued in the present application. Notably, a global period is preferably selected as an integer multiple of a scheduling period which is, in turn, an integer multiple of a monitoring period as illustrated in FIG. 11.

During an observation time slot 2710, starting at time instant $t_0$, corresponding to a reference control segment of index K (reference 2720), a portion of the received signal overlapping a segment of index (J−1) and a segment of index J is detected. The front marker 2751 and back marker 2752 of the signal segment 2750, are indicated. The front marker 2721 and back marker 2722 of the reference control segment, are also indicated.

Only the front marker 2751 of the signal segment of index J is detected during observation time slot 2710. The partial contents of the back marker of the segment of index (J−1) and the back marker of the segment of index J are not processed.

All time measurements are based on a time indicator coupled to distributor controller 950. A conventional time indicator is implemented as a cyclical digital flip-flop counter (herein referenced as a "time counter") clocked at a clock rate that is high enough to realize a requisite time-indication precision. Selecting a counter word length of 30 bits, providing readings ranging from 0 to ($2^{24}$−1), i.e., 0 to 16777215, an instant of time expressed as a real number t seconds is instead expressed as an integer number of time units which is a reading of the cyclical time counter.

The time instant $t_0$, and any time measurement taken during the observation time slot are read from the time counter.

The front marker starts at time instant $t_f$. The corrective temporal displacement G of the signal is determined as:

$$G = T \times (J-K) + \delta - |(t_f - t_0)|_{modulo\ S}.$$

The value of T is expressed in time units, and the values of $t_f$ and $t_0$ are read from the time counter.

An observation time slot may bridge two successive counter spans. For example, the time-counter reading corresponding to $t_0$ may be 16,777,192 while the time-counter reading corresponding to $t_f$, the start of the front marker of the segment of index J, is 26. The value of $(t_f - t_0)$ is then (−16777166). The value of $|(t_f - t_0)|$ modulo 167772164 is (16777216−16777166) which is 50 time-units.

Figure 28:
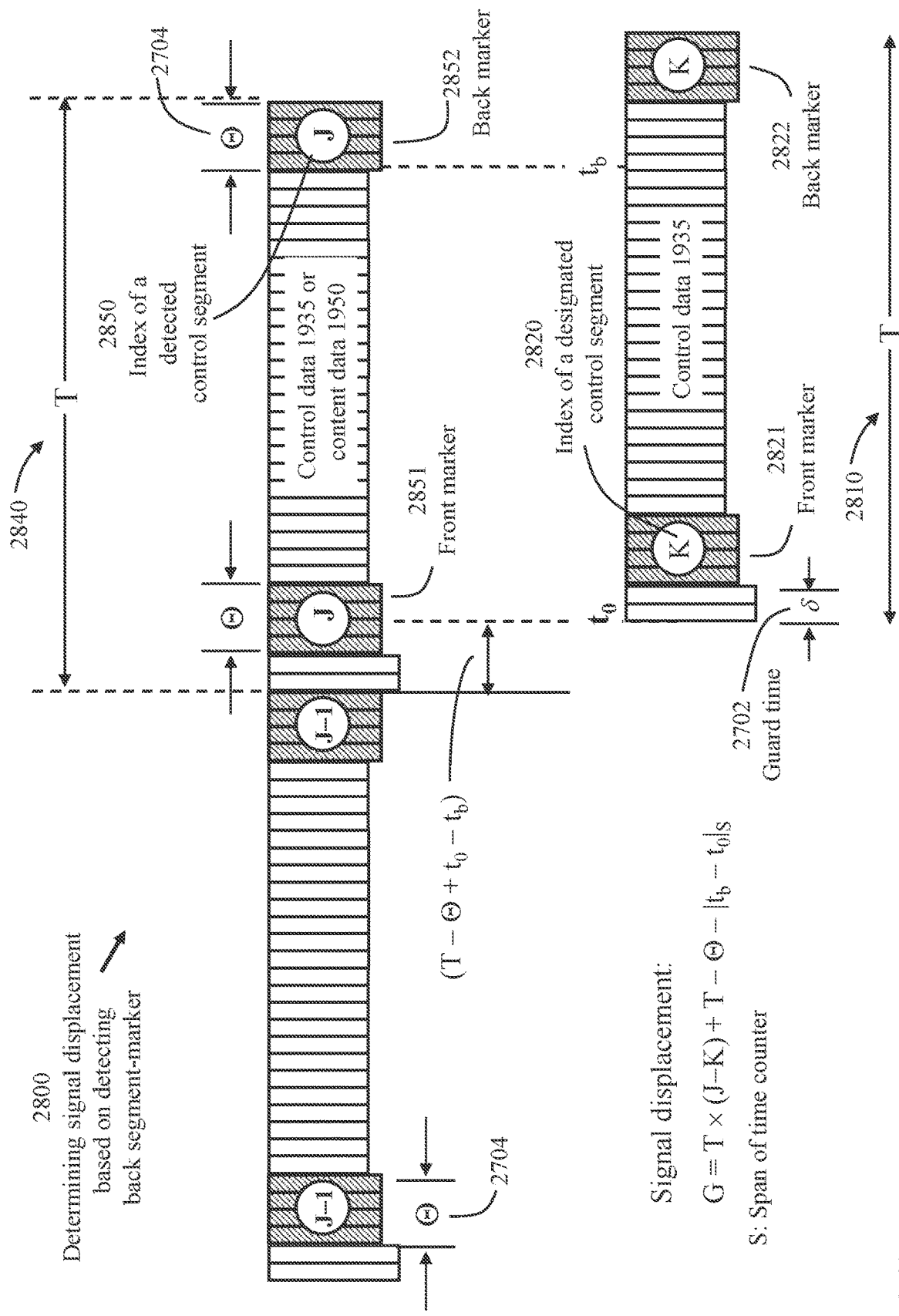
FIG. 28 illustrates a method of determining corrective temporal displacement of a received signal at a specific input port of a distributor based on detecting back segment-marker, in accordance with an embodiment of the present invention.

FIG. 28 illustrates a method 2800 of computing temporal discrepancy of a received signal at a specific input port 921 of a distributor based on detecting back segment-marker. Each time slot is of duration T and comprises a guard time, denoted δ, a front-marker interval of duration Θ, and a back-marker interval of duration Θ. The front marker 2851 and back marker 2852 of received segment of index J are indicated.

For the reference time slot 2710, which starts at time instant $t_0$, the back marker 2852 of a received signal segment is detected at time instant $t_b$. The captured partial content of front marker 2851 of segment 2850 is not processed. The temporal displacement G of the detected time slot from the reference time slot is determined as:

$$G = T \times (J-K) + (T-\Theta) - |(t_b - t_0)|_{modulo\ S}.$$

The value of T is expressed in time units, and the values of $t_b$ and $t_0$ are read from the time counter.

Figure 29:
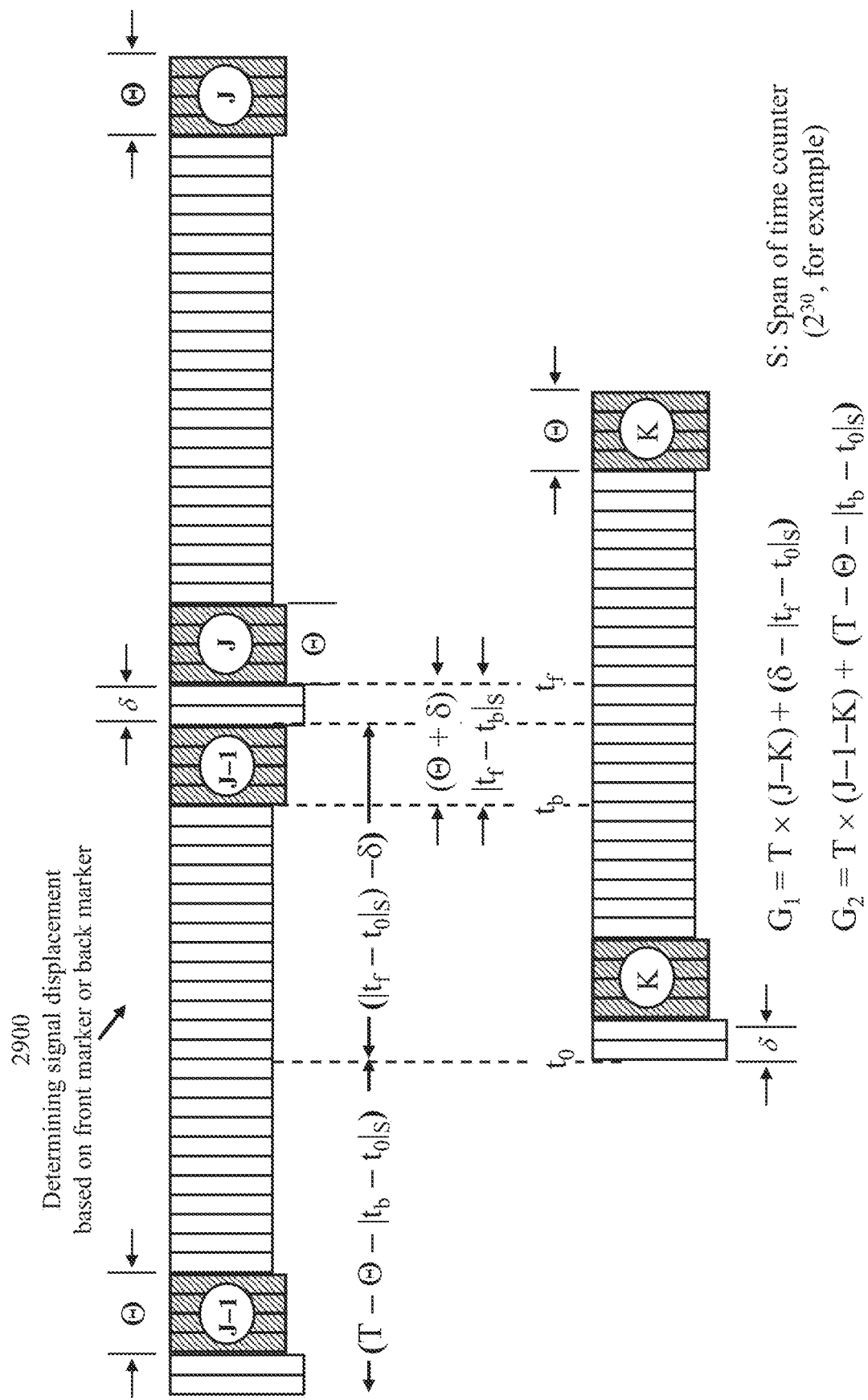
FIG. 29 illustrates determining corrective temporal displacement of a received signal at a specific input port of a distributor based on detecting a front segment-marker and a back segment-marker.

FIG. 29 illustrates determining temporal displacement of a received signal at a specific input port of a distributor for a case where both a front segment-marker, of a segment of index L within a scheduling period and a back segment-marker, of a segment of index (L−1) are detected during an observation time slot of index K, 0<L<N, 0≤K<N, N being the number of time slots of the scheduling period.

With the back marker of the segment of index (L−1) detected at time $t_b$, the signal temporal correction would be determined as:

$$G_2 = T \times (L-1-K) + T - \Theta - |t_b - t_0|_S = T \times (L-K) - \Theta - |t_b - t_0|_S$$

With the front segment-marker of the segment of index L detected at time $t_f$, the signal temporal correction would be determined as:

$$G_1 = T \times (L-K) + \delta - |t_f - t_0|_S.$$

It is seen from FIG. 29 that $|t_f - t_b|_S = \Theta + \delta$. Hence, $G_1 = G_2$.

Generally, any marker that is detected during the observation time slot enables determination of the signal temporal displacement (which is zero when time alignment is established). A temporal correction at an access-node's output port connecting to the distributor offsets the temporal displacement.

Figure 30:
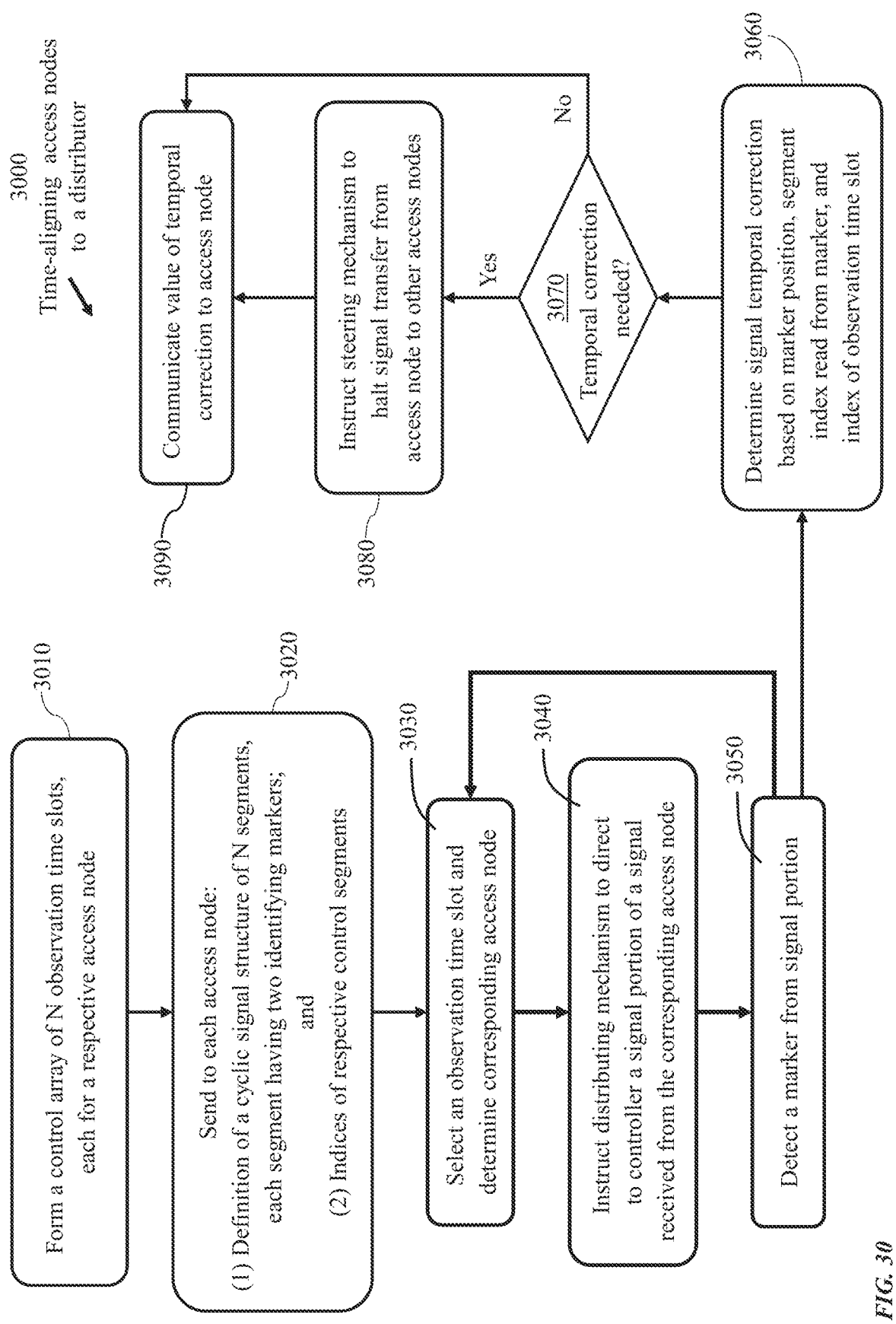
FIG. 30 illustrates a method of time aligning data transmitted from a plurality of access nodes to a distributor, in accordance with an embodiment of the present invention.

FIG. 30 illustrates a method of time aligning data transmitted from a plurality of access nodes 120 to a distributor 140. The method is based on allocating for each access node a respective observation time slot and examining a portion of a signal received from each access node during a respective observation time slot.

A controller 950 of the distributor maintains (process 3010) a control array 1320 of N observation time slots, indexed as 0 to (N−1), N being the number of time slots of the scheduling period, each observation time slot corresponding to a respective input port 921 of the distributor (hence a respective access node). The controller sends to each access node a definition of a cyclic signal structure 1360 of N segments (process 3020). Each segment contains two markers each indicating a segment index. The segments are indexed as 0 to (N−1). The controller also sends to an access node indices of respective control segments within the signal structure corresponding to indices of observation time slots designated to the access node.

The controller cyclically executes processes 3030, 3040, and 3050 and concurrently executes processes 3060, 3070, 3080, and 3090. Process 3030 selects observation time slots of a control array 1320. During each observation time slot, the controller instructs (process 3040) a distributing mechanism of the distributor 1000 to direct to the controller 950 a signal portion of a signal received from a respective access node. Upon detecting (process 3050), from the signal portion, a position of a particular marker and a segment index, the controller determines (process 3060) a temporal displacement of the signal according to the marker position, the segment index, and index of the observation time slot (FIG. 27 and FIG. 28).

Subject to a determination (process 3070) that the temporal displacement of a signal received from a specific access node exceeds a predefined value (for example, 1 nanosecond), the controller instructs the distributing mechanism to halt signal transfer (process 3080) through the distributing mechanism from the input port 921 connecting to the specific access node to all output ports 922 connecting to other access nodes. The controller then instructs (process 3090) the access node to adjust transmission time according to the temporal displacement.

Each control segment contains, in addition to the null field and two markers, requests 1924 for flow-rate allocations from a respective access node to other access nodes and inter-nodal control data 1932 to other access nodes of the plurality of access nodes.

Figure 31:
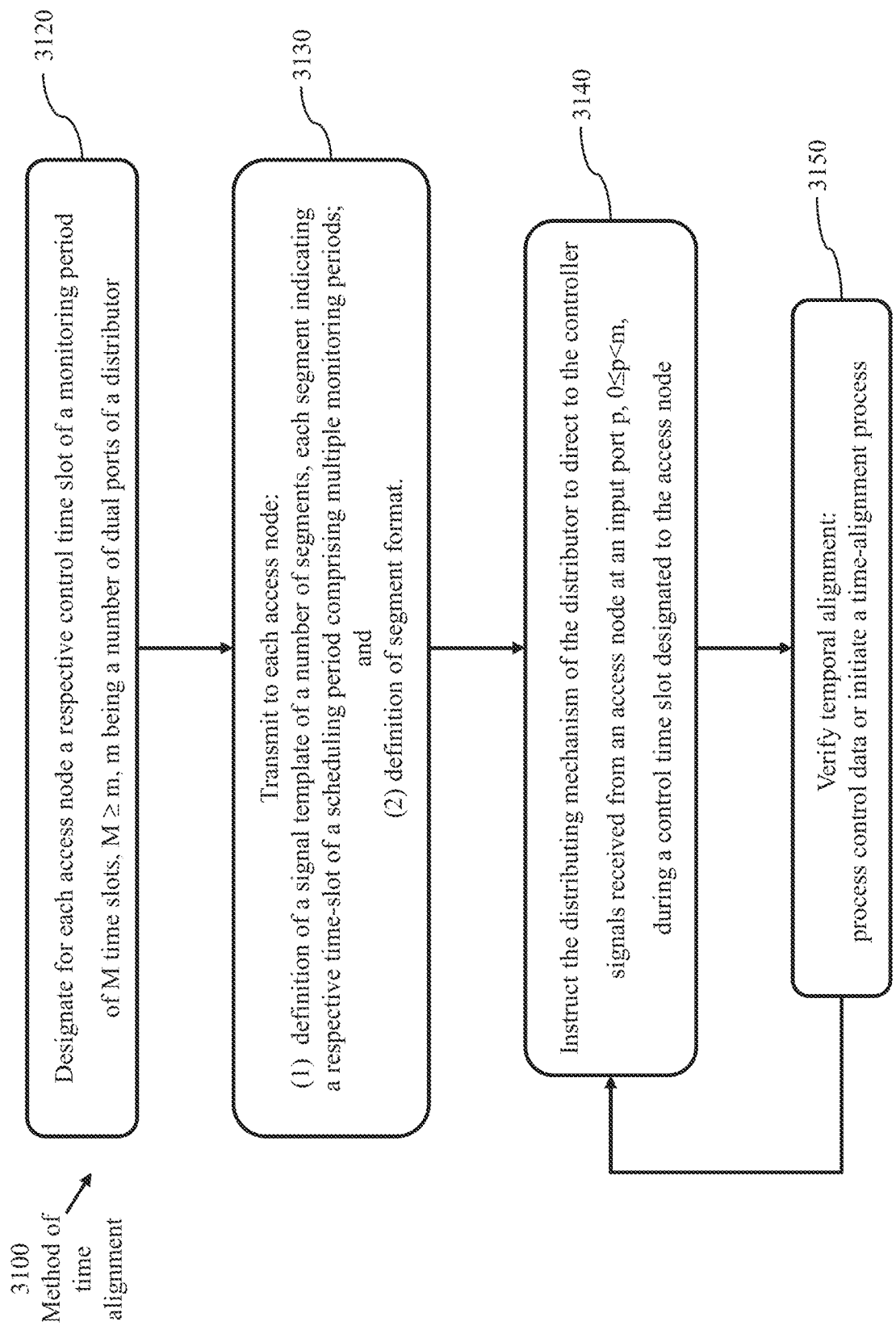
FIG. 31 illustrates a method of scheduling-period alignment implemented at a distributor processor, in accordance with an embodiment of the present invention.

FIG. 31 illustrates a method 3100 of scheduling-period alignment implemented at a distributor processor 950.

Process 3120 designates for each access node connecting to an input port 921 a respective control time slot within each monitoring period of N time slots, N being the number of time slots of the scheduling period 1140.

Process 3130 transmits to each access node connecting to a dual port 921/922:

(a) definition of a respective template of N data segments, each data segment indicating a respective segment identifier;

(b) an indication of position of a control data segment within the template; and (c) a number of monitoring periods within a scheduling period.

The distributor receives from access nodes connecting to input ports 921 signal streams organized according to a respective template.

Process 3140 instructs a distributing mechanism of the distributor 950 to direct to the distributor controller 950 a signal portion extracted during a control time slot designated to the specific access node.

Process 3150 verifies time alignment of the signal stream. If time alignment is ascertained, action is taken according to the control data. Otherwise, a procedure for restoring time alignment is applied as illustrated in FIG. 32.

Figure 32:
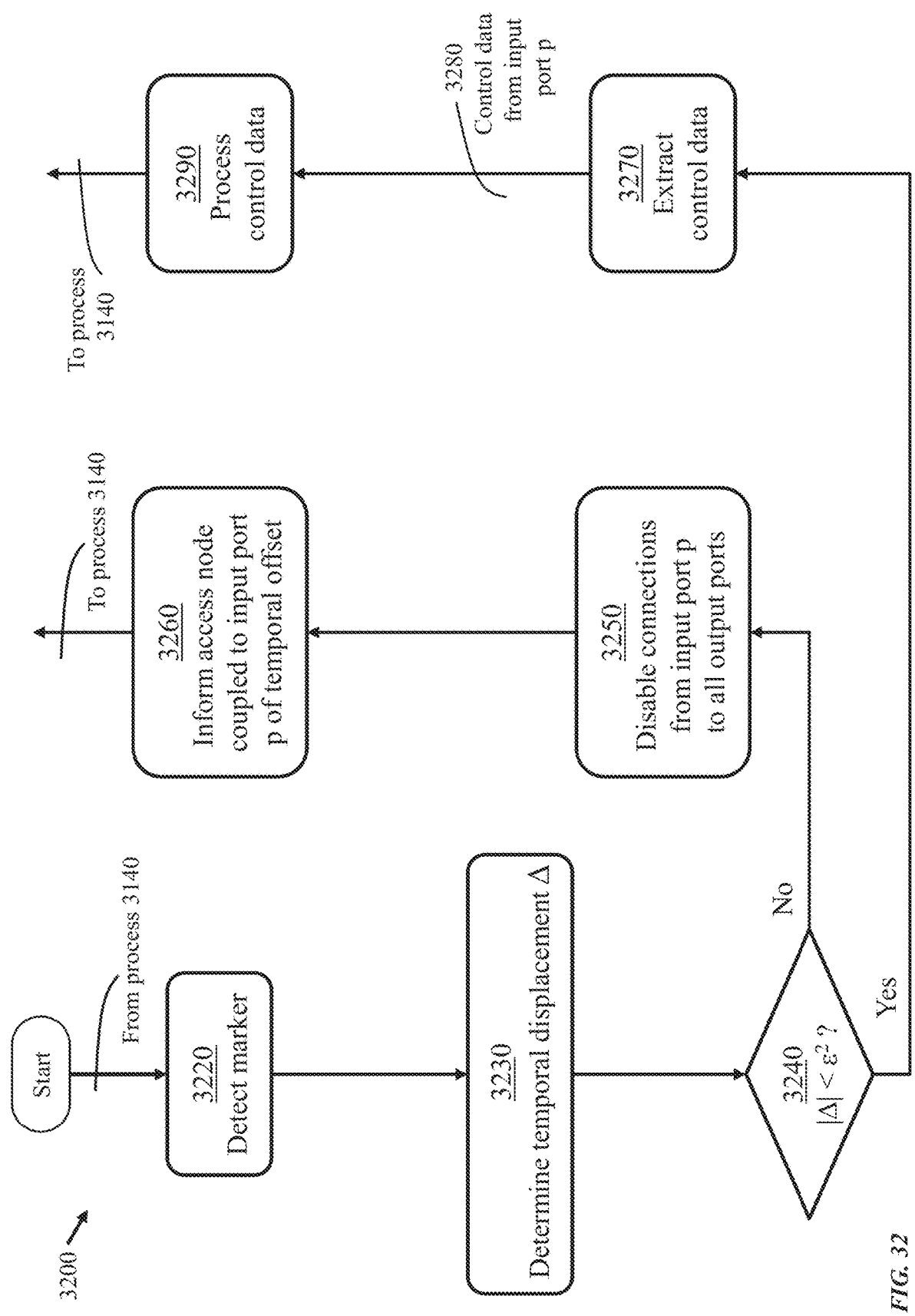
FIG. 32 illustrates a process of verifying or restoring time alignment, in accordance with an embodiment of the present invention.

FIG. 32 details process 3150. To start, process 3220 detects a marker of the control segment. Process 3230 determines temporal displacement as detailed in FIG. 33. Process 3240 initiates a corrective action to either:

(a) restore time alignment if the magnitude of the temporal offset exceeds a prescribed threshold $\varepsilon^2$ (an infinitesimally small positive number) starting with process 3250, or (b) communicate the control data to the distributor controller and destination access nodes starting with process 3270.

Process 3250 disables signal flow from the input port 921 receiving the misaligned signal to output ports 922 maintaining only signal flow to the distributor controller during the designated control time slot within each monitoring period. Process 3260 communicates the value of a corrective temporal displacement to the specific access node.

Process 3270 extract control data 3280 from the control segment. Process 3290 directs control data relevant to requests from access nodes to the distributor controller 950 and directs control data from individual access nodes connecting to input ports 921 to target access nodes connecting to output ports 922. Process 3290 further communicates scheduling and timing information from the distributor controller to access nodes connecting to the distributor.

Figure 33:
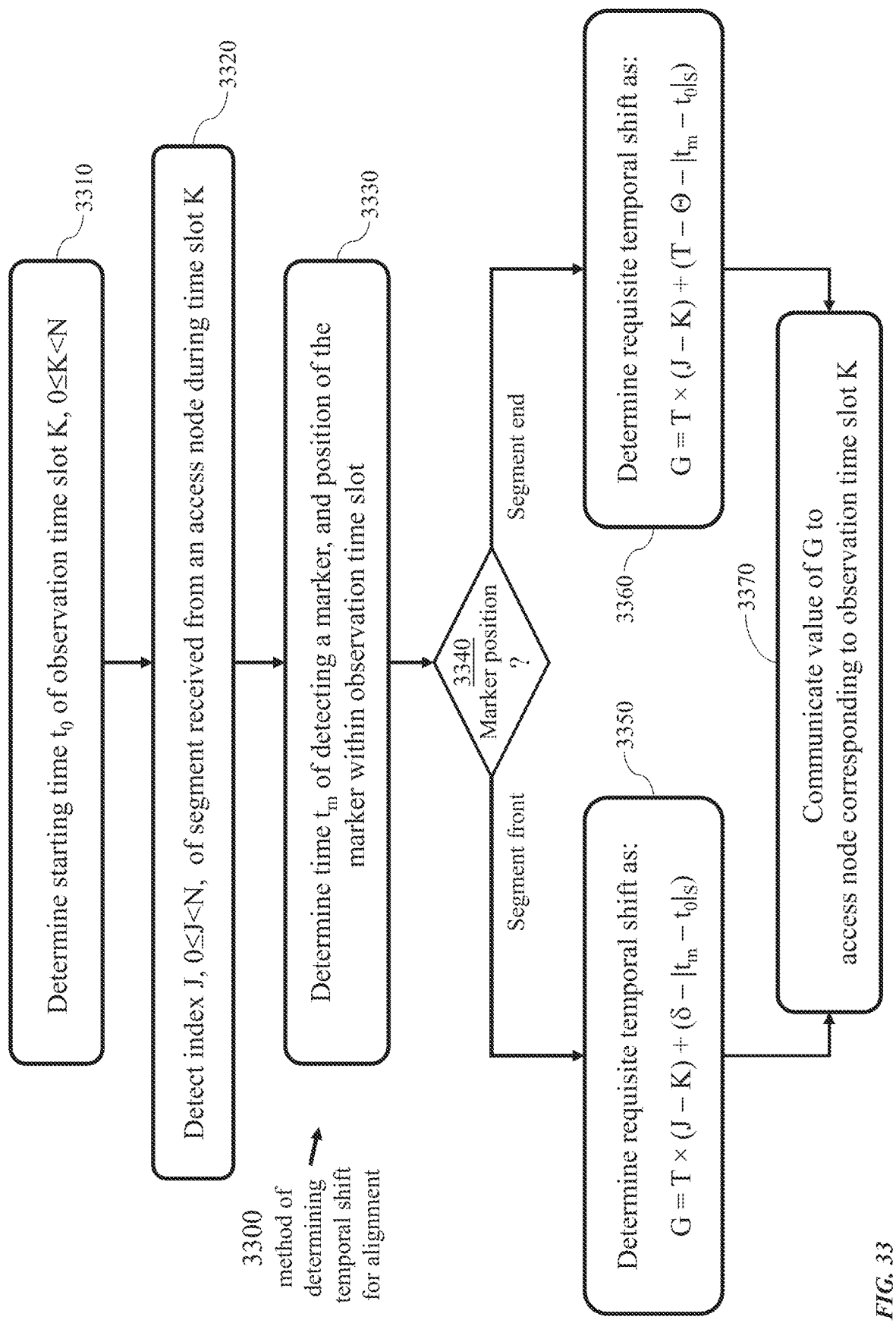
FIG. 33 illustrates a process of determining time shift, in accordance with an embodiment of the present invention.

FIG. 33 details process 3230 of determining temporal displacement. Process 3310 determines the index K and starting time $t_0$ of a reference control time slot. Process 3320 detects an index J of a segment within a received data string detected from a signal received from an access node during the reference control time slot. Process 3330 determines time $t_m$ of detecting a marker and position of the marker (front or back). Process 3340 branches to either process 3350 upon determining that the marker is a front marker or to process 3360 otherwise.

Process 3350 determines a corrective temporal displacement as:

$$G = T \times (J-K) + \delta + |t_f - t_0|_S,$$

Process 3360 determines the corrective temporal displacement as:

$$G = T \times (J-K) + T - \Theta + |t_0 - t_m|.$$

Process 3370 communicates the value of G.

As described above, the duration T of a time slot, and all of time measurements are expressed in time units of the time counter.

Figure 34:
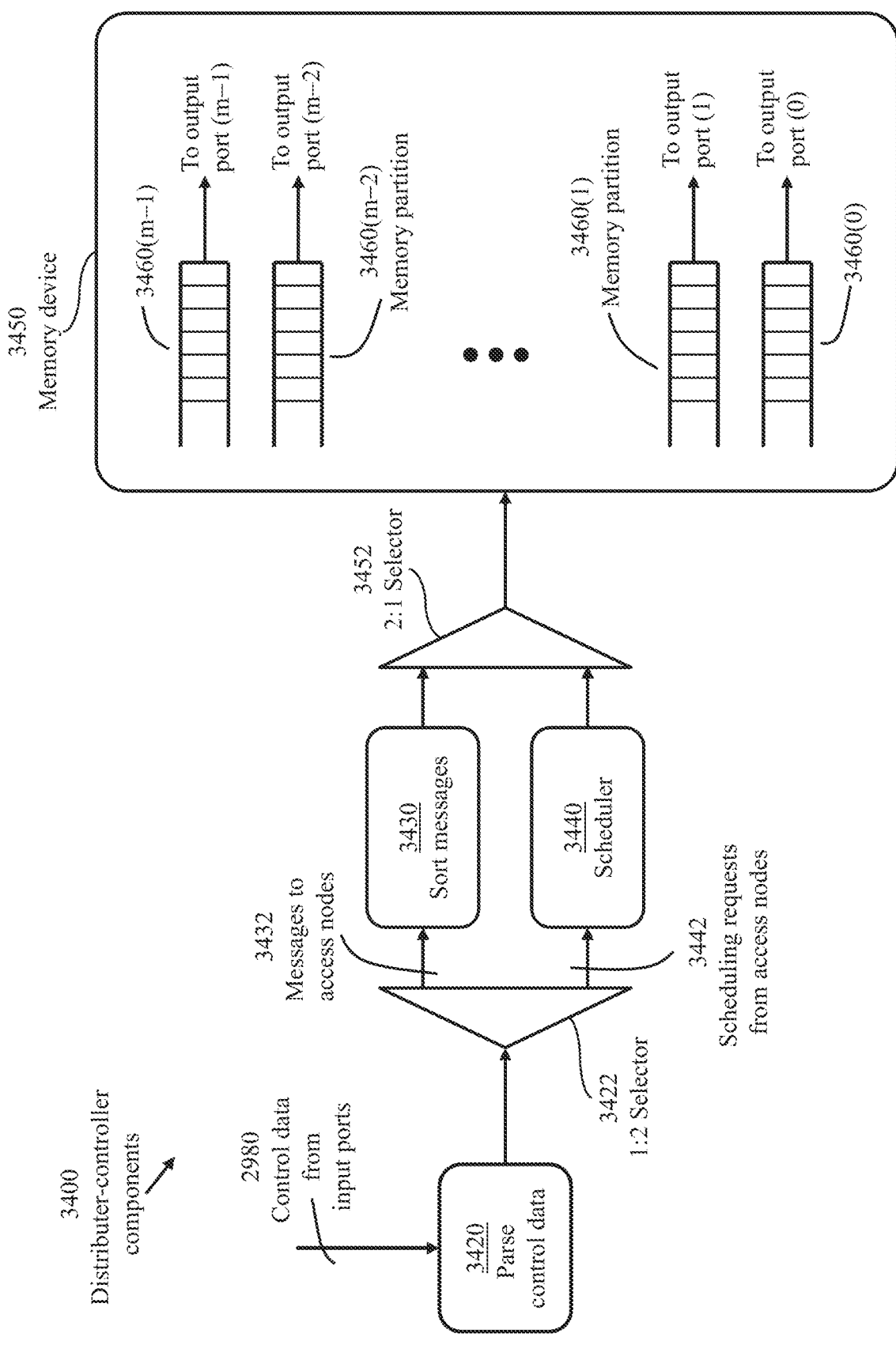
FIG. 34 illustrates components of a distributor controller, in accordance with an embodiment of the present invention.

FIG. 34 illustrates components 3400 of a distributor controller 950. The controller maintains a plurality of buffers 3460, each for holding control data directed to a respective access node of the plurality of access nodes. In response to requests for flow-rate allocations, the controller activates scheduler 3440 to generate flow-rate allocations for paths from each access node to other access nodes of the plurality of access nodes. The controller further consolidates flow-rate allocations with inter-nodal control data relevant to each access node into a respective buffer 3460 and sequentially sends contents of the buffers to respective access nodes.

A module 3420 parses control data into scheduling requests 3442 from access nodes and messages 3432 directed to individual access nodes connecting to distributor output ports 922. The messages include control data originating from individual access nodes connecting to distributor input ports 921 and directed to access nodes connecting to distributor output ports 922 in addition to updated schedules for individual access nodes.

A 1:2 selector 3422 directs scheduling requests 3442 to scheduler 3440 and the messages 3432 to module 3430 which sorts the messages according to destination access nodes. Scheduler 3440 determines internal paths within a distributor.

A 2:1 selector 3452 alternately transfers schedules from scheduler 3440 and sorted messages from sorting module 3430 to memory device 3450 holding data directed to individual access nodes coupled to distributor dual ports. Memory device 3450 is organized into logical memory divisions 3460 each holding data directed to a respective access node.

Figure 35:
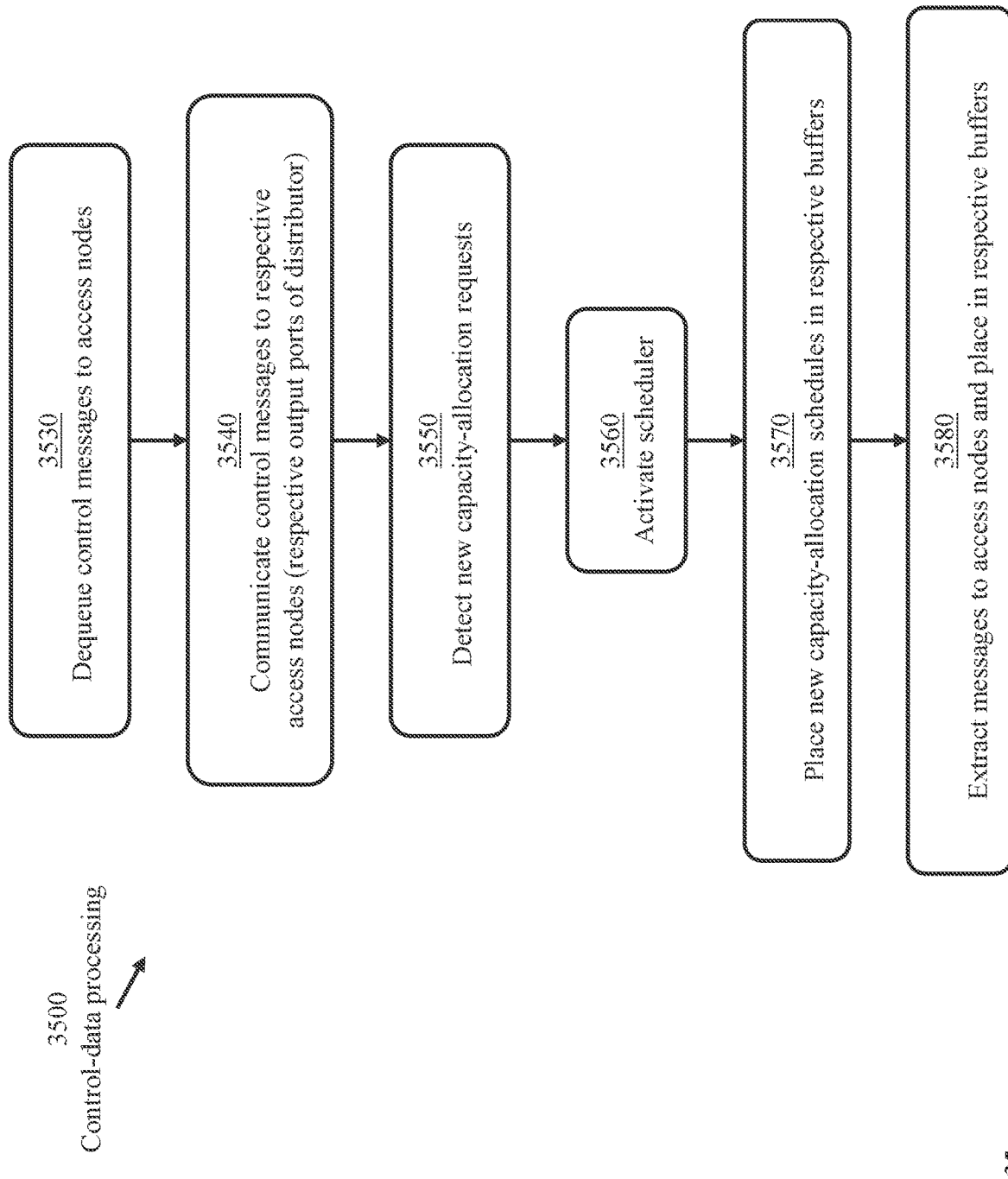
FIG. 35 illustrates processes of communicating scheduling and timing information from a distributor to access nodes, in accordance with an embodiment of the present invention.

FIG. 35 illustrates processes 3500 of communicating scheduling and timing information from a distributor to access nodes. Process 3530 de-queues schedules and control messages from memory device 3450. Process 3540 communicates schedules and control messages to respective access nodes through distributor output ports. Process 3550 detects scheduling requests (capacity-allocation requests). Process 3560 activates scheduler 3440. Process 3570 places new capacity-allocation schedules in respective logical buffers 3460. Process 3580 extracts messages directed to access nodes and places the messages in respective logical buffers 3460.

Time-Alignment Options

Figure 36:
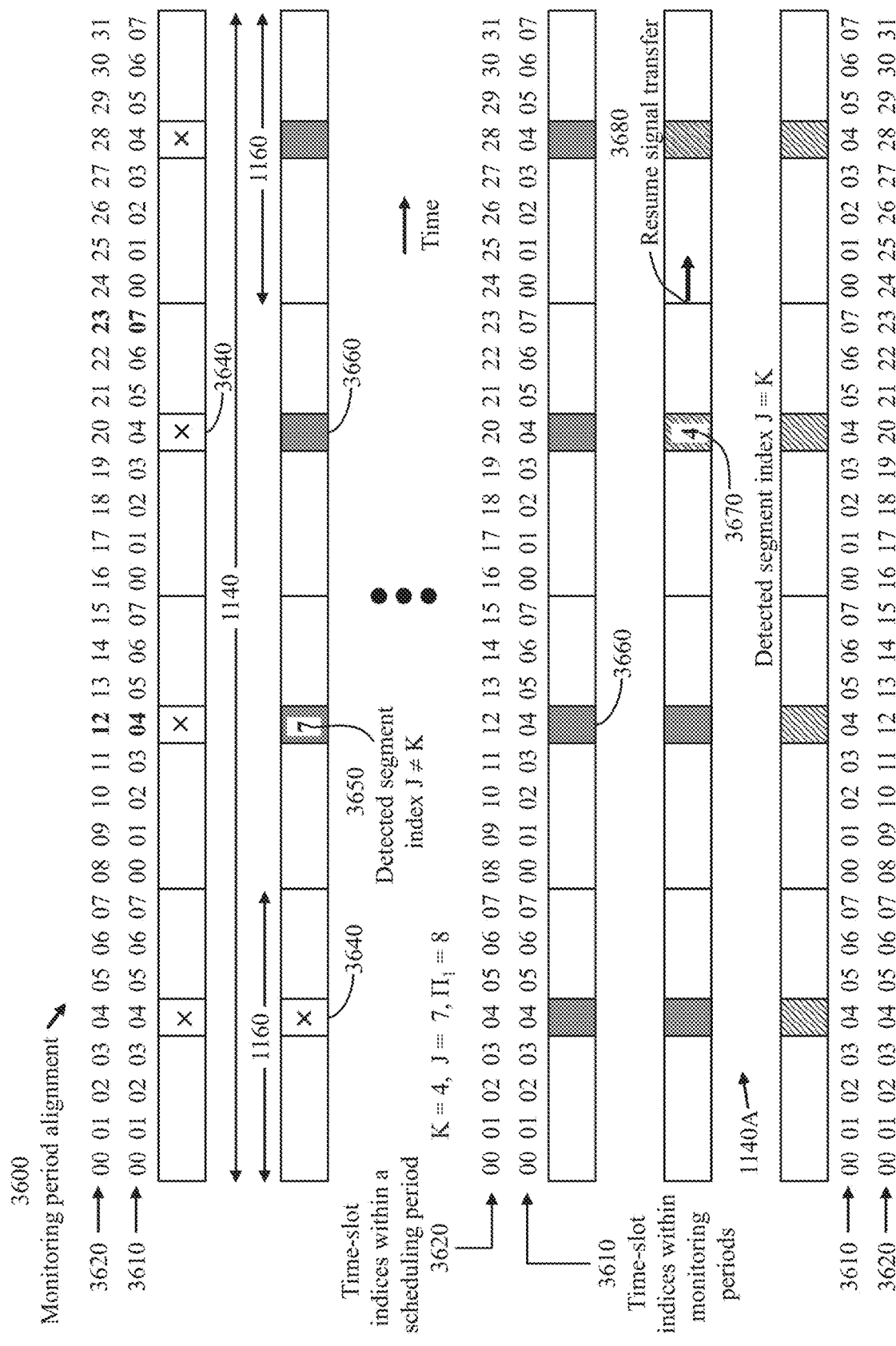
FIG. 36 illustrates an example of signal time alignment to a monitoring period, in accordance with an embodiment of the present invention.
Figure 37:
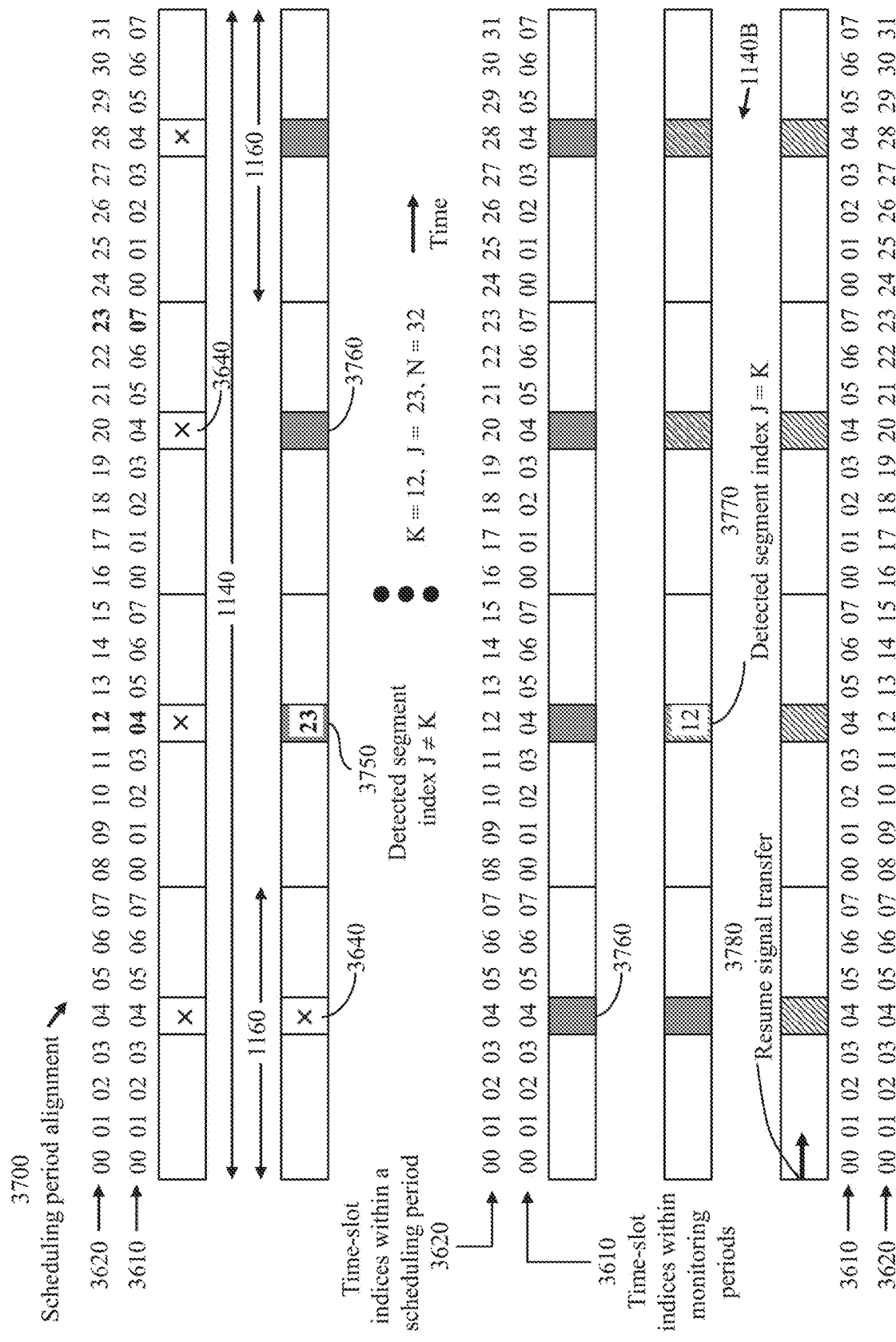
FIG. 37 illustrates an example of signal time alignment to a reference scheduling period, in accordance with an embodiment of the present invention.

Two schemes of alignment of signals received at input ports of a distributor 140 from access nodes are illustrated in FIG. 36 and FIG. 37. As illustrated in FIG. 11, each monitoring period 1160 includes $\Pi_1$ time-slots 1180 and each scheduling period includes $\Pi_2$ monitoring periods. The duration, T, of a time slot at least equals the propagation time of a signal segment (a content segment or a control segment). The number $\Pi_1$ is at least equal to an upper bound of the number of dual ports of the distributor. The number $\Pi_2$ is selected to enable fine flow-rate allocations with acceptable scheduling delay. With $\Pi_1$ selected as 64 and $\Pi_2$ is selected as 256, for example, the number, N, of time slots per scheduling period, $N=\Pi_1 \times \Pi_2$, would be 16384. Thus, the lowest allocable flow rate for a directed pair of access nodes connected to a distributor is (R/16384), R being the capacity per channel 910 or 970.

FIG. 36 illustrates a scheme 3600 of signal time alignment to a monitoring period for an exemplary case of a monitoring period of only 8 time slots and a scheduling period of 32 time slots ($\Pi_1=8$, N=32). The time slots within each monitoring period are indexed as $\{0, 1, \ldots, (\Pi_1-1)\}$. The time slots within the scheduling period are indexed as $\{0, 1, \ldots, (N-1)\}$.

According to a first alignment scheme, referring to FIG. 9 and FIG. 10, the controller 950 of the distributor maintains a control array of $\Pi_1$ entries, where each entry is dedicated to a respective input port 921 of the distributor and is associated with a reference control segment and an observation time slot. The controller 950 instructs a distributing mechanism 920 of the distributor to cyclically connect signals received at the input ports 921 to the controller 950 during respective observation time slots. For $\Pi_1=8$, observations time slots $\{0, 1, 2, 3, 4, 5, 6, 7\}$ correspond to input ports 921 of indices 0 to 7, respectively. Using the distributor configuration of FIG. 10, the distributing mechanism 920 cyclically transfers upstream control signals from each input port 921 to the upstream control port 1024 during a respective designated observation time slot. The content of the signal is compared with a respective reference control segment to ensure time alignment as illustrated in FIG. 27 and FIG. 28. Upon ascertaining time alignment, the distributing mechanism 920 transfers signals from each input port 921 to selected output ports 922 according to schedules received from distributor controller 950.

The downstream control port 1023, receives downstream control signals from distributor-controller 950 and cyclically transfers the downstream control signals to output ports 922 connecting to downstream channels directed to respective access nodes.

FIG. 36 illustrates steps of time alignment, of a signal received at input port of index 4 of the distributor configuration of FIG. 10, to a monitoring period of a duration of eight time slots ($\Pi_1=8$). Cyclical indices 3610 of time slots of a periodic monitoring period 1160 and corresponding cyclical indices 3620 of time slots of a periodic scheduling period 1140 are illustrated. In this example, the scheduling period 1140 comprises four consecutive monitoring periods 1160 ($\Pi_2=4$). The observation time slots for the input ports 921 correspond to entries of array 3610.

Initially, during an observation time slot 3640 of index 4 (corresponding to input port 921 of index 4) of each of five consecutive monitoring periods 1160, controller 950 did not detect a control segment, indicating that a signal from an access node has not yet arrived at the input port. During observation time slot 3650 of index 4 of the sixth monitoring period, controller 950 detected a segment of index 7, which is a content segment not a control segment; a segment received during the observation time-slot of index 4 should be a control segment of index 4. Additionally, controller 950 detects the position of the front marker and/or the back marker of the detected segment regardless of the segment type (content segment or control segment). Upon determining the index of the detected segment and the position of either the front marker or the back marker (or both markers), the controller 950 computes a value of corrective temporal displacement (expressed in time units of the time counter as discussed above) to offset time displacement, if any, of the incoming signal and communicates the value of corrective temporal displacement to the access node connecting to input port 921 of index 4 (the source of the signal) through a downstream control segment sent from downstream control port 1023 which is cyclically connected to output port 922 having a channel 970 to the access node. Optionally, the value of the corrective temporal displacement may be communicated to a respective access node if the value warrants taking action at the access node. However, communicating the value of the corrective temporal displacement regularly has merits.

Until the access node receives the value of the time displacement and corrects the upstream transmission time to distributer 1000, the segments detected during each observation time slot 3660 of index 4 of several consecutive monitoring periods, would still indicate a segment index of 7. During observation time slot 3670 of index 4 of the third monitoring period of a scheduling period 1140A, controller 950 detected control segment of index 4. Additionally, the segment is time aligned to the boundaries to the time-slot of index 4. During each subsequent observation time slot 3670 of index 4, a detected segment indicates alignment of the signal received at input port 921 of index 4 of distributor 1000 to the monitoring period but not necessarily to the scheduling period.

Upon determining the appropriate upstream transmission time to distributer 1000, the access node sends a control segment but resumes sending content segments at the onset of the immediately succeeding monitoring period (reference 3680).

With time alignment of signals received at each input port 921, signals can be transferred from the bufferless input ports 921 to output ports 922 (which are also bufferless).

Computation of the time displacement takes place during each monitoring period and if the magnitude of the time displacement of a signal of any access node exceeds a prescribed tolerance, transmission time at a respective access node is adjusted accordingly. The prescribed tolerance would be a fraction of the guard time δ (which is the duration of null field 1921). In a case of an access-node outage, time-alignment recovery follows the same steps described above with respect to initial access of an access node to a distributor.

FIG. 37 illustrates a scheme 3700 of signal time alignment to a reference scheduling period. According to a second alignment scheme, the controller 950 of the distributor maintains a control array of N entries, where each entry is dedicated to a respective input port and is associated with a reference control segment and an observation time slot.

FIG. 37 illustrates steps of time alignment, of a signal received at input port of index 4 of the distributor configuration of FIG. 10, to the scheduling period of a duration of 32 time slots (N=32). The steps of time alignment are similar to the steps described above with reference to FIG. 36, except that the observation time slots for the input ports correspond to entries of array 3620.

Initially, during an observation time slot 3740 of indices 4, 12, 20, 28, and 4 (corresponding to input port 921 of index 4), controller 950 did not detect a control segment, indicating that a signal from an access node has not yet arrived at the input port. During observation time slot 3750 of index 12 of a second scheduling period, controller 950 detected a segment of index 23, which is a content segment not a control segment; a control segment received during the observation time-slot of index 12 would be a segment of index 12 if the received signal is aligned. Additionally, controller 950 detects the position of the front marker and/or the back marker of the detected segment regardless of the segment type (content segment or control segment). Upon determining the index of the detected segment and the position of either the front marker or the back marker (or both markers), the controller 950 computes the value of time displacement of the incoming signal and communicates a requisite correction to the access node connecting to input port 921 of index 4 (which is 12 modulo $\Pi_1$) through a downstream control segment sent from downstream control port 1023 which is periodically connected to output port 922 having a channel 970 to the access node.

Until the access node receives the value of the corrective temporal displacement and corrects the upstream transmission time to distributer 1000, the segments detected during each observation time slot 3760 of index 12 of several consecutive monitoring periods, would still indicate a segment index of 23. During observation time slot 3770 of index 12 of a scheduling period 1140B, controller 950 detected control segment of index 12. The segment is time aligned to the boundaries to the time-slot of index 12 of the scheduling period. During each subsequent observation time slot of indices 20, 28, 4, 12, 20, etc., with respect to a scheduling period, a detected segment indicates alignment of the signal received at input port 921 of index 4 of distributor 1000.

Upon determining the appropriate upstream transmission time to distributer 1000, the access node sends a control segment but resumes sending content segments at the onset of the immediately succeeding scheduling period (reference 3780).

With time alignment of signals received at each input port 921, signals can be transferred from the bufferless input ports 921 to output ports 922 (which are also bufferless) according to schedules determined at controller 950 which controls the distributing mechanism 920.

As in the first time-alignment scheme of FIG. 36, computation of the time displacement takes place during each monitoring period and if the magnitude of the time displacement of a signal of any access node exceeds a permissible level, the access node adjusts transmission time accordingly. In a case of an access-node outage, time-alignment recovery follows the same steps described above with respect to initial access of an access node to a distributor.

FIG. 38 illustrates an example 3800 of monitoring-period alignment of FIG. 36.

The indices 3840, with respect to each monitoring period, of segments of a misaligned received signal are {03, 04, 05, 06, 07, 00, 01, 02}.

The indices 3850, with respect to the scheduling period, are {11, 12, ..., 29, 30, 31, 00, 01, ... 08, 09, 10}.

The indices 3860, with respect to each monitoring period, of segments of the aligned received signal are {00, 01, 02, 03, 04, 05, 06, 07}, which correspond to cyclical indices 3610 of time slots of the periodic monitoring period 1160.

The indices 3870, with respect to the scheduling period, are {08, 09, 10, ..., 29, 30, 31, 00, 01, ... 05, 06, 07}, which are shifted eight time slots from cyclical indices 3620 of time slots of the scheduling period 1140. The intention of the first scheme of FIG. 36 is time alignment only where routing data through the distributor is not based on dynamic flow-rate allocations.

Figure 39:
FIG. 39 details the example of scheduling-period alignment of FIG. 37.

FIG. 39 illustrates an example 3900 of scheduling-period alignment of FIG. 37.

The indices 3840, with respect to each monitoring period, of segments of a misaligned received signal are {03, 04, 05, 06, 07, 00, 01, 02}.

The indices 3850, with respect to the scheduling period, are {11, 12, ..., 29, 30, 31, 00, 01, ... 08, 09, 10}.

The indices 3960, with respect to each monitoring period, of segments of the aligned received signal are {00, 01, 02, 03, 04, 05, 06, 07}, which correspond to cyclical indices 3610 of time slots of the periodic monitoring period 1160.

The indices 3970, with respect to the scheduling period, are {00, 01, 02, ..., 29, 30, 31}, which correspond to cyclical indices 3620 of time slots of the scheduling period 1160.

Flow-Rate Allocation

Selecting a monitoring period of 128 time slots, and a scheduling period of 256 monitoring period, i.e., 32768 time slots, a dynamic flow-rate allocation for a directed pair of access nodes can be set as an integer multiple of a minimum flow rate of R/32768, R being the capacity of a communication channel 130 (FIG. 1). A flow is defined as aggregate data transferred from an originating access node to a destination access node. A monitoring period of 128 time slots is selected for a case where the distributor 1000 has a maximum of 127 provisioned dual ports 921/922. Thus, the maximum number of flows traversing the distributor from any input port 921 (i.e., from a respective access node connecting to the input port 921) to destination access nodes is 126. An upper bound of transport-capacity waste due to allocation of an integer number of time slots of a scheduling period for a flow is then 1/128.

The invention has been described with reference to particular example embodiments. The described embodiments are intended to be illustrative and not restrictive. Further modifications may be made within the purview of the appended claims, without departing from the scope of the invention in its broader aspect.

The invention claimed is:

1. A method of time aligning data transmitted from a plurality set of access nodes to a distributor, the method comprising:
   maintaining a control array of N observation time slots, indexed as 0 to (N−1), each observation time slot designated to a respective access node;
   sending from a controller of the distributor to each access node:
      a definition of a cyclic signal structure of N segments, indexed as 0 to (N−1), each segment containing two markers, each marker indicating an index of said each segment; and
      indices of respective control segments corresponding to indices of observation time slots designated to said each access node;
   during said each observation time slot, said controller:
      instructing a distributing mechanism of the distributor to direct to said controller a signal portion received from said respective access node;
      detecting from the signal portion a position of a segment marker and a segment index;
      determining a temporal displacement of the signal portion according to said position, said segment index, and index of said each observation time slot; and
      communicating said temporal displacement to said respective access node.

2. The method of claim 1 further comprising, subject to a determination that said temporal displacement exceeds a predefined threshold:
   instructing said distributing mechanism to halt transfer of signals from said respective access node to all other access nodes of the set of access nodes through the distributing mechanism; and
   instructing said respective access node to adjust transmission time to said distributor according to the temporal displacement.

3. The method of claim 1 wherein said two markers of said each segment comprise:
   a front marker, following a null field starting said each segment, indicating a respective marker position and said index of said each segment; and
   a back marker, at the end of said each segment, indicating a respective marker position and said index of said each segment.

4. The method of claim 3 further comprising:
   determining marker position of said segment marker;
   where said segment marker is a front marker, determining the temporal displacement as:
   $$G=T\times(J-K)+\delta-|(t_f-t_0)|_{modulo\ S};$$
   where said segment marker is a back marker, determining the temporal displacement as:
   $$G=T\times(J-K)+(T-\Theta)-|(t_b-t_0)|_{modulo\ S};$$
   where:
      J is a segment index extracted from the segment marker;
      K is an index of said each observation time slot;
      T is a duration of said each segment;
      S is a span of a time indicator, implemented as a time counter, coupled to said controller;
      $t_0$ is a starting time of said each observation time slot;
      $t_f$ is a starting time of the front marker;
      $t_b$ is a starting time of the back marker;
      δ is the duration of the null field;
      Θ is a duration of the back marker; and
      0≤J<N, 0≤K<N.

5. The method of claim 1 wherein said controller of the distributor receives from said each access node:
   requests for flow-rate allocations for paths between said each access node and other access nodes of said set of access nodes; and
   inter-nodal control data to be directed to designated access nodes of said set of access nodes.

6. The method of claim 5 further comprising said controller:
   maintaining a plurality of buffers, each for holding control data directed to a respective access node of the set of access nodes;
   establishing said flow-rate allocations;
   consolidating said flow-rate allocations with said inter-nodal control data into respective buffers; and
   sequentially sending contents of said respective buffers to respective access nodes.

7. A method of time aligning data transmitted from an access node to a distributor, the method comprising:
   transmitting from a controller of the distributor to the access node definition of a cyclical signal structure comprising a predefined number of segments indexed sequentially, each segment being of duration T and containing two markers, each marker indicating an index of said each segment, said number of segments including content segments and control segments;
   allocating to the access node respective observation time slots, each of duration T, with respective sequential indices corresponding to indices of said control segments;
   during each observation time slot, said controller:
      instructing a distributing mechanism of the distributor to direct to the controller a signal portion received from the access node;
      detecting from the signal portion a position of a segment marker and a segment index;
      determining a temporal displacement of the signal portion according to said position, said segment index, and index of said each observation time slot; and
      communicating said temporal displacement to the access node.

8. The method of claim 7 further comprising:
   subject to a determination that said temporal displacement exceeds a permissible threshold:
      instructing said distributing mechanism to disable signal flow, through said distributing mechanism, from the access node, maintaining only signal flow to the controller during said each observation time slot; and
      instructing said access node to adjust transmission time to said distributor according to said temporal displacement.

9. The method of claim 7 further comprising, said controller:
   receiving from said access node:
      flow-rate allocation requests for paths between said access node and other access nodes connecting to said distributor; and
      messages directed to designated access nodes connecting to said distributor;

establishing said flow-rate allocations; and sending said flow-rate allocations and said messages to respective access nodes connecting to said distributor.

10. The method of claim 7 further comprising using a time indicator, coupled to said controller, to measure detection time instants of said two markers, a word length, denoted n, n>0, of said time indicator being selected to realize a requisite time-indicator span, providing a time indication varying cyclically between 0 and $(2^n-1)$ time units, with a time unit of the order of one nanosecond.

11. The method of claim 7 further comprising, subject to detection, during said each observation time slot, of one of two pairs of detected markers:

a front marker and a back marker of a same segment; and a back marker of one segment and a front marker of a succeeding segment;

selecting one of said detected markers as said segment marker;

said two markers of said each segment being labelled a front marker and a back marker.

12. The method of claim 7 wherein:

said two markers of said each segment comprise:

a front marker, following a null field starting said each segment, indicating said index of said each segment and an identifier "11111111"; and a back marker, at the end of said each segment, indicating said index of said each segment and an identifier "00000000";

upon determining that said segment marker is a front marker, said temporal displacement, denoted G, is determined as:

$$G=T\times(J-K)+\delta-|(t_r-t_0)|_{modulo\ S};$$

upon determining that said segment marker is a back marker, said temporal displacement, is determined as:

$$G=T\times(J-K)+(T-\Theta)-|(t_b-t_0)|_{modulo\ S};$$

where:

J is a segment index extracted from the segment marker;

K is an index of said each observation time slot;

$t_0$ is a starting time of said each observation time slot;

T is said duration of said each segment;

S is a span of a time indicator, implemented as a time counter, coupled to said controller;

$t_f$ is a starting time of the front marker;

$t_b$ is a starting time of the back marker;

δ is the duration of the null field;

Θ is a duration of the back marker; and

0≤J<N, 0≤K<N.

13. A network comprising a plurality of distributors, each distributor connecting directly to a respective set of access nodes of a plurality of access nodes, and having a distributor controller configured to:

maintain a control array of N observation time slots, indexed as 0 to (N−1), each observation time slot designated to a respective access node of said respective set of access nodes;

send to each access node of said respective set of access nodes:

a definition of a cyclic signal structure of N segments, indexed as 0 to (N−1), each segment containing two markers, each marker indicating an index of said each segment; and indices of respective control segments corresponding to indices of observation time slots designated to said each access node;

and during said each observation time slot:

instruct a distributing mechanism of the distributor to direct to the distributor controller a signal portion received at the distributor from said respective access node;

detect from the signal portion a position of a segment marker and a segment index;

determine a temporal displacement of the signal portion according to said position, said segment index, and index of said each observation time slot; and communicate said temporal displacement to said respective access node.

14. The network of claim 13 wherein:

said distributor controller of said each distributor is coupled to a respective time indicator with a respective time reference independent of a time reference of each other distributor of said plurality of distributors;

said each access node has at least one dual port connecting to said each distributor, said dual port comprising a port-specific time indicator; and all distributors of said plurality of distributors and all access nodes of said plurality of access nodes employ identical time indicators.

15. The network of claim 13 wherein said distributor controller comprises:

a module for parsing control data received from said respective set of access nodes into:

flow-rate allocation requests; and messages directed to individual access nodes;

a module for sorting the messages according to individual access nodes;

a scheduler for generating flow-rate allocations for paths, within the distributing mechanism, from said each access node to other access nodes of said respective set of access nodes; and a memory device, organized into logical memory divisions, each holding downstream control data directed to a corresponding access node, said downstream data comprising:

flow-rate allocations; and messages from said respective set of access nodes.

16. The network of claim 13 wherein said number N is a product of:

a number, $\Pi_1$, of time slots of a cyclic monitoring period, $\Pi_1$ being at least equal to a total number of dual ports of said each distributor, said dual ports individually connecting to access nodes of said respective set of access nodes; and a number, $\Pi_2$, of monitoring periods, $\Pi_2>0$, selected to realize a requisite minimum flow-rate allocation determined as $R/(\Pi_1\times\Pi_2)$, R being a predefined transport capacity of each directional channel of a dual channel connecting said each access node to said each distributor.

17. The network of claim 13 wherein said each access node comprises a respective access controller configured to:

receive requests from data sources to transfer data to a subset of destination access nodes of said respective set of access nodes;

generate a requisite flow-rate allocation to each said destination access node; and direct a value of said requisite flow-rate allocation to said each distributor.

18. The network of claim 13 wherein said each access node has a dual port connecting to said each distributor through a dual channel, said dual port comprising a port controller configured to:
- receive a value of said temporal displacement; and
- subject to a determination that a magnitude of said temporal displacement exceeds a permissible threshold, adjust transmission time to said each distributor to offset said temporal displacement, using a port-specific time indicator.

19. The network of claim 13 wherein said each access node comprises a respective access controller comprising:
- an access clock configured to distribute clock signals to all ports of said each access node through internal clock-signal paths; and
- an access scheduler configured to:
  - receive scheduling instructions from said each distributor; and
  - generate schedules to be sent to respective input ports of said each access node.

20. The network of claim 19 wherein at least one access node of said respective set of access nodes comprises a plurality of dual ports connecting to a set of distributors of said plurality of distributors, each dual port having:
- a dual channel to a respective distributor of said set of distributors; and
- a respective port controller comprising:
  - a port processor;
  - a port time indicator receiving a clock signal from said access clock through one of said internal clock-signal paths;
  - a module for time alignment configured to compute a transmission time, according to said port time indicator, for data to be transmitted from said each dual port according to time-alignment instructions received from said respective distributor; and
  - a module for forming upstream data segments comprising upstream control segments and upstream content segments.

* * * * *